United States Patent
Saito et al.

(10) Patent No.: US 12,258,509 B2
(45) Date of Patent: Mar. 25, 2025

(54) OPTICAL COMPONENT

(71) Applicant: Merck Patent GmbH, Darmstadt (DE)

(72) Inventors: Izumi Saito, Darmstadt (DE); Owain Llyr Parri, Feltham (GB); Andreas Taugerbeck, Darmstadt (DE); Carsten Fritzsch, Darmstadt (DE); Dagmar Klass, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 1 day.

(21) Appl. No.: 18/014,518

(22) PCT Filed: Jul. 6, 2021

(86) PCT No.: PCT/EP2021/068574
§ 371 (c)(1),
(2) Date: Jan. 5, 2023

(87) PCT Pub. No.: WO2022/008474
PCT Pub. Date: Jan. 13, 2022

(65) Prior Publication Data
US 2023/0313043 A1 Oct. 5, 2023

(30) Foreign Application Priority Data
Jul. 8, 2020 (EP) .................... 20184700

(51) Int. Cl.
*G02F 1/1333* (2006.01)
*C09K 19/12* (2006.01)
(Continued)

(52) U.S. Cl.
CPC .............. *C09K 19/12* (2013.01); *C09K 19/16* (2013.01); *C09K 19/18* (2013.01); *C09K 19/30* (2013.01);
(Continued)

(58) Field of Classification Search
CPC ........ C09K 19/12; C09K 19/04; C09K 19/16; C09K 19/18; C09K 19/30; C09K 19/3003;
(Continued)

(56) References Cited

U.S. PATENT DOCUMENTS 4,826,620 A 5/1989 Heppke et al.
4,988,458 A 1/1991 Heppke et al.
(Continued)

FOREIGN PATENT DOCUMENTS

EP 1126006 A2 * 8/2001 ............. C09K 19/02
EP 3599266 A1 * 1/2020 ............. C09K 19/12
(Continued)

OTHER PUBLICATIONS

Gauza et al. ( "Physical properties of laterally fluorinated isothiocyanato phenyl-tolane liquid crystals". Liquid Crystals, Taylor & Francis, GB , vol. 35, No. 4, Apr. 1, 2008, pp. 483-488). (Year: 2008).*
(Continued)

*Primary Examiner* — Geraldina Visconti
(74) *Attorney, Agent, or Firm* — MILLEN, WHITE, ZELANO & BRANIGAN, P.C.; Brion P. Heaney

(57) ABSTRACT

An optical component is described which contains a liquid crystal (LC) medium, operable in the infrared region of the electromagnetic spectrum. The LC medium, which can be used in the infrared (IR) region, can contain one or more compounds of the formulae I, II, and III (Continued)

-continued

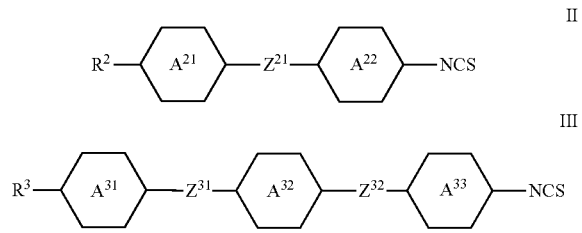

II

III in which the occurring groups and parameters have the meanings defined herein,
and preferably contain one or more compounds of the formula RO

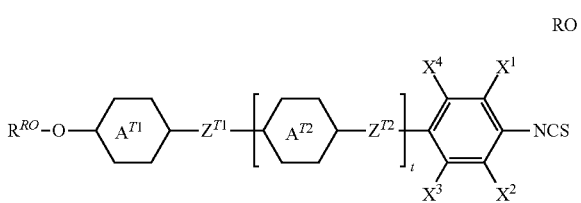

RO in which the occurring groups and parameters have the meanings defined herein.

18 Claims, 1 Drawing Sheet

(51) Int. Cl.
 C09K 19/16 (2006.01)
 C09K 19/18 (2006.01)
 C09K 19/30 (2006.01)
 C09K 19/32 (2006.01)
 C09K 19/34 (2006.01)
 G02F 1/01 (2006.01)
 G02F 1/1334 (2006.01)
 G02F 1/1343 (2006.01)
 G02F 1/1362 (2006.01)
 G02F 1/137 (2006.01)
 G02F 1/1335 (2006.01)
 G02F 1/1341 (2006.01)
(52) U.S. Cl.
 CPC ...... *C09K 19/3003* (2013.01); *C09K 19/3059* (2013.01); *C09K 19/322* (2013.01); *C09K 19/3491* (2013.01); *G02F 1/0136* (2013.01); *G02F 1/13345* (2021.01); *G02F 1/134336* (2013.01); *G02F 1/136277* (2013.01); *G02F 1/137* (2013.01); C09K 2019/122 (2013.01); C09K 2019/123 (2013.01); C09K 2019/161 (2013.01); C09K 2019/181 (2013.01); C09K 2019/183 (2013.01); C09K 2019/188 (2013.01); C09K 2019/3016 (2013.01); C09K 2019/3019 (2013.01); C09K 2019/3063 (2013.01); G02F 1/133302 (2021.01); G02F 1/133354 (2021.01); G02F 1/133553 (2013.01); G02F 1/1341 (2013.01); G02F 1/13439 (2013.01); G02F 2202/06 (2013.01); G02F 2203/01 (2013.01); G02F 2203/02 (2013.01); G02F 2203/11 (2013.01); G02F 2203/12 (2013.01)
(58) Field of Classification Search
 CPC .............. C09K 19/3059; C09K 19/322; C09K 19/3491; C09K 2019/0448; C09K 2019/122; C09K 2019/123; C09K 2019/161; C09K 2019/181; C09K 2019/183; C09K 2019/188; C09K 2019/3016; C09K 2019/3019; C09K 2019/3063; G02F 1/1313; G02F 1/1337; G02F 1/1393; G02F 1/0136; G02F 1/13345; G02F 1/134336; G02F 1/136277; G02F 1/137; G02F 1/133302; G02F 1/133354; G02F 1/133553; G02F 1/1341; G02F 1/13439; G02F 2202/06; G02F 2203/01; G02F 2203/02; G02F 2203/05; G02F 2203/11; G02F 2203/12
 See application file for complete search history.

(56) References Cited

U.S. PATENT DOCUMENTS

| | | | |
|---|---|---|---|
| 5,043,095 | A | 8/1991 | Bahr et al. |
| 5,788,880 | A | 8/1998 | Schierlinger et al. |
| 5,886,242 | A | 3/1999 | Etzbach et al. |
| 6,217,792 | B1 | 4/2001 | Parri et al. |
| 6,511,719 | B2 | 1/2003 | Farrand |
| 6,569,505 | B2 | 5/2003 | Poetsch et al. |
| 7,041,345 | B2 | 5/2006 | Kirsch et al. |
| 7,060,331 | B2 | 6/2006 | Kirsch et al. |
| 7,318,950 | B2 | 1/2008 | Kirsch et al. |
| 7,385,067 | B2 | 6/2008 | Kirsch et al. |
| 7,425,356 | B2 | 9/2008 | Taugerbeck et al. |
| 10,224,620 | B2 | 3/2019 | Sullivan et al. |
| 10,665,953 | B1 | 5/2020 | Akselrod et al. |
| 10,886,317 | B2 | 1/2021 | Akselrod et al. |
| 11,190,960 | B2 | 11/2021 | Miao et al. |
| 11,473,014 | B2 | 10/2022 | Chang et al. |
| 2019/0352564 | A1* | 11/2019 | Klass .................. C09K 19/3059 |

FOREIGN PATENT DOCUMENTS

| | | | | |
|---|---|---|---|---|
| WO | WO-2017201515 | A1 * | 11/2017 | .............. C09K 19/18 |
| WO | 2018156643 | A1 | 8/2018 | |
| WO | 2019024052 | A1 | 2/2019 | |

OTHER PUBLICATIONS

McManamon et al., "Optical phased array technology", Proc IEEE. 1996; 84: 268-298.
Davis et al., "Liquid crystal waveguides: new devices enabled by >1000 waves of optical phase control," Proc. SPIE 7618, Emerging Liquid Crystal Technologies V 2010 (pp. 1-15).
Peng et al., "Low loss liquid crystals for infrared applications", Liquid Crystals, 41, 11, 1545-1552 (2014) http://dx.doi.org/10.1080/02678292.2014.932452.
McManamon, "Agile Nonmechanical Beam Steering," Opt. Photon. News 2006, 17, 3, 24-29.
Micallef, "Middle infrared beam-steering using liquid crystals for spatial light modulation", Doctoral thesis, Dept. of Eng. University of Cambridge; Churchill College Sep. 2018 (pp. 1-180).
Gauza et al.; Physical Properties of Laterally Fluorinated Isothiocyanato Phenyl-Tolane Liquid Crystals, Liquid Crystals 2008, 35, 4, 483-488.
International Search Report PCT/EP2021/068574 dated Oct. 20, 2021 (pp. 1-2).

* cited by examiner

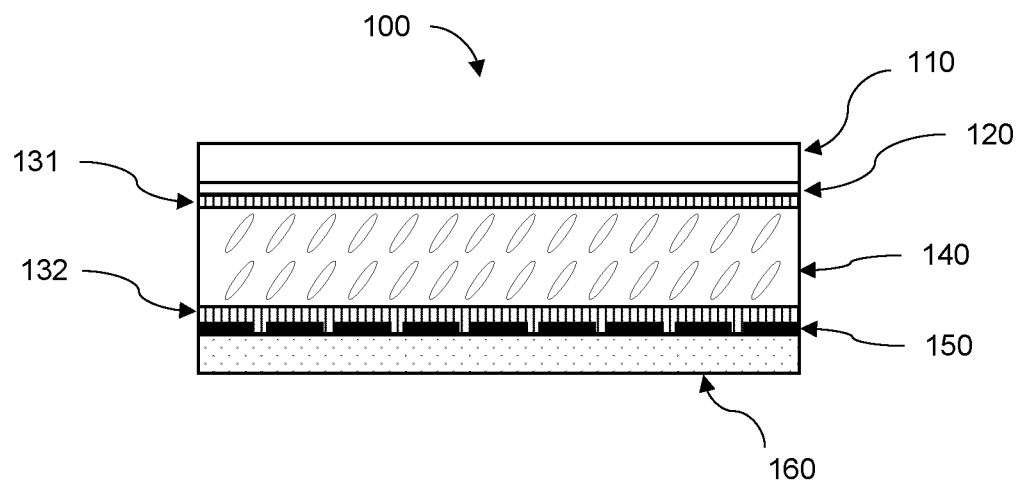

OPTICAL COMPONENT

The invention relates to an optical component comprising a liquid crystal (LC) medium, operable in the infrared region of the electromagnetic spectrum. The invention further relates to the use of said LC medium in the infrared (IR) region and to devices comprising said optical component.

Liquid-crystalline media have been used for many years in electro-optical displays (liquid crystal displays: LCDs) in order to display information by amplitude modulation of polarised light in the visible region. Nematic liquid crystals have also been proposed for phase modulation of light: The article Mcmanamon P F, Dorschner T A, Corkum D L, Friedman L J, Hobbs D S, Holz M, Liberman S, Nguyen H Q, Resler D P, Sharp R C, Watson E A. Optical phased array technology. Proc IEEE. 1996; 84:268-298. doi:10.1109/5.482231 describes liquid crystal based optical phased arrays for various types of sensor applications; the article Scott R. Davis, George Farca, Scott D. Rommel, Seth Johnson, Michael H. Anderson, "Liquid crystal waveguides: new devices enabled by >1000 waves of optical phase control," Proc. SPIE 7618, Emerging Liquid Crystal Technologies V, 76180E (12 Feb. 2010); doi: 10.1117/12.851788 describes refractive beam steering using a waveguide structure.

Increasingly, telecommunications has need of optical components that operate in the infrared range. For example, wavelength-selective-switching (WSS) based reconfigurable optical add-drop multiplexers (ROADMs) are the essential components of dynamic optical networks. The fast growing demand for high-speed broadband communication gave rise to the need for development of the so-called colorless, directionless, contentionless, and gridless (CDC-F) networking architectures. Wavelength selective switch technology, on which the latest generation ROADMs are based on, is envisaged to provide the CDC-F capability which the next-generation optical network relies on. Currently, there are several competing switch engine technologies used in WSSs, one of which are liquid-crystal-on-silicon (LCoS) spatial light modulators (SLMs). LCoS-SLMs have shown advantages including flexible bandwidth adjustment, adaptive optical alignment for WSSs with high port count number, and robustness without mechanical movements.

Another application using liquid crystal based devices is light detection and ranging (Lidar)—a method for measuring distances by illuminating a target with laser light and measuring the reflection with a sensor. Differences in laser return times and wavelengths can then be used to make digital 3-D representations of the target. In WO2019/24052 A1, a holographic LIDAR system is proposed that uses for example an LCoS SLM.

In U.S. Pat. No. 10,665,953 B1 A tunable, optical metasurface is proposed that includes an optically reflective surface to reflect infrared laser light, wherein an array of optical resonant antennas positioned on the reflective surface and voltage-controlled liquid crystal is positioned in the optical field region of each of the optical resonant antennas to attain one-dimensional beam steering or shaping for a LIDAR system.

One of the most important features for a phase-only LCoS device is its use of optically non-linear liquid crystal (LC) materials, which are sensitive to the working temperature. While the main focus of LCoS devices in the past was on optical intensity modulation, which is little affected by temperature variation, for phase-only LCoS devices optical phase modulation of the incident light is an essential performance parameter and it can easily be affected by a small change of working temperature, resulting in a significant change in the outcome of corresponding optical diffractions.

Liquid crystal mixtures optimized for regular display applications such as TV or mobile phones known from prior art are not suitable for applications in the infrared because the birefringence of these mixtures fall-off as wavelength increases so the optical device has to have an extremely high cell gap for modulating IR radiation. Many liquid crystal mixtures suffer from both insufficient birefringence ($\Delta n$) and high optical loss in the IR region. The article Fenglin Peng, Yuan Chen, Shin-Tson Wu, Suvagata Tripathi & Robert J. Twieg (2014) Low loss liquid crystals for infrared applications, Liquid Crystals, 41:11, 1545-1552, DOI: 10.1080/02678292.2014.932452 proposes to avoid liquid crystal mixture components with a CN or NCS polar group but to use chlorine or fluorine instead. This problem is particularly acute for devices in which phase modulation has to be achieved at NIR wavelengths. A mixture optimized for birefringence alone is not sufficient for commercial applications and other thermal, optical and electrooptical properties are also important. For outdoor IR applications of liquid crystal attenuators, a wide temperature range and low temperature dependency of the optical properties with temperature is typically required.

A key challenge for the development of next generation of LCoS devices is the creation of a high-speed multi-level phase modulation. Nematic LCoS devices have demonstrated the benefits of the multi-level phase modulation, but are limited by the slow response time of the nematic LC. This is especially the case in telecommunication applications, where the infrared wavelengths used require thicker devices, thus further slowing down the response times. Hence, the main materials challenge for these applications is to find a suitable high-speed LC material capable to deliver the full $2\pi$ phase depth required in these applications.

There is a need for liquid crystal based optical components operable in the infrared region of the electromagnetic spectrum with improved overall application relevant properties having high birefringence and fast switching speed.

The invention is devised in the light of the problems of the prior art described herein. Accordingly it is a general object of the present invention to provide a novel and useful device and technique that can solve the problems described herein.

An object of the present invention is an optical component comprising a liquid crystal medium sandwiched between a pair of substrates, wherein the liquid crystal medium comprises one or more compounds of the formulae I, II, and III

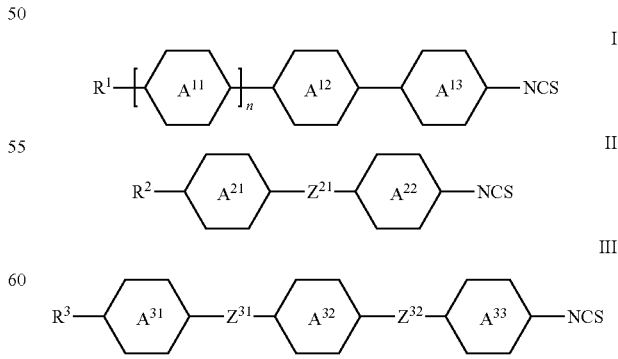

in which
R$^1$ denotes H, straight chain or branched alkyl having 1 to 12, preferably 2 to 7 C atoms, or alkenyl, having 2 to 15, preferably 2 to 7, C atoms, in which one or more CH$_2$-groups may be replaced by

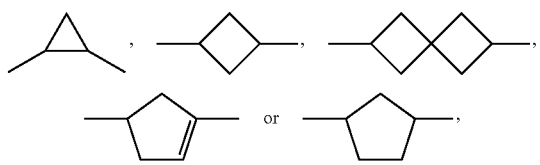

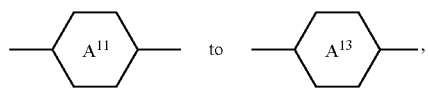

preferably alkyl or alkenyl, n is 0, 1 or 2,

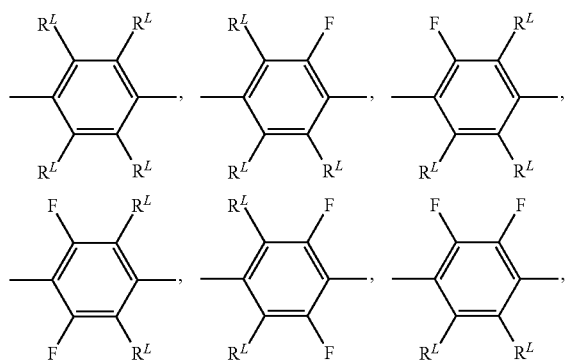

on each occurrence, independently of one another, denote

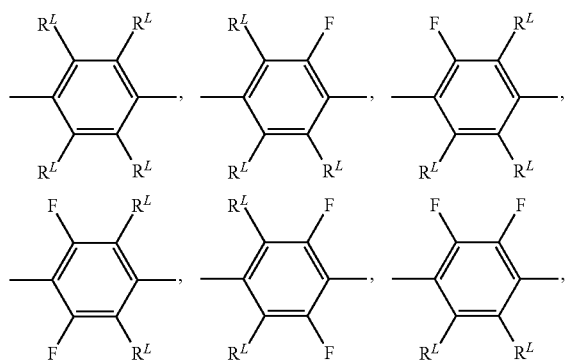

in which R$^L$, on each occurrence, identically or differently, denotes H or alkyl having 1 to 6 C atoms, preferably H, methyl or ethyl, particularly preferably H, and wherein

alternatively denotes

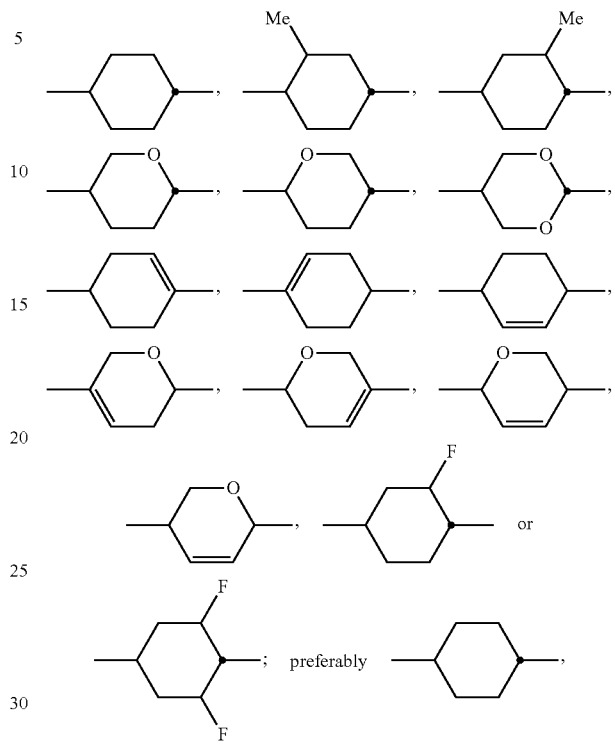

and in case n=2, one of

preferably denotes

and the other preferably denotes

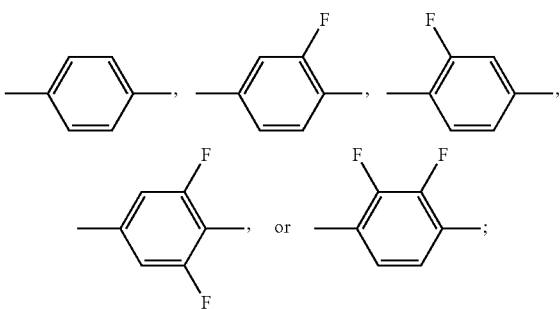

preferably

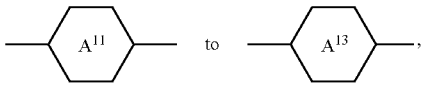

independently of one another, denote

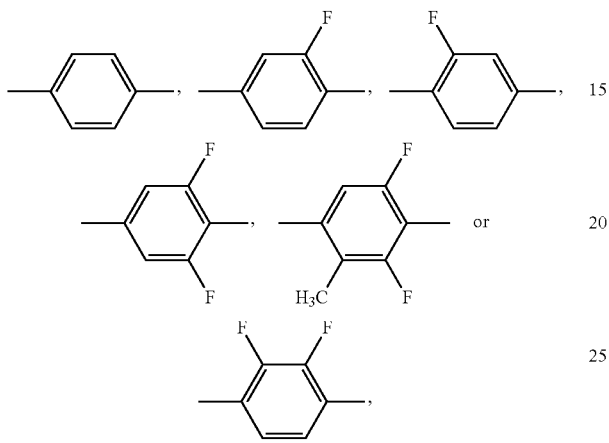

more preferably

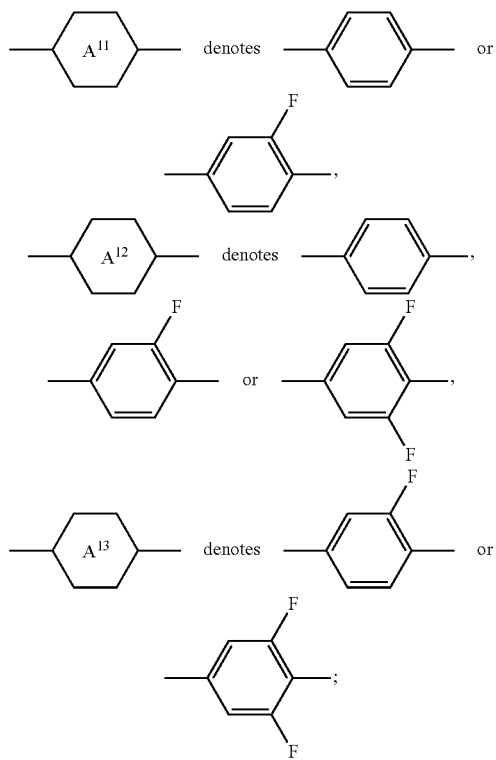

$R^2$ denotes H, straight chain or branched alkyl having 1 to 12, preferably 2 to 7 C atoms, or alkenyl having 2 to 15, preferably 2 to 7, C atoms, in which one or more $CH_2$-groups may be replaced by

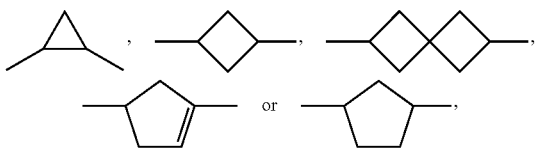

preferably alkyl or alkenyl,
$Z^{21}$ denotes trans-CH=CH—, trans-CF=CF— or —C≡C—, preferably —C≡C—, and

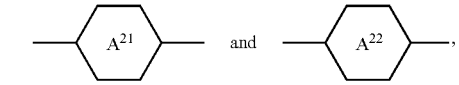

independently of one another, denote

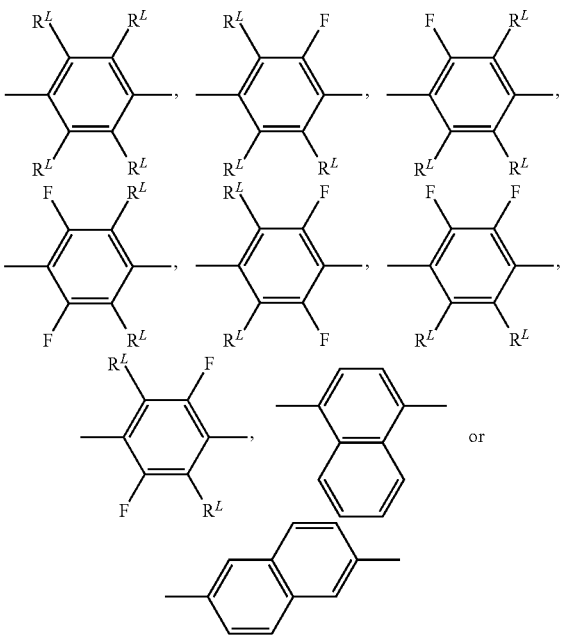

in which $R^L$, on each occurrence, identically or differently, denotes H or alkyl having 1 to 6 C atoms, preferably H, methyl or ethyl, particularly preferably H,
and wherein
preferably

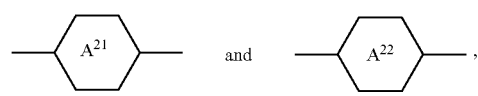

independently of one another, denote

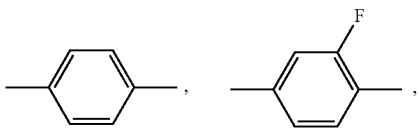

-continued

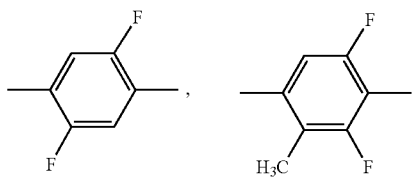

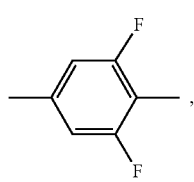

preferably denotes

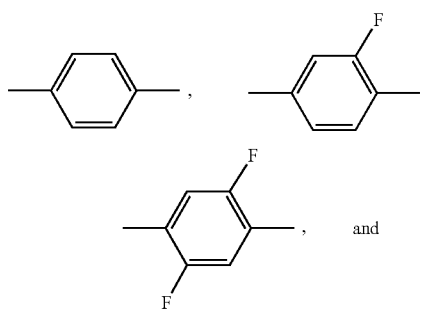

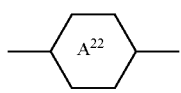

preferably denotes

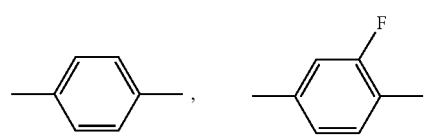

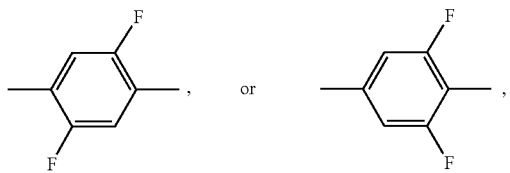

more preferably

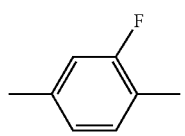

$R^3$ denotes H, straight chain or branched alkyl having 1 to 12, preferably 2 to 7 C atoms, or alkenyl having 2 to 15, preferably 2 to 7, C atoms, in which one or more $CH_2$-groups may be replaced

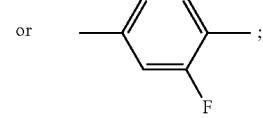

preferably alkyl or alkenyl, one of $Z^{31}$ and $Z^{32}$, preferably $Z^{32}$; denotes trans-CH=CH—, trans-CF=CF— or —C≡C— and the other one, independently thereof, denotes —C≡C—, trans-CH=CH—, trans-CF=CF— or a single bond, preferably one of them, preferably $Z^{32}$; denotes —C≡C— or trans-CH=CH— and the other denotes a single bond, and

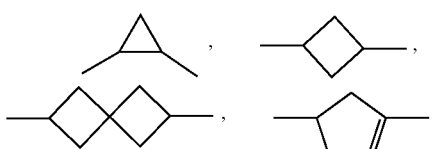

independently of one another, denote

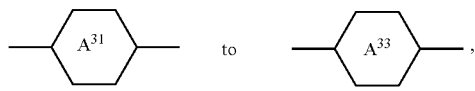

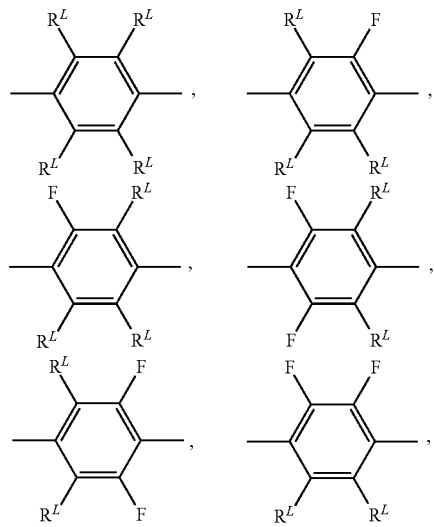

-continued in which $R^L$, on each occurrence, identically or differently, denotes H or alkyl having 1 to 6 C atoms, preferably H, methyl or ethyl, particularly preferably H, and wherein

[structure: A³¹ ring]

alternatively denotes

[structures]

preferably

[A³¹] to [A³³], independently of one another, denote

[structures]

more preferably

[A³¹]

denotes

[structures]

[A³²]

denotes

[structures], or

-continued

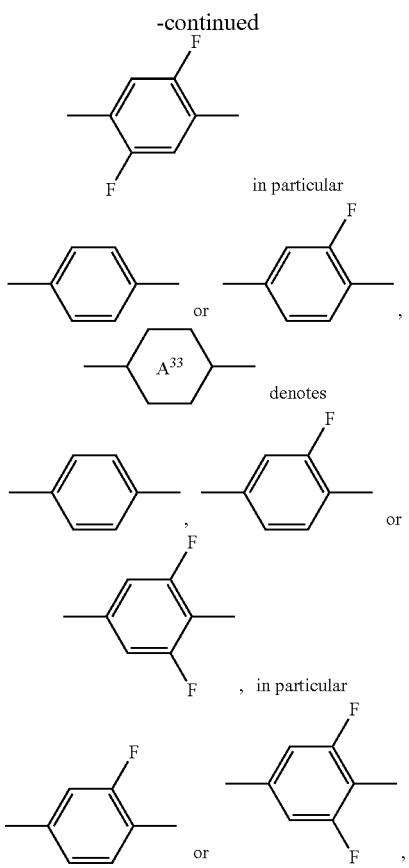

wherein the compounds of the formula RO below are excluded from the compounds of the formulae I, II, and III.

In the compounds of the formulae I, II and III, $R^L$ preferably denotes H.

In another preferred embodiment, in the compounds of formulae I, II and III, one or two groups $R^L$, preferably one group $R^L$ is different from H.

The invention further relates to the use of the medium defined above and below in the infrared region of the electromagnetic spectrum, preferably in the A-band, and/or B-band and/or C-band, for phase modulation of said infrared light.

The invention further relates to a device comprising the optical component according to the invention. Preferred devices are infrared imagers, wavelength selective switches, LCoS-SLM, LIDAR systems, wavelength-division multiplexing (WDM) systems, reconfigurable optical add-drop multiplexer (ROADM), and nonmechanical beam steering, e.g. steerable Electro Evanescent Optical Refraction (SEEOR) prism as published in the article P. McManamon, 2006, "Agile Nonmechanical Beam Steering," Opt. Photon. News 17(3): 24-29.

According to another aspect of the present invention there is provided a method of spatially modulating infrared light, the method comprising,
i) providing an optical component comprising first and second substrates facing each other and each having a surface, the first substrate comprising at least one first electrode, the second substrate comprising at least one second electrode, the component further comprising a liquid crystal layer sandwiched between the first and second substrates wherein the liquid crystal comprises one or more compounds selected from the compounds of formulae I, II and III indicated above;
ii) receiving incident infrared light at a surface of said optical component;
iii) applying a predetermined voltage to each of the individual electrodes formed on the first substrate in order to modulate a refractive index of the liquid crystal layer.

According to another aspect of the present invention there is provided a method of manufacturing an optical phase modulator, comprising at least the steps of
a) providing a first substrate with a first electrode, optionally having a two dimensional array of individually electrically drivable cells;
b) depositing a liquid crystal medium as set forth in claim 1 over the first substrate; and
c) mounting a second substrate with a second electrode onto the liquid crystal material.

The optical component according to the invention is distinguished by excellent operational stability when exposed to the environment because of high clearing temperature, broad nematic phase range and excellent low-temperature stability (LTS) of the liquid crystal medium used therein. As a result, the component and devices containing the component are operable under extreme temperature conditions. Surprisingly, the temperature dependence of the birefringence of said liquid crystal medium is very small, i.e. the Δn changes little with the temperature, which makes a device reliable and easy to control.

The media used in the component according to the invention are distinguished by high values of the dielectric anisotropy and low rotational viscosities. As a result, the threshold voltage, i.e. the minimum voltage at which a device is switchable, is very low. A low operating voltage and low threshold voltage is desired in order to enable a device having improved switching characteristics and high energy efficiency. Low rotational viscosities enable fast switching of the components and devices according to the invention.

As used herein, infrared region of the electromagnetic spectrum is taken to mean the spectral region of electromagnetic radiation having a wavelength in the range of from 0.75 μm to 1000 μm.

As used herein, infrared A (IR-A) is taken to mean the spectral region of electromagnetic radiation having a wavelength in the range of from 0.75 μm to 1.4 μm.

As used herein, infrared B (IR-B) is taken to mean the spectral region of electromagnetic radiation having a wavelength in the range of from 1.4 μm to 3 μm.

As used herein, infrared C (IR-C) is taken to mean the spectral region of electromagnetic radiation having a wavelength in the range of from 3 μm to 1000 μm.

Preferably, the optical component according to the invention operates at a wavelength in the range of from 750 nm to 2500 nm, in particular from 1530 nm to 1565 nm.

A very preferred light source for applications according to the invention is an IR laser emitting light with a wavelength of 1.55 μm or an IR laser emitting light with a wavelength of 905 nm.

As used herein, halogen is F, Cl, Br or I, preferably F or Cl, particularly preferably F.

Herein, alkyl is straight-chain or branched and has 1 to 15 C atoms, is preferably straight-chain and has, unless indicated otherwise, 1, 2, 3, 4, 5, 6 or 7 C atoms and is accordingly preferably methyl, ethyl, n-propyl, n-butyl, n-pentyl, n-hexyl or n-heptyl.

Herein, branched alkyl is alkyl having a secondary and/or tertiary, preferably secondary, carbon atom and is preferably isopropyl, s-butyl, isobutyl, isopentyl, 2-methylhexyl or 2-ethylhexyl, 2-methylpropyl, 2-pentyl, 3-pentyl, 2-methylbutyl, 3-methylbutyl.

Herein, a cyclic alkyl group is taken to mean a cycloalphatic radical or an alkyl group in which a methylene group is replaced with a cycloalphatic group (i.e. a cycloalkylalkyl or alkylcycloalkylalkyl), which may be saturated or partially unsaturated, and preferably denotes cyclopropyl, methylcyclopropy, cyclobutyl, methylcyclobutyl, cyclopentyl, methylcyclpoentyl, cyclopent-1-enyl, cyclopropylmethyl, cyclopropylethyl, cyclobutylmethyl, cyclobutylethyl, cyclopentylmethyl, cyclopentylethyl, cyclopent-1-enylmethyl.

Herein, an alkoxy radical is straight-chain or branched and contains 1 to 15 C atoms. It is preferably straight-chain and has, unless indicated otherwise, 1, 2, 3, 4, 5, 6 or 7 C atoms and is accordingly preferably methoxy, ethoxy, n-propoxy, n-butoxy, n-pentoxy, n-hexoxy or n-heptoxy.

Herein, an alkenyl radical is preferably an alkenyl radical having 2 to 15 C atoms, which is straight-chain or branched and contains at least one C—C double bond. It is preferably straight-chain and has 2 to 7 C atoms. Accordingly, it is preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl. If the two C atoms of the C—C double bond are substituted, the alkenyl radical can be in the form of E and/or Z isomer (trans/cis). In general, the respective E isomers are preferred. Of the alkenyl radicals, prop-2-enyl, but-2- and -3-enyl, and pent-3- and -4-enyl are particularly preferred.

Herein, alkynyl is taken to mean an alkynyl radical having 2 to 15 C atoms, which is straight-chain or branched and contains at least one C—C triple bond. 1- and 2-propynyl and 1-, 2- and 3-butynyl are preferred.

In case $R^F$ denotes a halogenated alkyl-, alkoxy-, alkenyl or alkenyloxy it can be branched or unbranched. Preferably it is unbranched, mono-poly or perfluorinated, preferably perfluorinated and has 1, 2, 3, 4, 5, 6 or 7 C atoms, in case of alkenyl 2, 3, 4, 5, 6 or 7 C atoms.

$R^P$ preferably denotes CN, NCS, Cl, F, —$(CH_2)_n$—CH=$CF_2$, —$(CH_2)_n$—CH=CHF, —$(CH_2)_n$—CH=$Cl_2$, —$C_nF_{2n+1}$, —$(CF_2)_n$—$CF_2H$, —$(CH_2)_n$—$CF_3$, —$(CH_2)_n$—$CHF_2$, —$(CH_2)_nCH_2F$, —CH=$CF_2$, —$O(CH_2)_n$—CH=$CF_2$, —$O(CH_2)_nCHCl_2$, —$OC_nF_{2n+1}$, —$O(CF_2)_n$—$CF_2H$, —$O(CH_2)_nCF_3$, —$O(CH_2)_n$—$CHF_2$, —$O(CF)_nCH_2F$, —OCF=$CF_2$, —$SC_nF_{2n+1}$, —$S(CF)_n$—$CF_3$, wherein n is an integer from 0 to 7.

Preferably, the medium comprises one or more compounds of formula RO

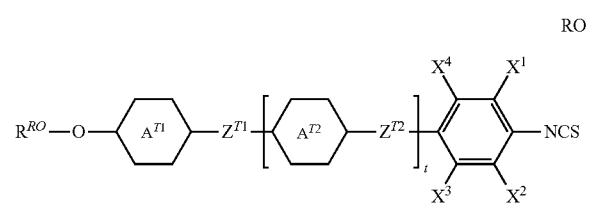

RO in which $R^{RO}$ denotes straight chain or branched alkyl having 1 to 12 C atoms, or straight chain or branched alkenyl, having 2 to 12 C atoms, in each of which one or more $CH_2$-groups may be replaced by

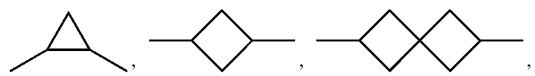

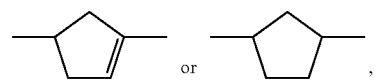

$Z^{T1}$, $Z^{T2}$ identically or differently, denote —CH=CH—, —CF=CF—, —CH=CF—, —CF=CH—, —C≡C— or a single bond, preferably —CF=CF—, —C≡C— or a single bond, $X^1$, $X^2$, $X^3$ and $X^4$ identically or differently, denote H, Cl, F or $CH_3$, preferably H or F, t is 0 or 1, and

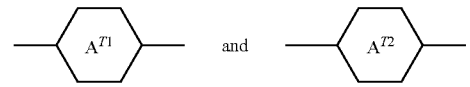

denote a radical selected from the following groups:
a) the group consisting of 1,4-phenylene, 1,4-naphthylene, and 2,6-naphthylene, in which one or two CH groups may be replaced by N and in which one or more H atoms may be replaced by L,
b) the group consisting of thiophene-2,5-diyl, thieno[3,2-b]thiophene-2,5-diyl, selenophene-2,5-diyl, furan-2,5-diyl, each of which is optionally mono- or polysubstituted by L, L on each occurrence, identically or differently, denotes F, Cl, or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms.

In a preferred embodiment, $R^{RO}$ in formula RO denotes straight chain alkyl or alkenyl having up to 7 C atoms.

In another preferred embodiment, $R^{RO}$ in formula RO denotes branched alkyl or alkenyl having up to 10 C atoms.

In yet another preferred embodiment, $R^{RO}$ in formula RO denotes cyclic alkyl having up to 10 C atoms.

Preferably, the compounds of formula RO are selected from the group consisting of the formulae RO-1 to RO-7

RO-1

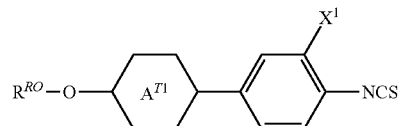

RO-2

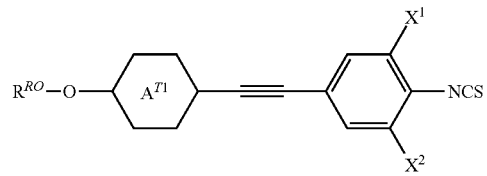

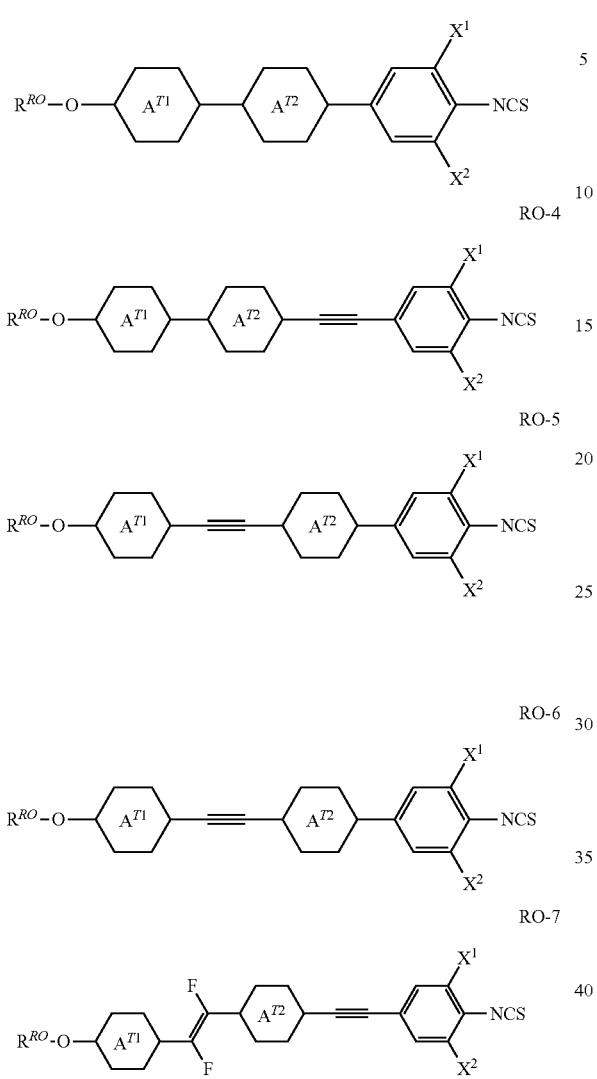

RO-3

RO-4

RO-5

RO-6

RO-7 in which $X^1$ and $X^2$ denote H, Cl, F or $CH_3$, preferably H or F,

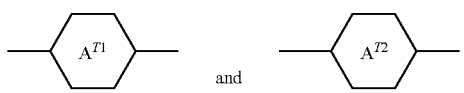

and have the meanings given above and preferably denote

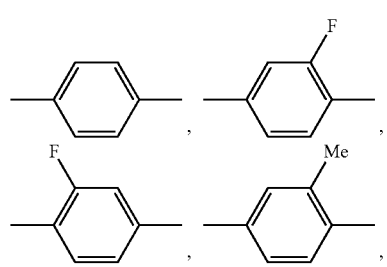

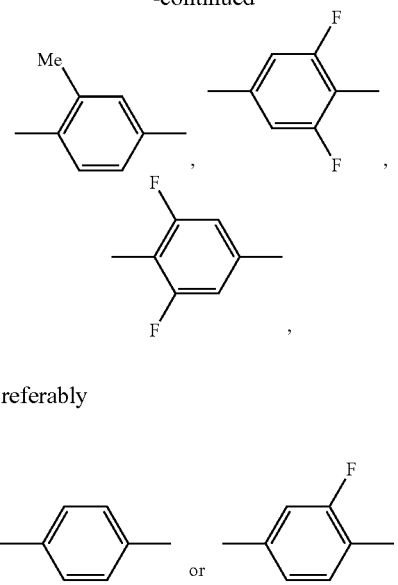

very preferably

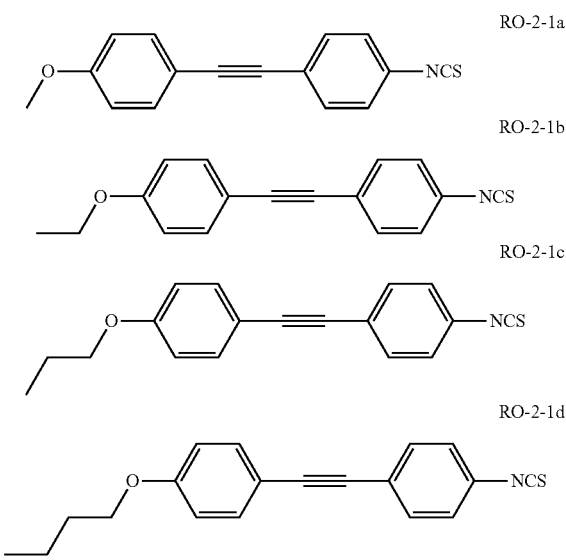

or $R^{RO}$ has one of the meanings given above and preferably denotes methyl, ethyl, n-propyl, 2-propyl, n-butyl, 2-butyl, 2-methylpropyl, n-pentyl, 2-pentyl, 3-pentyl, 2-methylbutyl, 3-methylbutyl, cyclopropyl, cyclobutyl, cyclopentyl, cyclopent-1-enyl, cyclopropylmethyl, cyclopropylethyl, cyclobutylmethyl, cyclobutylethyl, cyclopentylmethyl, cyclopentyl, cyclopent-1-enylmethyl, in which one or more but not all H atoms may be substituted by F.

More preferred compounds of formulae RO-1 to RO-7 are selected from the group consisting of the formulae RO-2, RO-3, RO4 and RO-5, very preferred RO-2; particularly preferably, the medium comprises one or more n-alkoxy derivatives of formula RO-2 selected from the sub-formulae RO-2-1a to RO-2-11 and/or one or more branched alkoxy derivatives of formula RO-2 selected from the sub-formulae RO-2-2a to RO-2-2m and/or one or more cycloalkoxy derivatives of formula RO-2 selected from the sub-formulae RO-2-3a to RO-2-3p:

-continued
RO-2-1e
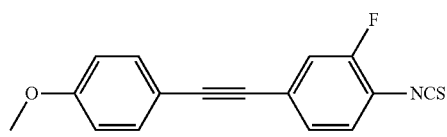
RO-2-1f
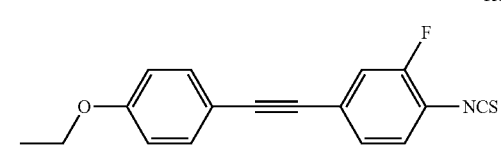
RO-2-1g
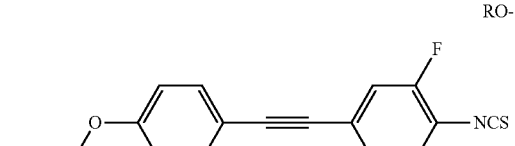
RO-2-1h
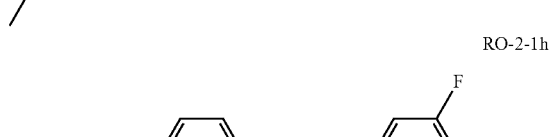
RO-2-1i
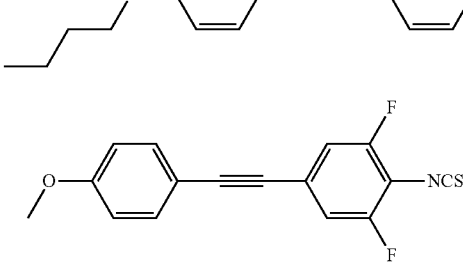
RO-2-1j
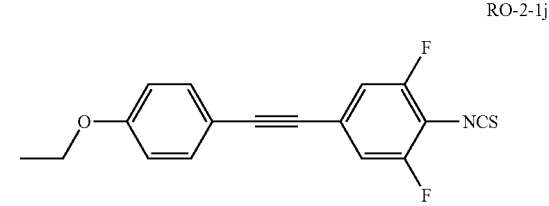
RO-2-1k
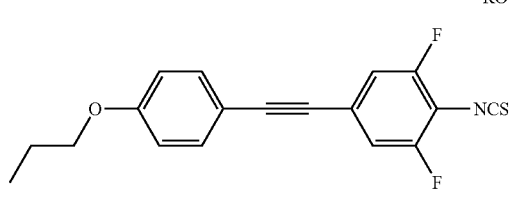
RO-2-1l
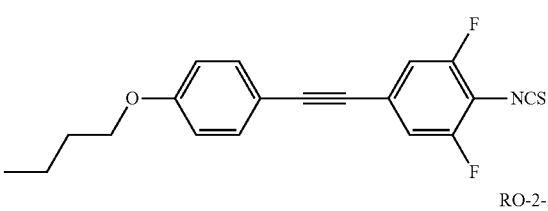
RO-2-2a
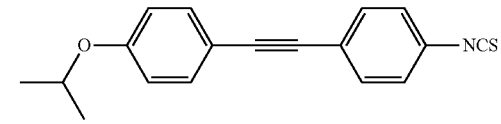
-continued
RO-2-2b
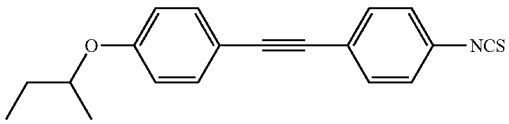
RO-2-2c
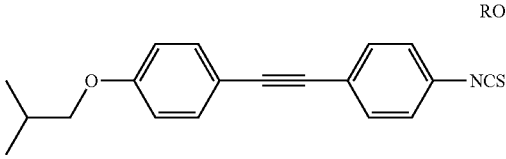
RO-2-2d
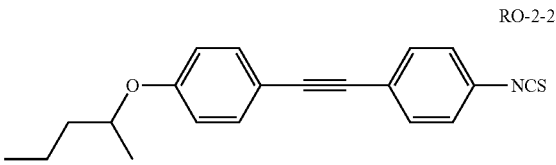
RO-2-2e
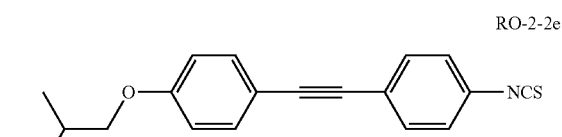
RO-2-2f
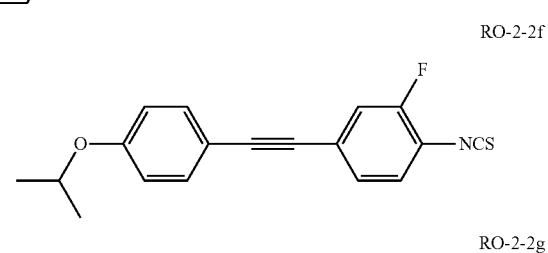
RO-2-2g
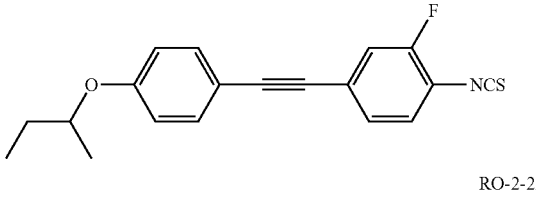
RO-2-2h
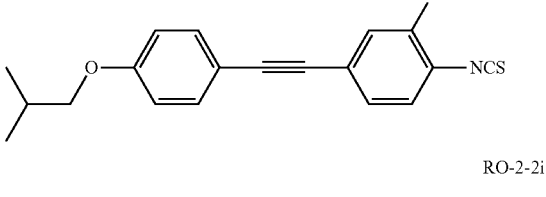
RO-2-2i
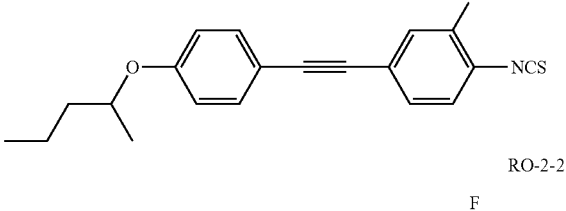
RO-2-2
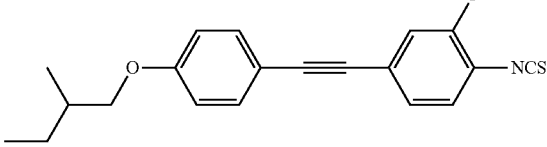

RO-2-2j
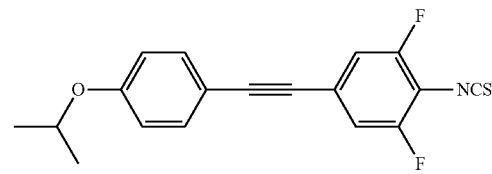
RO-2-2k
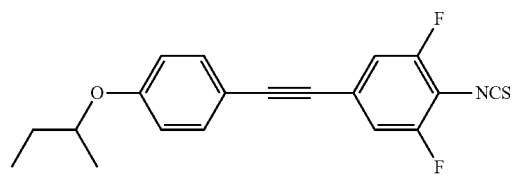
RO-2-2l
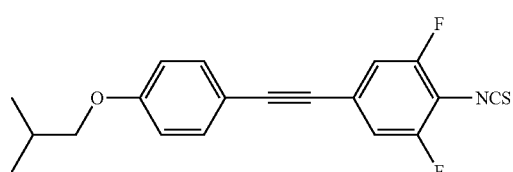
RO-2-2m
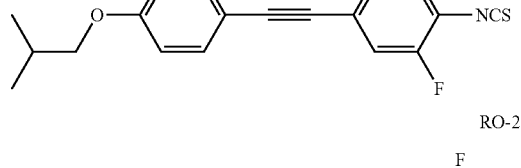
RO-2-2n
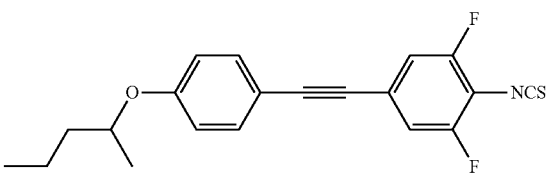
RO-2-3a
RO-2-3b
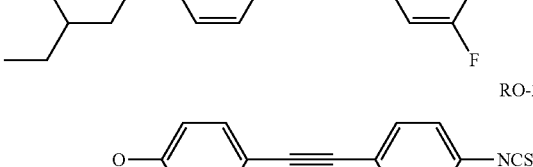
RO-2-3c
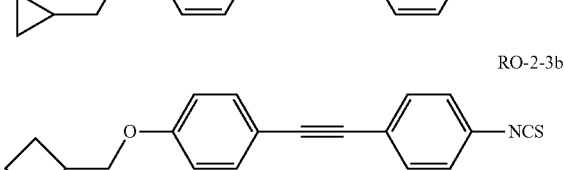
RO-2-3d
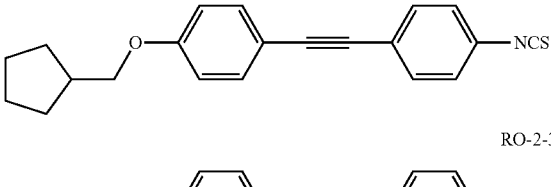
RO-2-3e
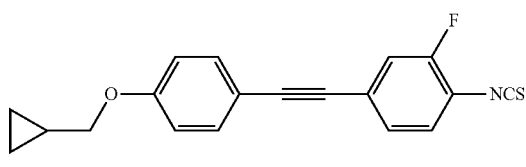
RO-2-3f
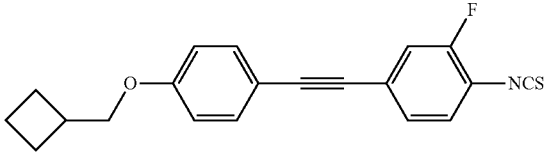
RO-2-3g
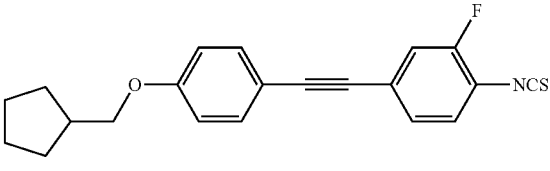
RO-2-3h
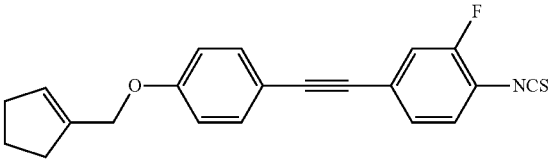
RO-2-3i
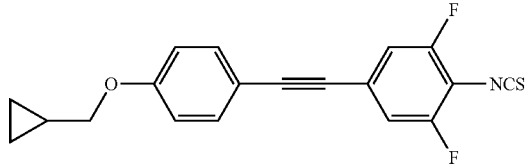
RO-2-3j
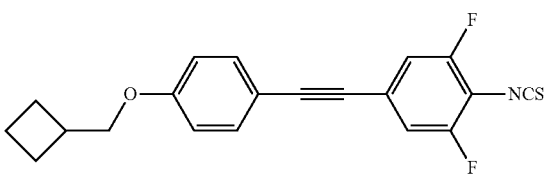
RO-2-3k
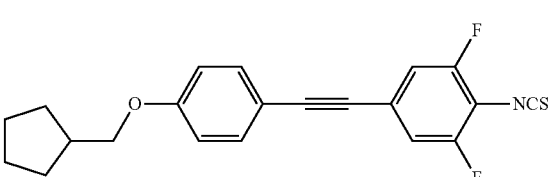
RO-2-3l
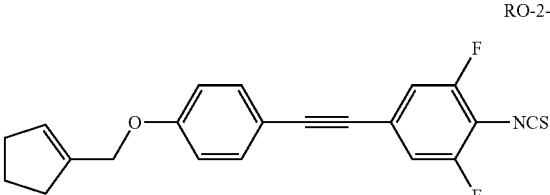

-continued

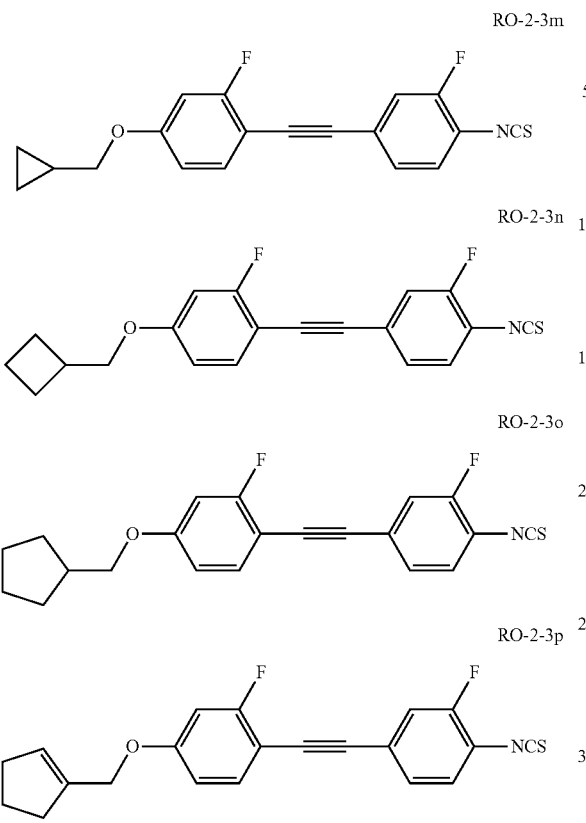

In a preferred embodiment of the present invention, the compounds of formula I are selected from the group of compounds of the formulae I-1 to I-5:

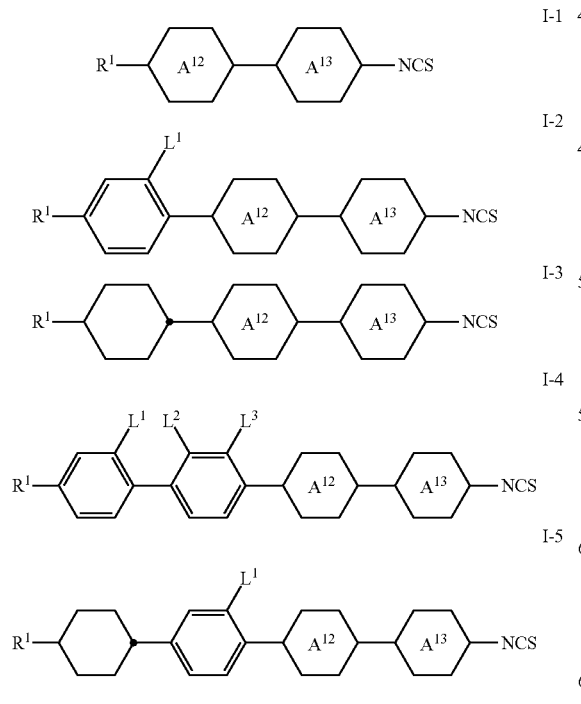

in which
L¹, L² and L³ on each occurrence, identically or differently, denote H or F, and the other groups have the respective meanings indicated above for formula I and
preferably
R¹ denotes alkyl having 1 to 7 C atoms or alkenyl having 2 to 7 C atoms.

The media preferably comprise one or more compounds of formula I-1, which are preferably selected from the group of the compounds of the formulae I-1a to I-1d, preferably of formula I-1b:

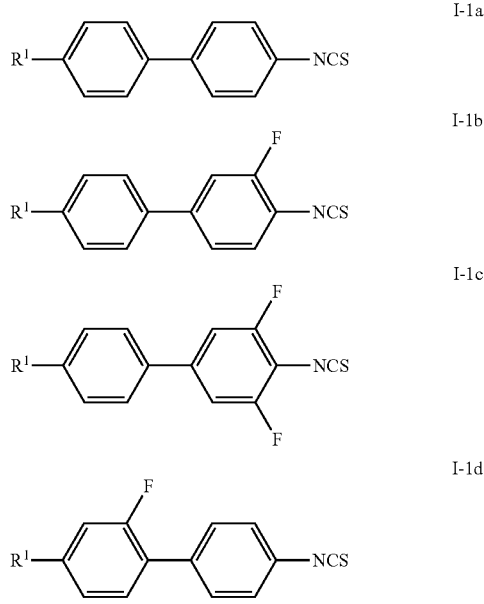

in which R¹ has the meaning indicated above for formula I and preferably denotes alkyl having 1 to 7 C atoms or alkenyl having 2 to 7 C atoms.

The media preferably comprise one or more compounds of formula I-2, which are preferably selected from the group of the compounds of the formulae I-2a to I-2e, preferably of formula I-2c:

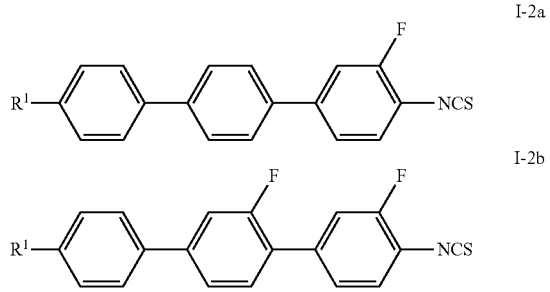

-continued

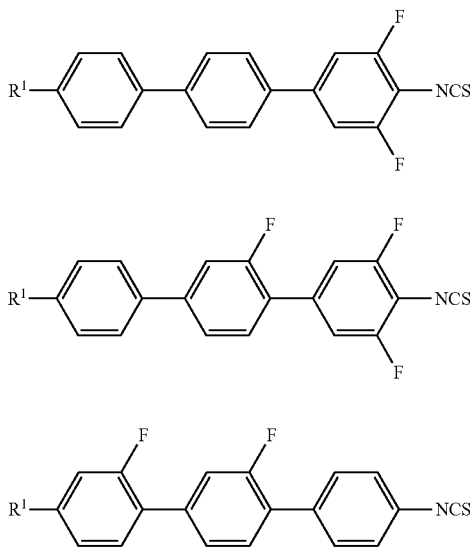

I-2c

I-2d

I-2e in which R¹ has the meaning indicated above for formula I and preferably denotes alkyl having 1 to 7 C atoms or alkenyl having 2 to 7 C atoms.

The media preferably comprise one or more compounds of formula I-3, which are preferably selected from the group of the compounds of the formulae I-3a to I-3d, particularly preferably of formula I-3b:

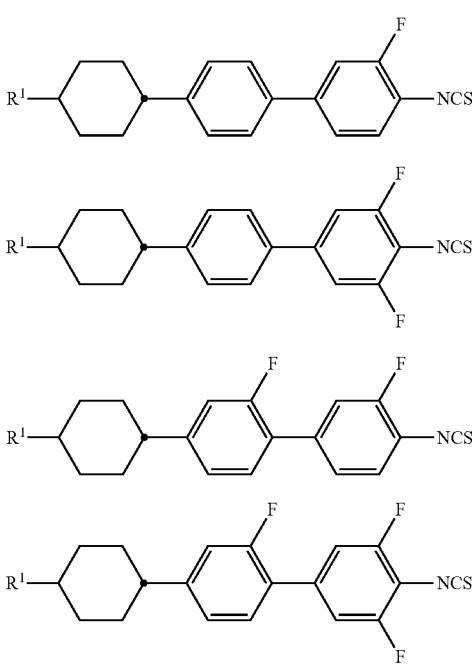

I-3a

I-3b

I-3c

I-3d in which R¹ has the meaning indicated above for formula I and preferably denotes alkyl having 1 to 7 C atoms or alkenyl having 2 to 7 C atoms.

The media preferably comprise one or more compounds of formula I-4, which are preferably selected from the group of the compounds of the formulae I-4a to I-4e, particularly preferably of formula I-4b:

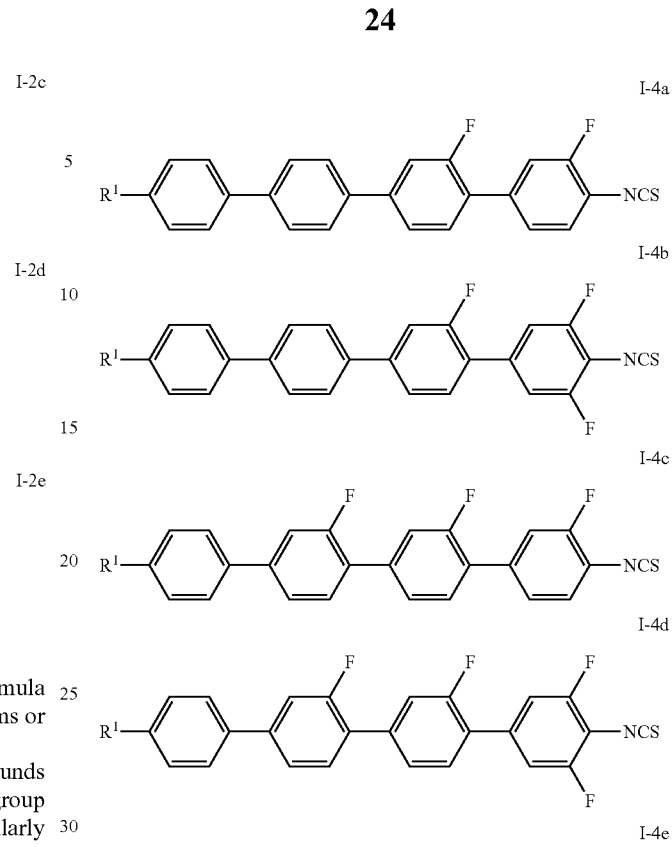

I-4a

I-4b

I-4c

I-4d

I-4e in which R¹ has the meaning indicated above for formula I and preferably denotes alkyl having 1 to 7 C atoms or alkenyl having 2 to 7 C atoms.

The media preferably comprise one or more compounds of formula I-5, which are preferably selected from the group of the compounds of the formulae I-5a to I-5d, particularly preferably of formula I-5b:

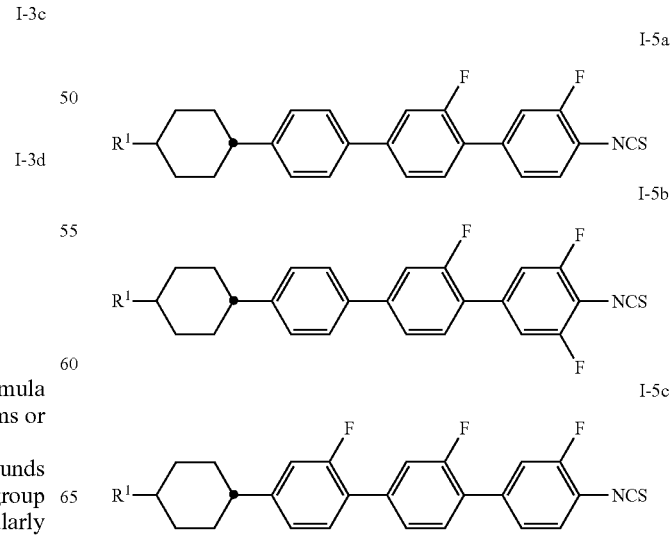

I-5a

I-5b

I-5c

-continued

I-5d

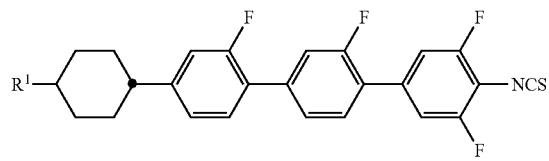

in which R¹ has the meaning indicated above for formula I and preferably denotes alkyl having 1 to 7 C atoms or alkenyl having 2 to 7 C atoms.

The media preferably comprise one or more compounds of formula II, which are preferably selected from the group of the compounds of the formulae II-1 to II-3, very preferably selected from the group of the compounds of the formulae II-1 and II-2:

II-1

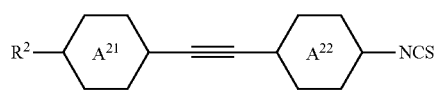

II-2

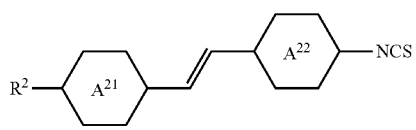

II-3

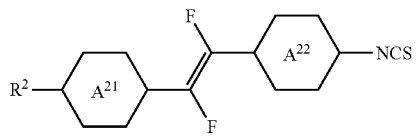

in which the occurring groups have the meanings given under formula II above and preferably R² denotes H, alkyl or alkoxy having 1 to 7 C atoms or alkenyl having 2 to 7 C atoms, and one of

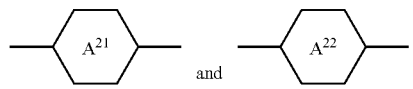

and denotes

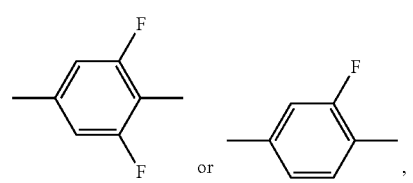

and the other, independently denotes

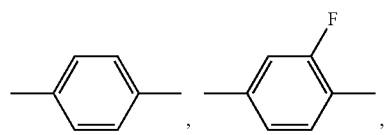

-continued

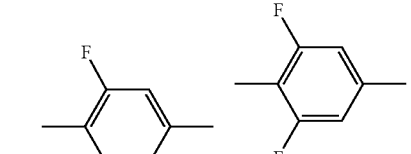

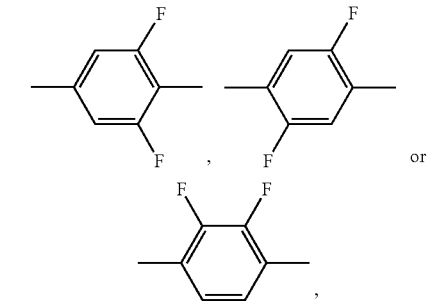

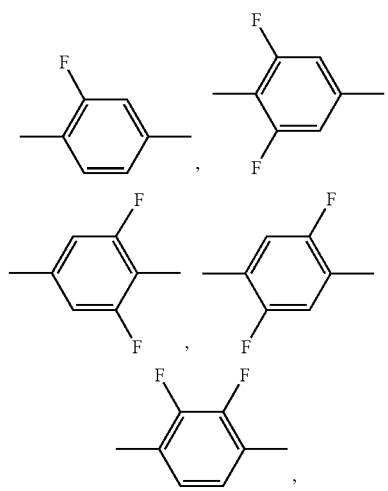

or preferably

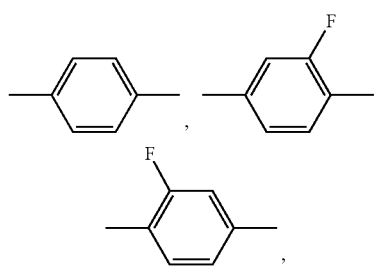

most preferably

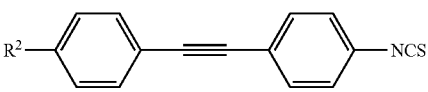

and preferably

R² denotes $C_nH_{2n+1}$ or $CH_2=CH-(CH_2)_z$, and n denotes an integer in the range from 0 to 15, preferably in the range from 1 to 7 and particularly preferably 1 to 5, and z denotes 0, 1, 2, 3 or 4, preferably 0 or 2.

The compounds of formula II-1 are preferably selected from the group of the compounds of the formulae II-1a to II-1f:

II-1a

II-1b

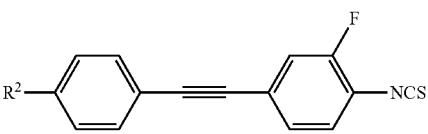

-continued

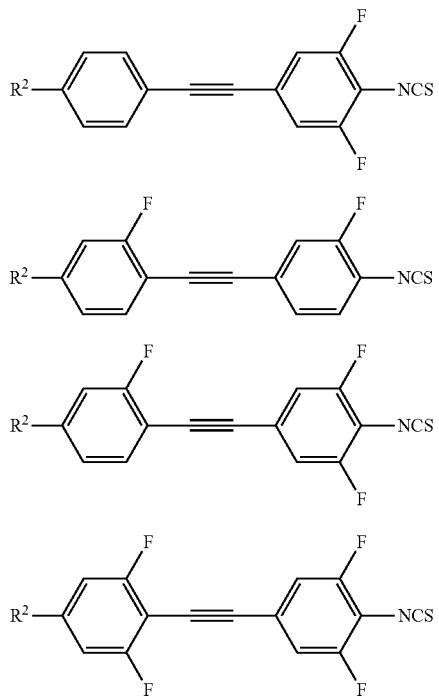

in which
R² has the meaning indicated above and preferably denotes $C_nH_{2n+1}$ or $CH_2=CH-(CH_2)_z$, and
n independently of one another, denote an integer in the range from 0 to 15, preferably in the range from 1 to 7 and particularly preferably 1 to 5, and
z denotes 0, 1, 2, 3 or 4, preferably 0 or 2.

The compounds of formula II-2 are preferably selected from the group of the compounds of the formulae II-2a and II-2b:

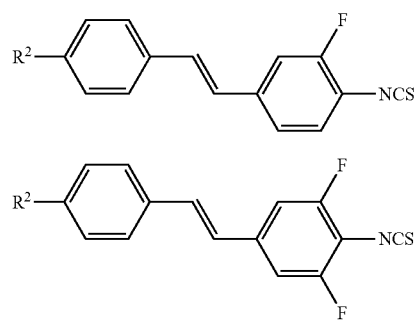

in which
R² has the meaning indicated above and preferably denotes $C_nH_{2n+1}$ or $CH_2=CH-(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The compounds of formula II-3 are preferably selected from the group of the compounds of the of formulae II-3a to II-3d:

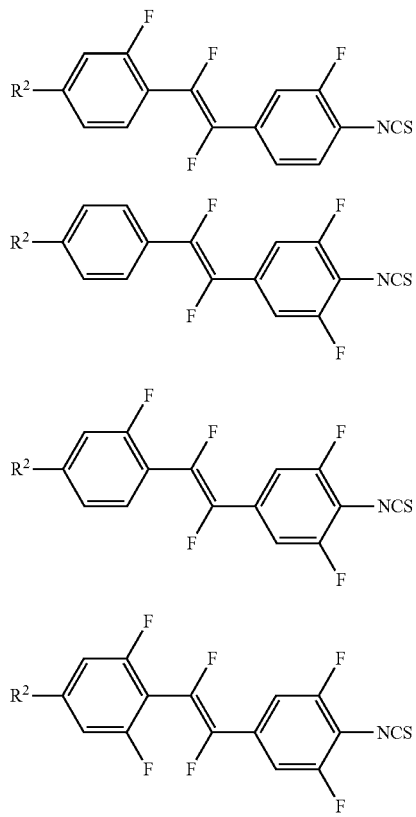

in which
R² has the meaning indicated above and preferably denotes $C_nH_{2n+1}$ or $CH_2=CH-(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The compounds of formula III are preferably selected from the group of the compounds of the formulae III-1 to III-6, more preferably of the formulae selected from the group of the compounds of the formulae III-1, III-2, III-3 and III-4, and particularly preferably of formula III-1:

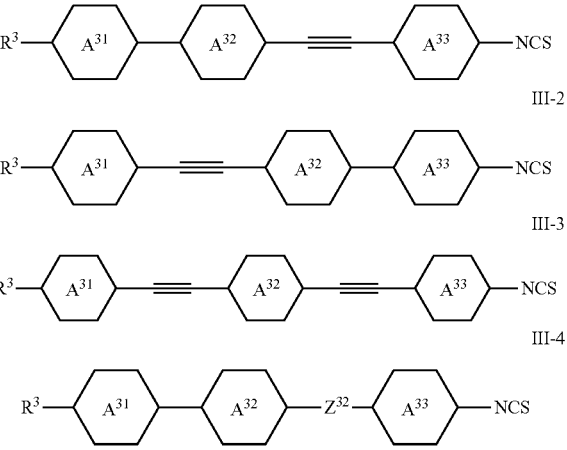

-continued

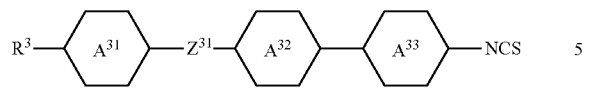
III-5

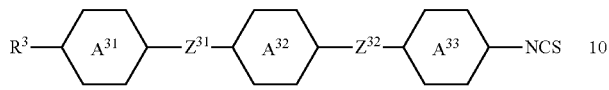
III-6 in which $Z^{31}$ and $Z^{32}$ independently of one another denote trans-CH=CH— or trans-CF=CF—, and in formula III-6 alternatively one of $Z^{31}$ and $Z^{32}$ may denote —C≡C— and the other groups have the meaning given above under formula III, and preferably $R^3$ denotes H, alkyl or alkoxy having 1 to 7 C atoms or alkenyl having 2 to 7 C atoms, and one of

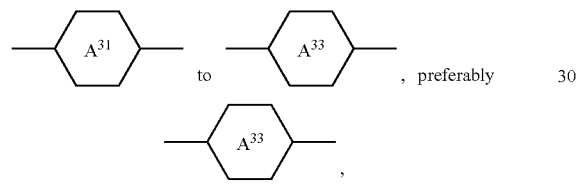

denotes

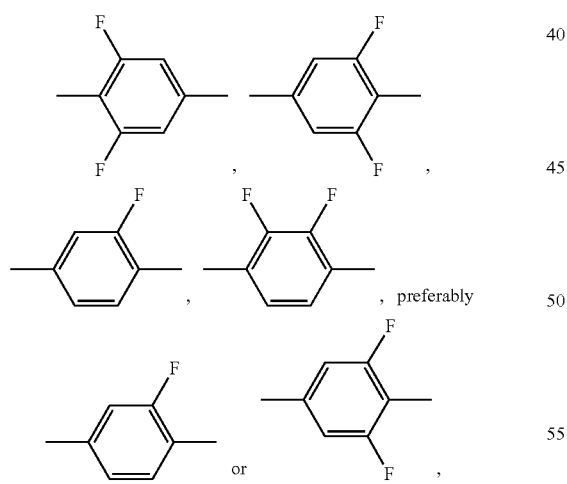

and the others, independently of one another, denote

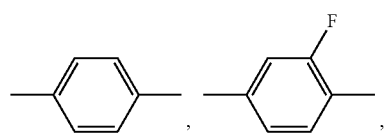

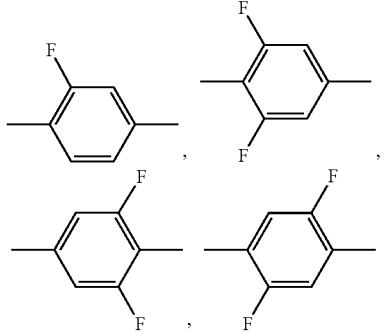

or preferably

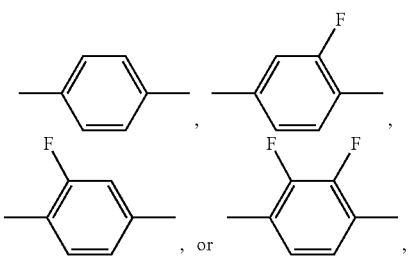

more preferably

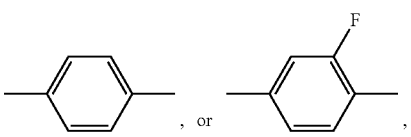

where

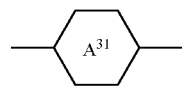

alternatively denotes

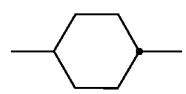

and preferably $R^3$ denotes $C_nH_{2n+1}$ or $CH_2=CH—(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III-1 are preferably selected from the group of the compounds of the formulae III-1a to III-1l, more preferably selected from the group of the compounds of the formulae III-1a, III-1b, III-1 h and III-1i, particularly preferably of formula III-1b and/or III-1h:

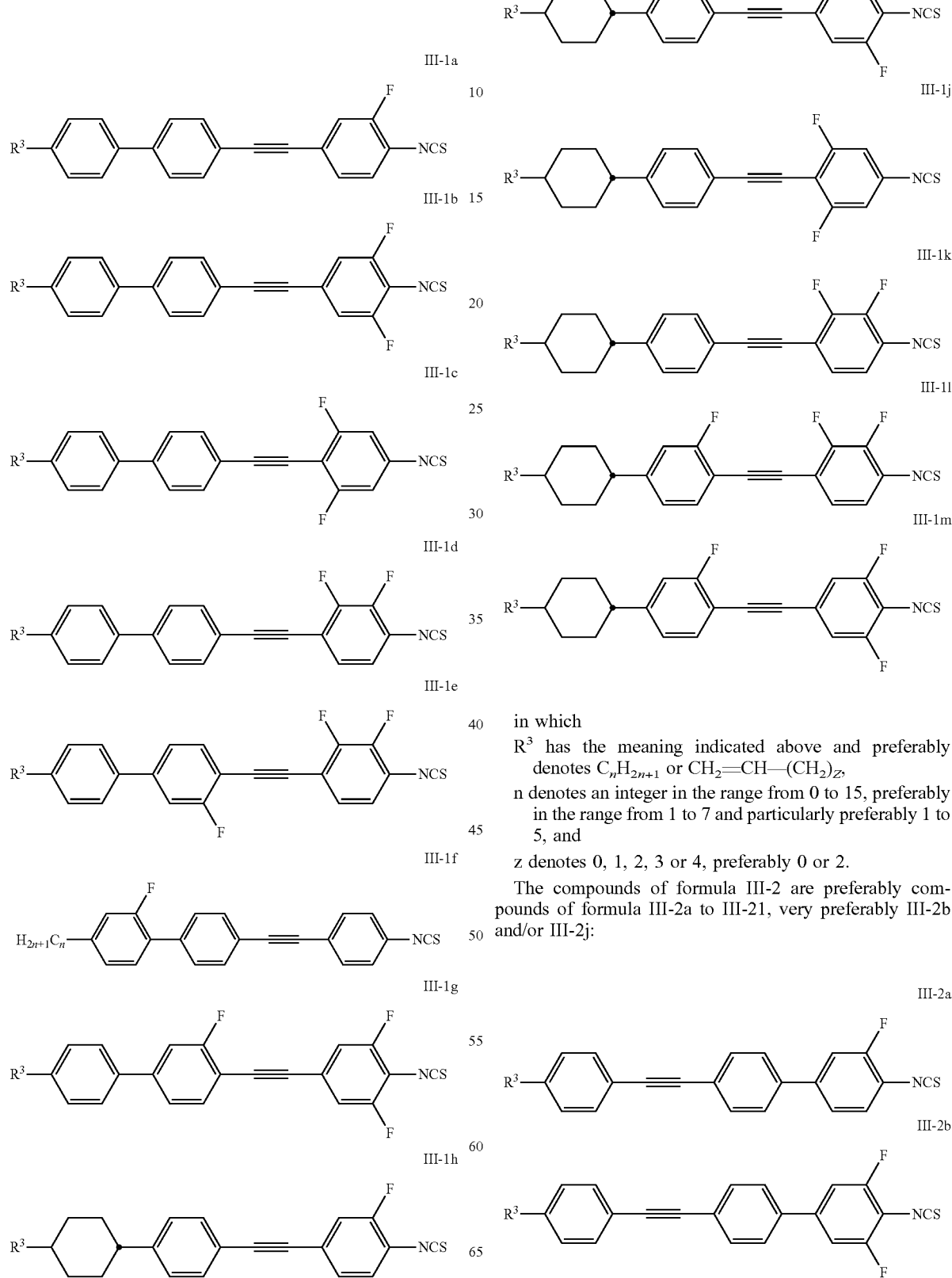

in which

R³ has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula III-2 are preferably compounds of formula III-2a to III-2l, very preferably III-2b and/or III-2j:

III-2c
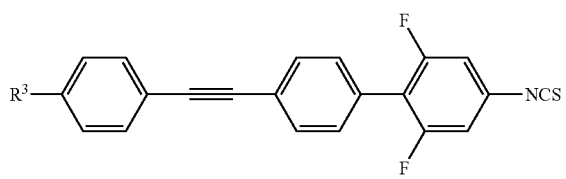

III-2d
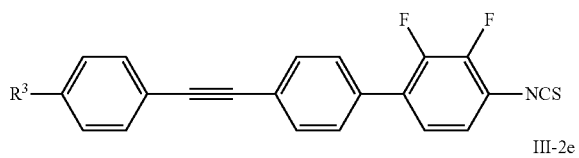

III-2e
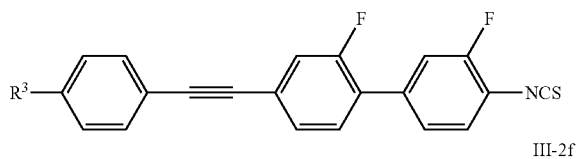

III-2f
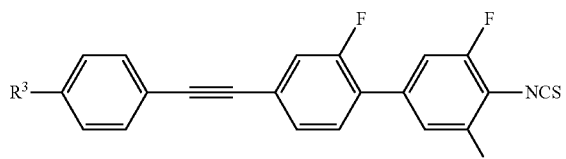

III-2g
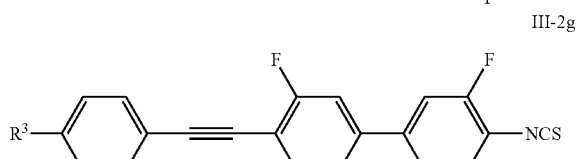

III-2h
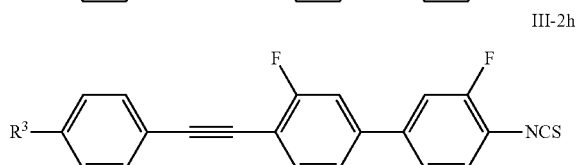

III-2i
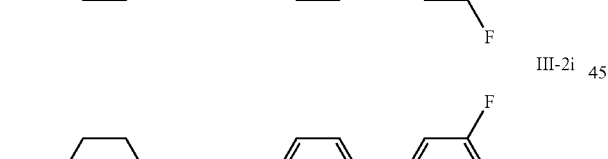

III-2j
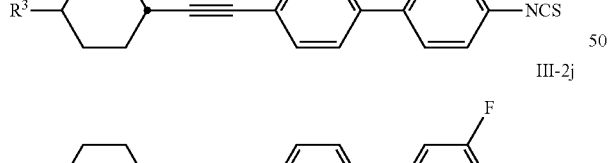

III-2k
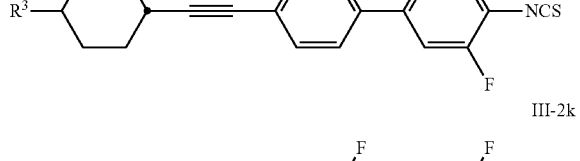

III-2l
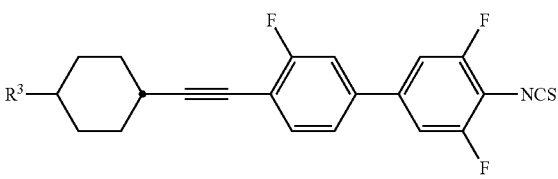

in which $R^3$ has the meaning indicated above and preferably denotes $C_nH_{2n+1}$ or $CH_2\!=\!CH\!-\!(CH_2)_Z$ or cyclic alkyl having 3 to 10 C atoms, n denotes an integer in the range from 0 to 15, preferably in the range from 1 to 7 and particularly preferably 1 to 5, and z denotes 0, 1, 2, 3 or 4, preferably 0 or 2.

Very preferably, the medium comprises one or more compounds of the formula III-2j selected from the following sub-formulae III-2j-1 to III-2j-15:

III-2j-1

III-2j-2

III-2j-3

III-2j-4

III-2j-5

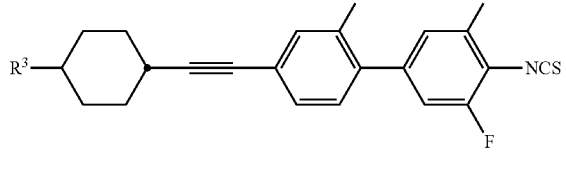

III-2j-6
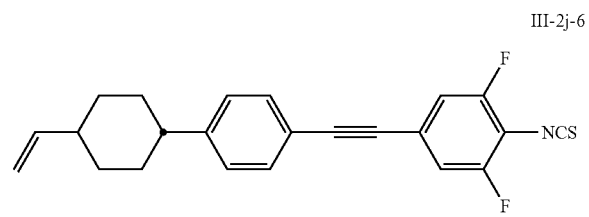

III-2j-7
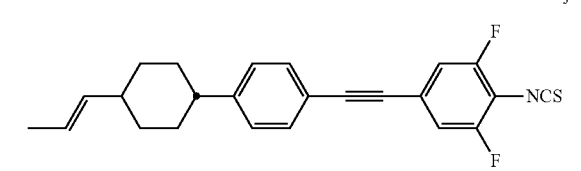

III-2j-8
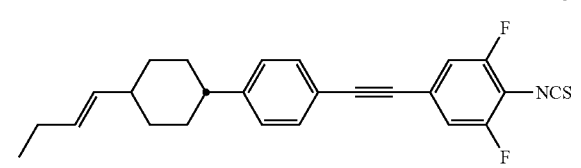

III-2j-9
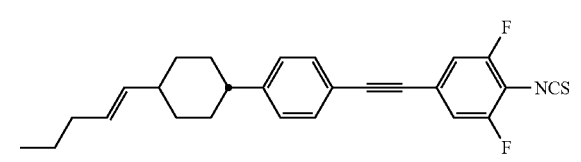

III-2j-10
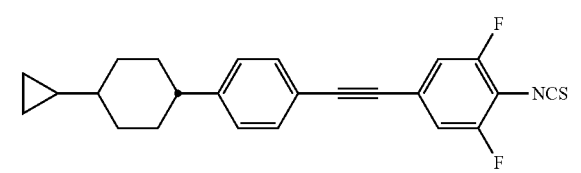

III-2j-11
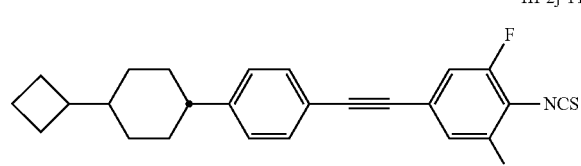

III-2j-12
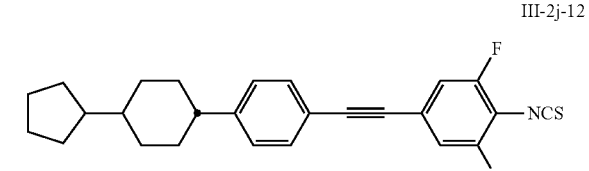

III-2j-13
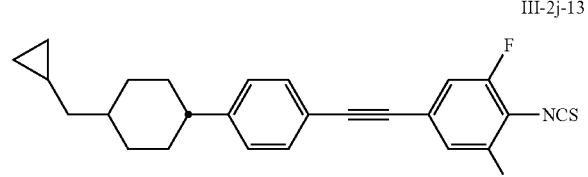

III-2j-14
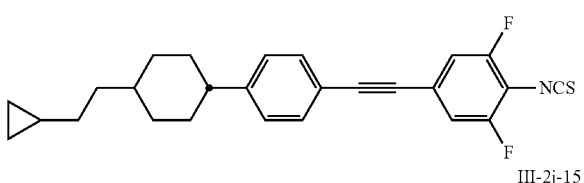

III-2j-15
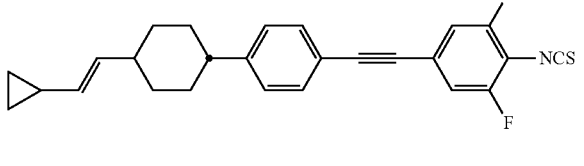

The compounds of formula III-5 are preferably selected from the compounds of formula III-5a:

III-5a
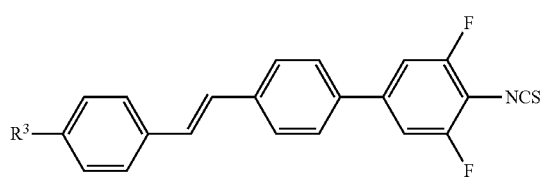

$R^3$ has the meaning indicated above for formula III-5 and preferably denotes $C_nH_{2n+1}$, in which n denotes an integer in the range from 0 to 7, preferably in the range from 1 to 5.

The compounds of formula III-6 are preferably selected from the compounds of the formulae III-6a to III-6l III-6a
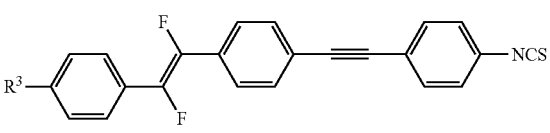

III-6b
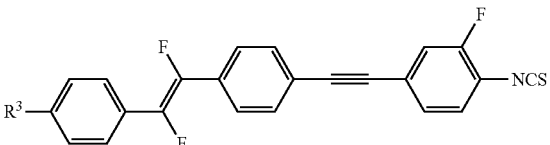

III-6c
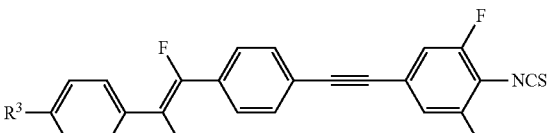

III-6d
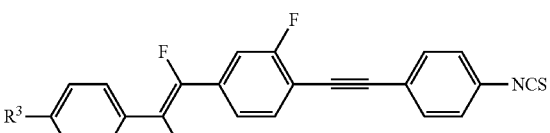

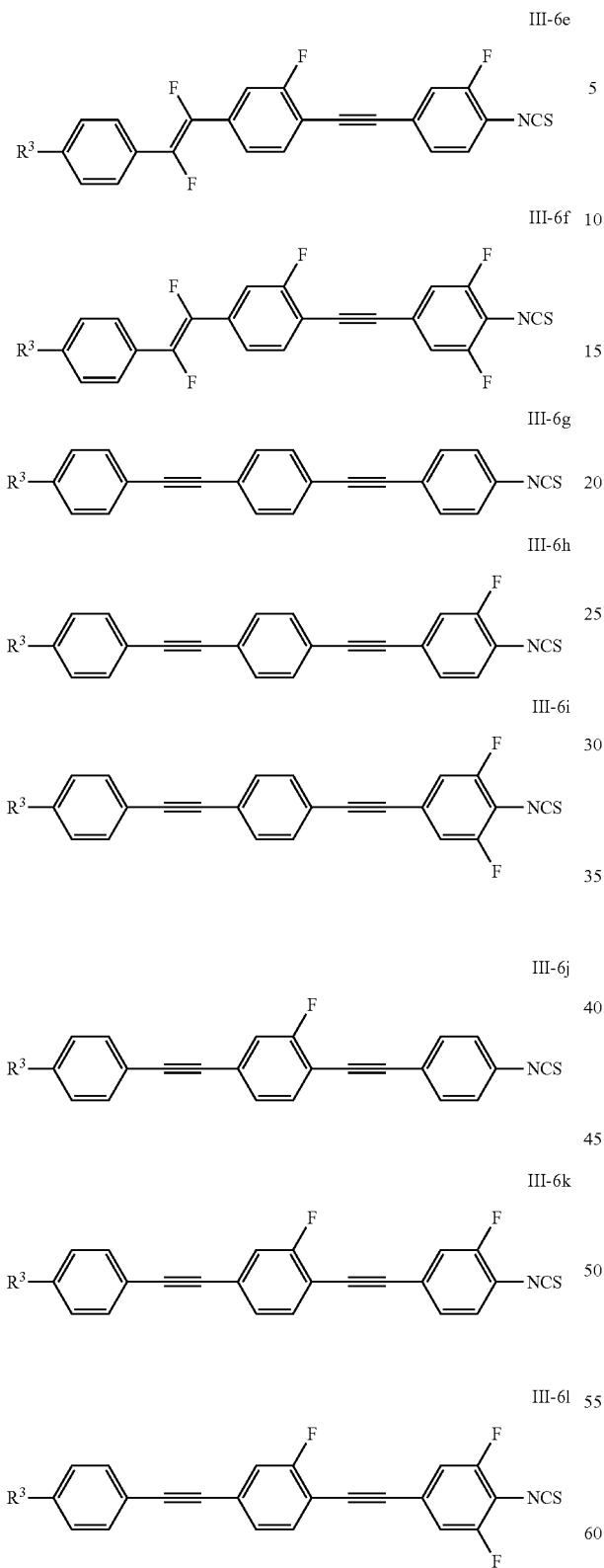
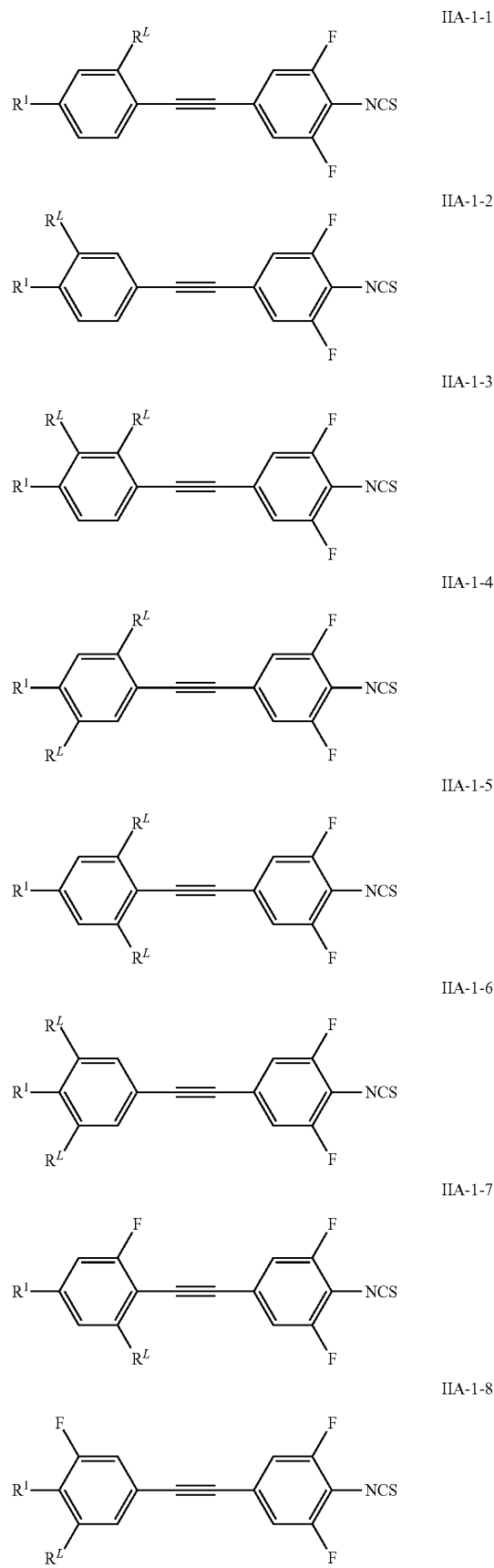
In a preferred embodiment, the media according to the invention comprise one or more compounds selected from the group of compounds of the formulae IIA-1-1 to IIA-1-12, very preferably IIA-1-1 or IIA-1-2:

-continued

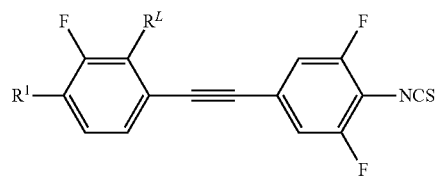
IIIA-1-9

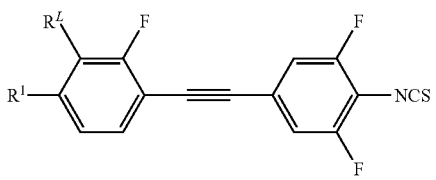
IIIA-1-10

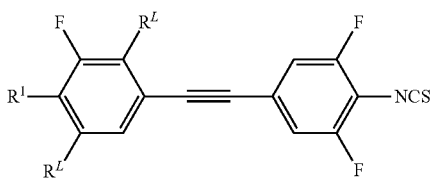
IIIA-1-11

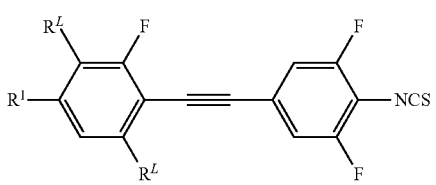
IIIA-1-12 in which
R¹ denotes alkyl or alkenyl having up to 7 C atoms, preferably ethyl, n-propyl, n-butyl or n-pentyl, n-hexyl,
$R^L$ on each occurrence, the same or differently, denotes alkyl or alkenyl having 1 to 5 C atoms, or cycloalkyl or cycloalkenyl each having 3 to 6 C atoms, preferably methyl, ethyl, n-propyl, n-butyl, isopropyl, cyclopropyl, cyclobutyl, cyclopentyl or cyclopent-1-enyl, very preferably ethyl,
and from which the compounds of formula II-1 are excluded.

Additionally, the liquid-crystalline media according to the present invention in a certain embodiment, which may be the same or different from the previous preferred embodiments preferably comprise one or more compounds of formula IV,

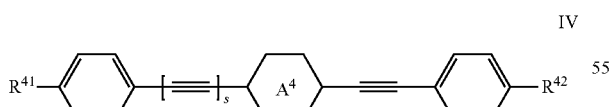
IV in which

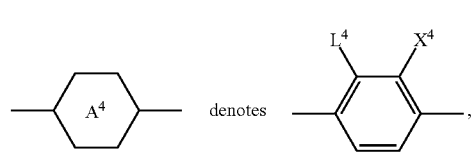

-continued

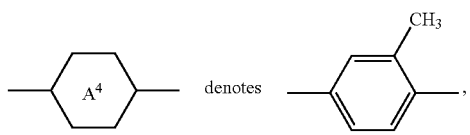

s is 0 or 1, preferably 1, and
preferably

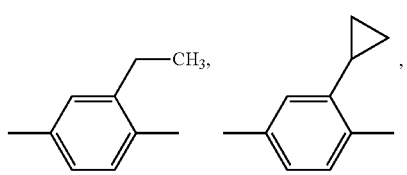

particularly preferably

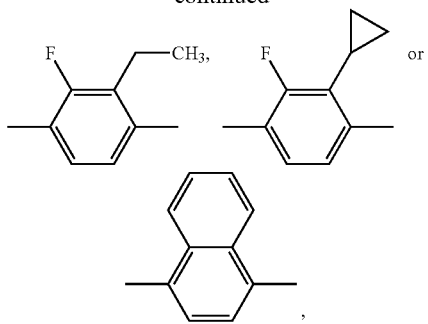

$L^4$ denotes H or alkyl having 1 to 6 C atoms, cycloalkyl having 3 to 6 C atoms or cycloalkenyl having 4 to 6 C atoms, preferably $CH_3$, $C_2H_5$, n-$C_3H_7$, i-$C_3H_7$, cyclopropyl, cyclobutyl, cyclohexyl, cyclopent-1-enyl or cyclohex-1-enyl, and particularly preferably $CH_3$, $C_2H_5$, cyclopropyl or cyclobutyl, $X^4$ denotes H, alkyl having 1 to 3 C atoms or halogen, preferably H, F or Cl, more preferably H or F and very particularly preferably F, $R^{41}$ to $R^{44}$, independently of one another, denote alkyl or alkoxy, each having 1 to 15 C atoms, alkenyl, alkenyloxy or alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, and alternatively one of $R^{43}$ and $R^{44}$ or both also denote H, preferably $R^{41}$ and $R^{42}$, independently of one another, denote alkyl or alkoxy, each having 1 to 7 C atoms, or alkenyl, alkenyloxy or alkoxyalkyl, each having 2 to 7 C atoms, particularly preferably $R^{41}$ denotes alkyl having 1 to 7 C atoms or alkenyl, alkenyloxy or alkoxyalkyl, each having 2 to 7 C atoms, and particularly preferably $R^{42}$ denotes alkyl or alkoxy, each having 1 to 7 C atoms, and preferably $R^{43}$ and $R^{44}$ denote H, alkyl having 1 to 5 C atoms, cycloalkyl or cycloalkenyl having 3 to 7 C atoms, alkylcycloalkyl or cycloalkylalkyl, each having 4 to 12 C atoms, or alkylcycloalkylalkyl having 5 to 15 C atoms, particularly preferably cyclopropyl, cyclobutyl or cyclohexyl, and very particularly preferably at least one of $R^{43}$ and $R^{44}$ denotes n-alkyl, particularly preferably methyl, ethyl or n-propyl, and the other denotes H or n-alkyl, particularly preferably H, methyl, ethyl or n-propyl.

In a preferred embodiment of the present invention, the liquid-crystal medium additionally comprises one or more compounds selected from the group of compounds of the formulae V, VI, VII, VIII and IX:

V

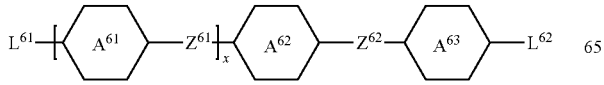

VI

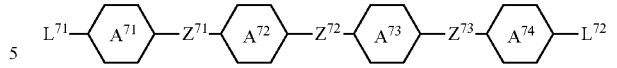

VII

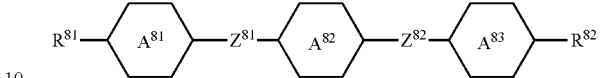

VIII

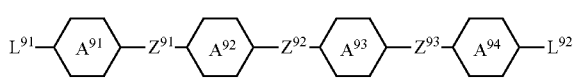

IX in which $L^{51}$ denotes $R^{51}$ or $X^{51}$, $L^{52}$ denotes $R^{52}$ or $X^{52}$, $R^{51}$ and $R^{52}$, independently of one another, denote H, alkyl or alkoxy having 1 to 12, preferably 2 to 7, C atoms or alkenyl, alkenyloxy or alkoxyalkyl having 2 to 15, preferably 2 to 7, C atoms, preferably alkyl or alkenyl, $X^{51}$ and $X^{52}$, independently of one another, denote H, F, Cl, —CN, $SF_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F or Cl, and

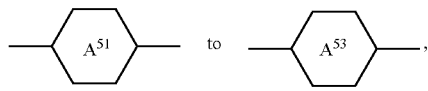

independently of one another, denote

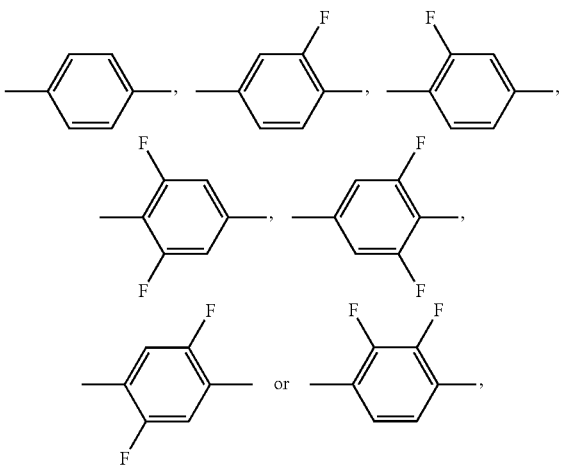

preferably

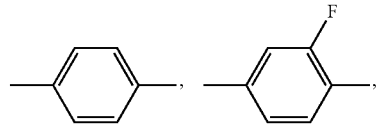

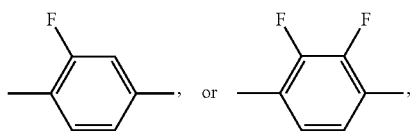

L$^{61}$ denotes R$^{61}$ and, in the case where Z$^{61}$ and/or Z$^{62}$ denote trans-CH=CH— or trans-CF=CF—, alternatively also denotes X$^{61}$, L$^{62}$ denotes R$^{62}$ and, in the case where Z$^{61}$ and/or Z$^{62}$ denote trans-CH=CH— or trans-CF=CF—, alternatively also denotes X$^{62}$, R$^{61}$ and R$^{62}$, independently of one another, denote H, alkyl or alkoxy having 1 to 12, preferably 2 to 7, C atoms or alkenyl, alkenyloxy or alkoxyalkyl having 2 to 15, preferably 2 to 7, C atoms, preferably alkyl or alkenyl, X$^{61}$ and X$^{62}$, independently of one another, denote F or Cl, —CN, SF$_5$, fluorinated alkyl or alkoxy having 1 to 7 C atoms or fluorinated alkenyl, alkenyloxy or alkoxyalkyl having 2 to 7 C atoms, one of Z$^{61}$ and Z$^{62}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

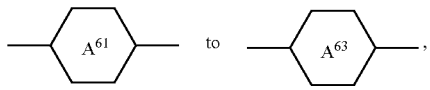

independently of one another, denote

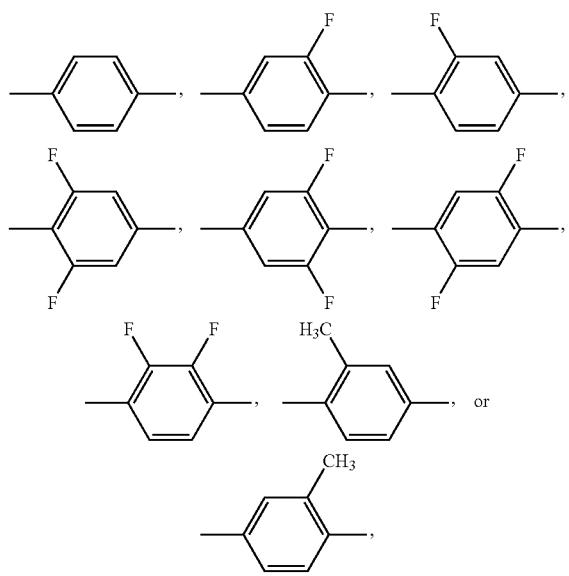

preferably

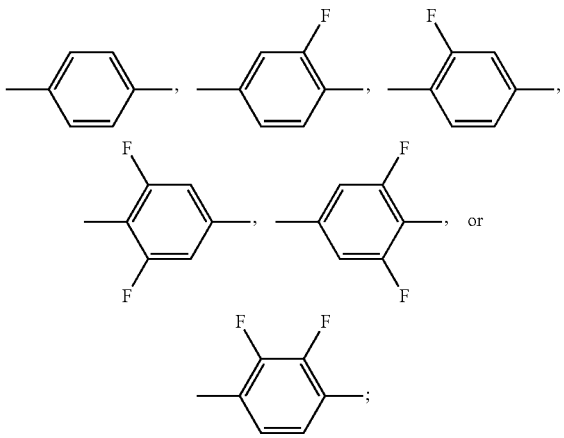

and x denotes 0 or 1;

L$^{71}$ denotes R$^{71}$ or X$^{71}$,

L$^{72}$ denotes R$^{72}$ or X$^{72}$,

R$^{71}$ and R$^{72}$, independently of one another, denote H, alkyl or alkoxy having 1 to 12, preferably 2 to 7, C atoms or alkenyl, alkenyloxy or alkoxyalkyl having 2 to 15, preferably 2 to 7, C atoms, preferably alkyl or alkenyl, X$^{71}$ and X$^{72}$, independently of one another, denote H, F, Cl, —CN, —NCS, —SF$_5$, fluorinated alkyl or fluorinated alkoxy having 1 to 7 C atoms or fluorinated alkenyl, or fluorinated alkenyloxy or fluorinated alkoxyalkyl having 2 to 7 C atoms, preferably fluorinated alkoxy, fluorinated alkenyloxy, F or Cl, and Z$^{71}$ to Z$^{73}$, independently of one another, denote trans-CH=CH—, trans-CF=CF—, —C≡C— or a single bond, preferably one or more of them denote a single bond, particularly preferably all denote a single bond and

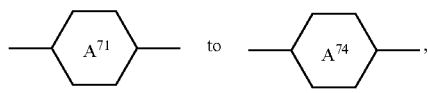

independently of one another, denote

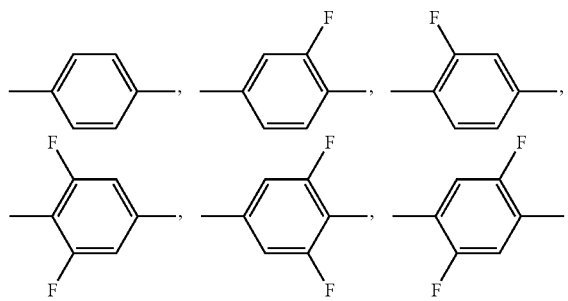

or

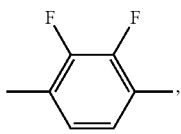, preferably

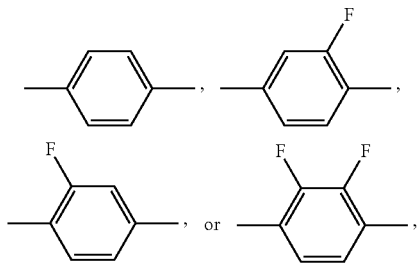

$R^{81}$ and $R^{82}$, independently of one another, denote H, alkyl or alkoxy having 1 to 15, preferably 2 to 7, C atoms or alkenyl, alkenyloxy or alkoxyalkyl having 2 to 15, preferably 2 to 7, C atoms, preferably alkyl or alkenyl, one of $Z^{81}$ and $Z^{82}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

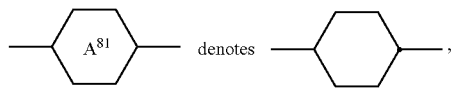

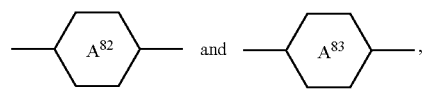

independently of one another, denote

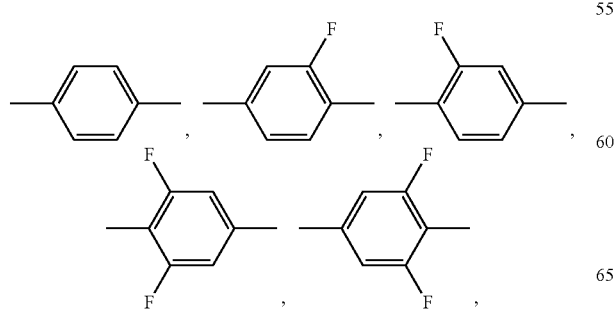

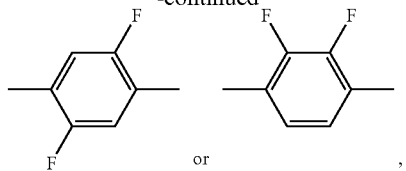

$L^{91}$ denotes $R^{91}$ or $X^{91}$,
$L^{92}$ denotes $R^{92}$ or $X^{92}$,
$R^{91}$ and $R^{92}$, independently of one another, denote H, alkyl or alkoxy having 1 to 15, preferably 2 to 7, C atoms or alkenyl, alkenyloxy or alkoxyalkyl having 2 to 15, preferably 2 to 7, C atoms, preferably alkyl or alkenyl,
$X^{91}$ and $X^{92}$, independently of one another, denote H, F, Cl, —CN, —NCS, —SF$_5$, fluorinated alkyl or fluorinated alkoxy having 1 to 7 C atoms or fluorinated alkenyl, or fluorinated alkenyloxy or fluorinated alkoxyalkyl having 2 to 7 C atoms, preferably fluorinated alkoxy, fluorinated alkenyloxy, F or Cl, and
$Z^{91}$ to $Z^{93}$, independently of one another, denote trans-CH=CH—, trans-CF=CF—, —C≡C— or a single bond, preferably one or more of them denotes a single bond, and particularly preferably all denote a single bond,

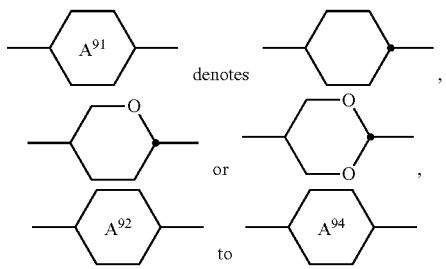

independently of one another, denote

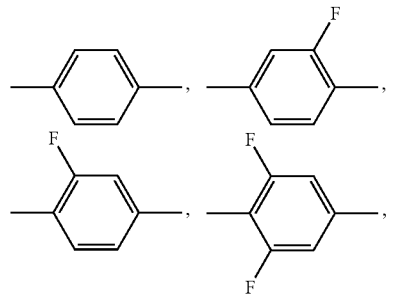

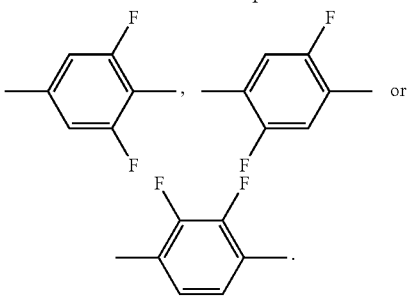.

In a preferred embodiment of the present invention, the liquid-crystal medium comprises one or more compounds of the formula V, preferably selected from the group of the compounds of the formulae V-1 to V-3, preferably of the formulae V-1 and/or V-2 and/or V-3, preferably of the formulae V-1 and V-2:

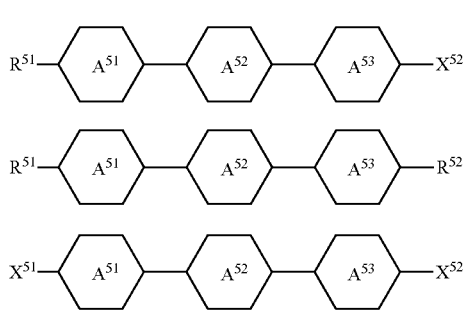

in which the occurring groups have the respective meanings indicated above for formula V and preferably
$R^{51}$ denotes alkyl having 1 to 7 C atoms or alkenyl having 2 to 7 C atoms,
$R^{52}$ denotes alkyl having 1 to 7 C atoms or alkenyl having 2 to 7 C atoms or alkoxy having 1 to 7 C atoms,
$X^{51}$ and $X^{52}$, independently of one another, denote F, Cl, —OCF$_3$, —CF$_3$, —CN or —SF$_5$, preferably F, Cl, —OCF$_3$ or —CN.

The compounds of the formula V-1 are preferably selected from the group of the compounds of the formulae V-1a to V-1d, preferably V-1c and V-1d:

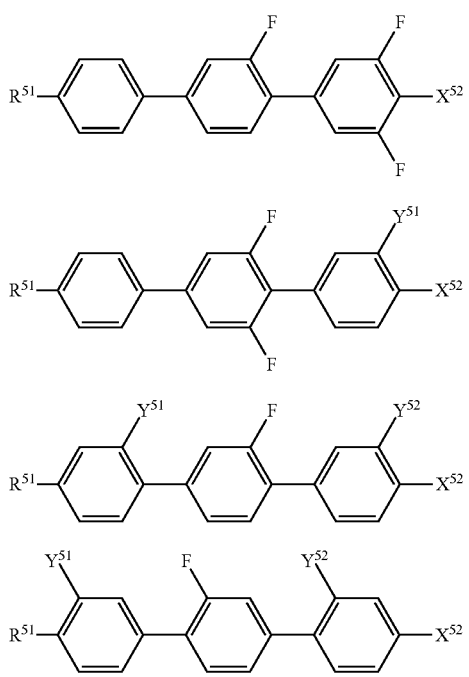

in which the parameters have the respective meanings indicated above for formula V-1 and in which
$Y^{51}$ and $Y^{52}$, in each case independently of one another, denote H or F, and preferably $R^{51}$ denotes alkyl or alkenyl, and
$X^{51}$ denotes F, Cl or —OCF$_3$.

The compounds of the formula V-2 are preferably selected from the group of the compounds of the formulae V-2a to V-2e and/or from the group of the compounds of the formulae V-2f and V-2g:

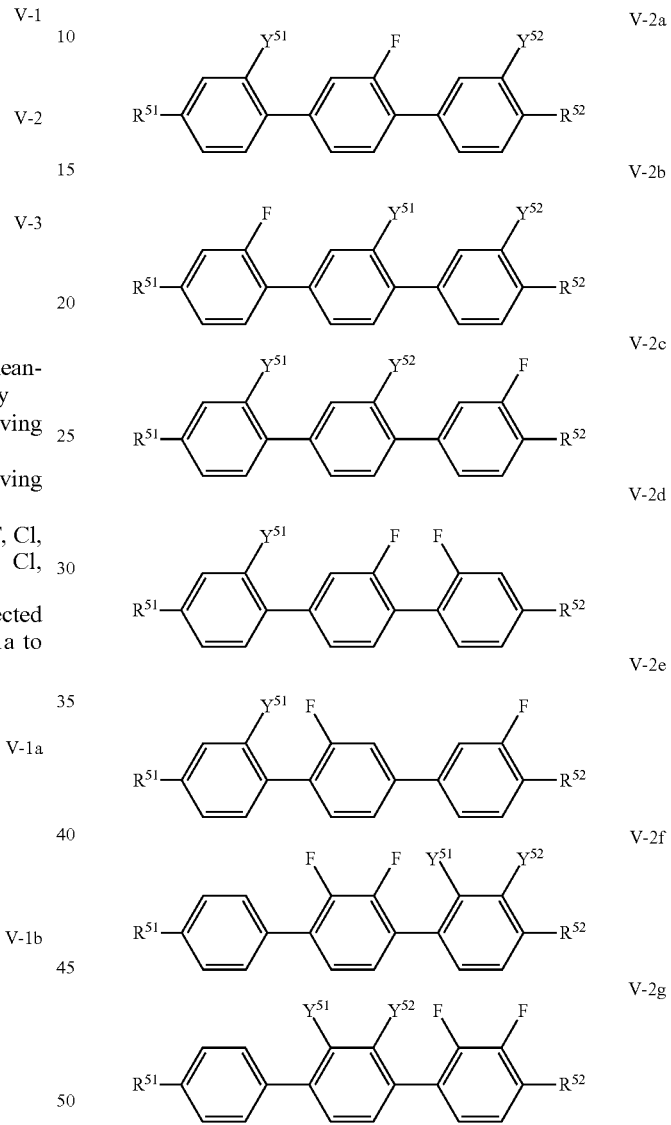

where in each case the compounds of the formula V-2a are excluded from the compounds of the formulae V-2b and V-2c, the compounds of the formula V-2b are excluded from the compounds of the formula V-2c and the compounds of the formula V-2f are excluded from the compounds of the formula V-2g, and in which the parameters have the respective meanings indicated above for formula V-1 and in which
$Y^{51}$ and $Y^{52}$, in each case independently of one another, denote H or F, and preferably
$Y^{51}$ and $Y^{52}$ denotes H and the other denotes H or F, preferably likewise denotes H.

The compounds of the formula V-3 are preferably compounds of the formula V-3a:

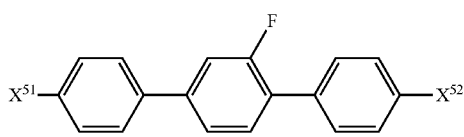

V-3a in which the parameters have the respective meanings indicated above for formula V-1 and in which preferably $X^{51}$ denotes F, Cl, preferably F, $X^{52}$ denotes F, Cl or —OCF$_3$, preferably —OCF$_3$.

The compounds of the formula V-1a are preferably selected from the group of the compounds of the formulae V-1a-1 and V-1a-2:

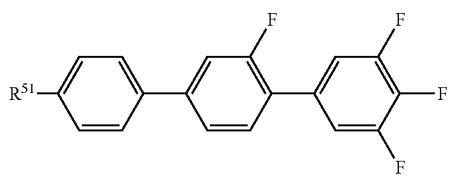

V-1a-1

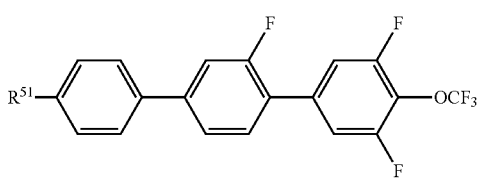

V-1a-2 in which $R^{51}$ has the meaning indicated above and preferably denotes $C_nH_{2n+1}$, in which n denotes an integer in the range from 0 to 7, preferably in the range from 1 to 5 and particularly preferably 3 or 7.

The compounds of the formula V-1b are preferably compounds of the formula V-1b-1:

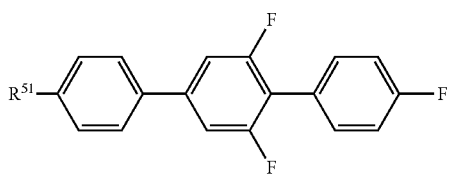

V-1b-1 in which $R^{51}$ has the meaning indicated above and preferably denotes $C_nH_{2n+1}$, in which n denotes an integer in the range from 0 to 15, preferably in the range from 1 to 7 and particularly preferably 1 to 5.

The compounds of the formula V-1c are preferably selected from the group of the compounds of the formulae V-1c-1 to V-1c-4, particularly preferably selected from the group of the compounds of the formulae V-1c-1 and V-1c-2:

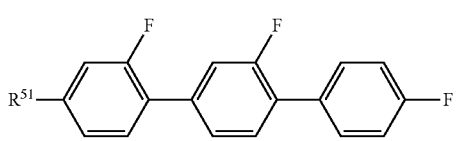

V-1c-1

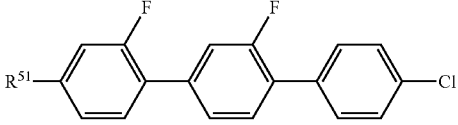

V-1c-2

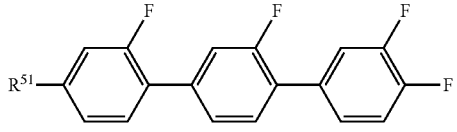

V-1c-3

V-1c-4 in which $R^{51}$ has the meaning indicated above and preferably denotes $C_nH_{2n+1}$, in which n denotes an integer in the range from 0 to 15, preferably in the range from 1 to 7 and particularly preferably 1 to 5.

The compounds of the formula V-1d are preferably selected from the group of the compounds of the formulae V-1d-1 and V-1d-2, particularly preferably the compound of the formula V-1d-2:

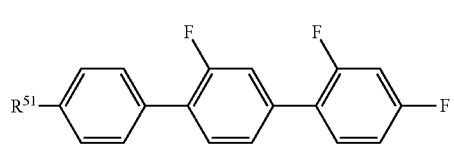

V-1d-1

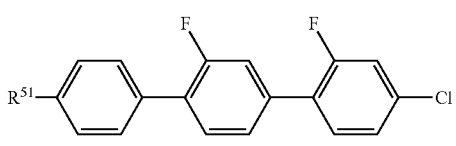

V-1d-2 in which $R^{51}$ has the meaning indicated above and preferably denotes $C_nH_{2n+1}$, in which n denotes an integer in the range from 0 to 7, preferably in the range from 2 to 6 and particularly preferably 2 to 5.

The compounds of the formula V-2a are preferably selected from the group of the compounds of the formulae V-2a-1 and V-2a-2, particularly preferably the compound of the formula V-2a-1:

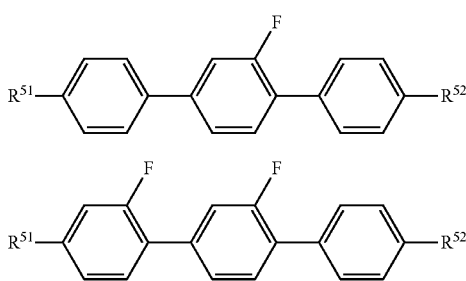

in which
R$^{51}$ has the meaning indicated above and preferably denotes $C_nH_{2n+1}$ or $CH_2=CH-(CH_2)_Z$, and
R$^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

Preferred combinations of (R$^{51}$ and R$^{52}$), in particular in the case of formula V-2a-1, are ($C_nH_{2n+1}$ and $C_mH_{2m+1}$), ($C_nH_{2n+1}$ and $O-C_mH_{2m+1}$), ($CH_2=CH-(CH_2)_Z$ and $C_mH_{2m+1}$), ($CH_2=CH-(CH_2)_Z$ and $O-C_mH_{2m+1}$) and ($C_nH_{2n+1}$ and $(CH_2)_Z-CH=CH_2$).

Preferred compounds of the formula V-2b are the compounds of the formula V-2b-1:

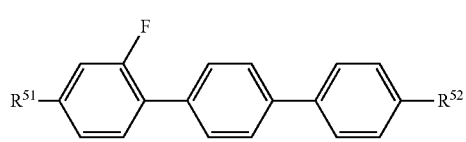

in which
R$^{51}$ has the meaning indicated above and preferably denotes $C_nH_{2n+1}$ or $CH_2=CH-(CH_2)_Z$, and
R$^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.
The preferred combination of (R$^{51}$ and R$^{52}$) here is, in particular, ($C_nH_{2n+1}$ and $C_mH_{2m+1}$).

Preferred compounds of the formula V-2c are the compounds of the formula V-2c-1:

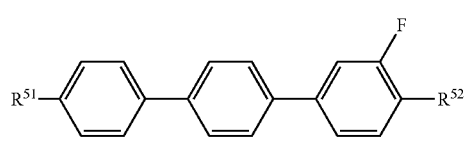

in which
R$^{51}$ has the meaning indicated above and preferably denotes $C_nH_{2n+1}$ or $CH_2=CH-(CH_2)_Z$, and
R$^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.
The preferred combination of (R$^{51}$ and R$^{52}$) here is, in particular, ($C_nH_{2n+1}$ and $C_mH_{2m+1}$).

Preferred compounds of the formula V-2d are the compounds of the formula V-2d-1:

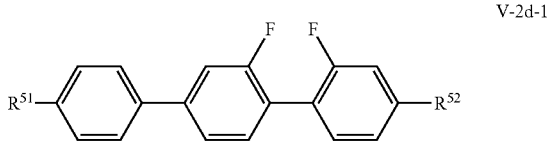

in which
R$^{51}$ has the meaning indicated above and preferably denotes $C_nH_{2n+1}$ or $CH_2=CH-(CH_2)_Z$, and
R$^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.
The preferred combination of (R$^{51}$ and R$^{52}$) here is, in particular, ($C_nH_{2n+1}$ and $C_mH_{2m+1}$).

Preferred compounds of the formula V-2e are the compounds of the formula V-2e-1:

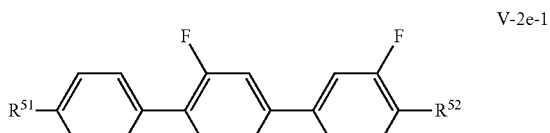

in which
R$^{51}$ has the meaning indicated above and preferably denotes $C_nH_{2n+1}$ or $CH_2=CH-(CH_2)_Z$, and
R$^{52}$ has the meaning indicated above and preferably denotes $C_mH_{2m+1}$ or $O-C_mH_{2m+1}$ or $(CH_2)_Z-CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.
The preferred combination of (R$^{51}$ and R$^{52}$) here is, in particular, ($C_nH_{2n+1}$ and $O-C_mH_{2m+1}$).

Preferred compounds of the formula V-2f are the compounds of the formula V-2f-1:

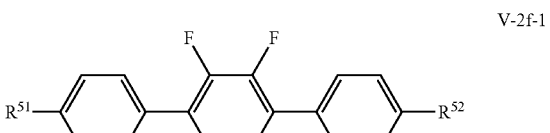

in which $R^{51}$ has the meaning indicated above and preferably denotes $C_nH_{2n+1}$ or $CH_2$=CH—$(CH_2)_z$, and $R^{52}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula V-2g are the compounds of the formula V-2g-1:

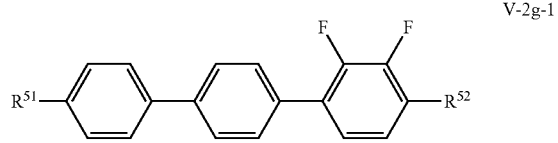

V-2g-1 in which $R^{51}$ has the meaning indicated above and preferably denotes $C_nH_{2n+1}$ or $CH_2$=CH—$(CH_2)_z$, and $R^{52}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and O—$C_mH_{2m+1}$).

The compounds of the formula VI are preferably selected from the group of the compounds of the formulae VI-1 to VI-5:

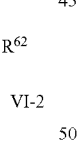

VI-1

VI-2

VI-3

VI-4

VI-5 in which $Z^{61}$ and $Z^{62}$ denote —C≡C—, trans-CH=CH— or trans-CF=CF—, preferably —C≡C— or trans-CH=CH—, and the other occurring groups and parameters have the meaning given above under formula VI, and preferably $R^{61}$ and $R^{62}$, independently of one another, denote alkyl or alkoxy having 1 to 7 C atoms or alkenyl having 2 to 7 C atoms, $X^{62}$ denotes F, Cl, —$OCF_3$ or —CN, The compounds of the formula VI-1 are preferably selected from the group of the compounds of the formulae VI-1a and VI-1b, more preferably selected from compounds of the formula VI-1a:

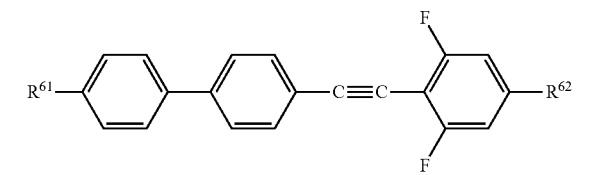

VI-1a

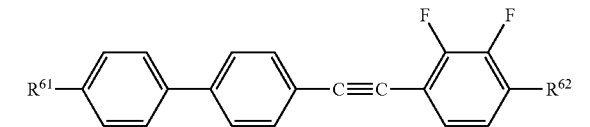

VI-1b in which $R^{61}$ has the meaning indicated above and preferably denotes $C_nH_{2n+1}$ or $CH_2$=CH—$(CH_2)_z$, and $R^{62}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{61}$ and $R^{62}$) here are, in particular, ($C_nH_{2n+1}$ and $C_mH_{2m+1}$) and ($C_nH_{2n+1}$ and O—$C_mH_{2m+1}$), in the case of formula VI-1a particularly preferably ($C_nH_{2n+1}$ and $C_mH_{2m+1}$) and in the case of formula VI-1b particularly preferably ($C_nH_{2m+1}$ and O—$C_mH_{2m+1}$).

The compounds of the formula VI-3 are preferably selected from the compounds of the formula VI-3a to VI-3e:

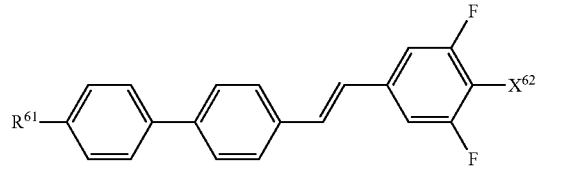

VI-3a

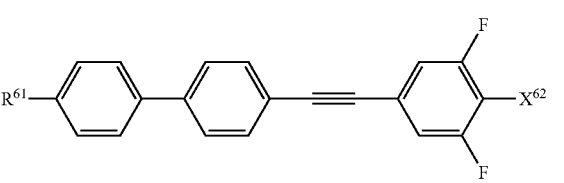

VI-3b

VI-3c
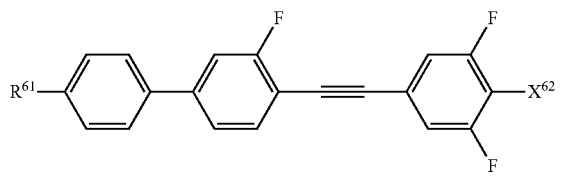

VI-3d
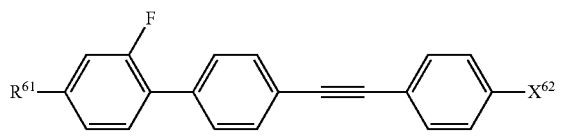

VI-3e
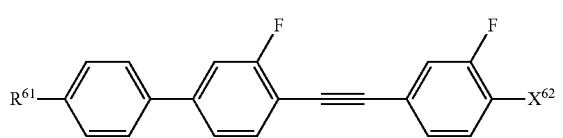

in which the parameters have the meaning given above under formula VI-3 and preferably $R^{61}$ has the meaning indicated above and preferably denotes $C_nH_{2n+1}$, in which n denotes an integer in the range from 1 to 7, preferably in the range from 2 to 5, and $X^{62}$ denotes —F, —Cl, —OCF$_3$, or —CN.

The compounds of the formula VI-4 are preferably selected from compounds of the formulae VI-4a to VI-4e:

VI-4a
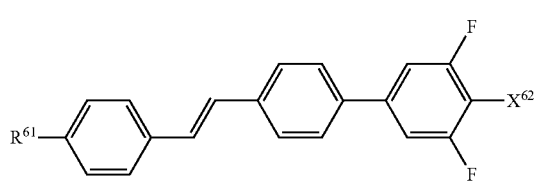

VI-4b
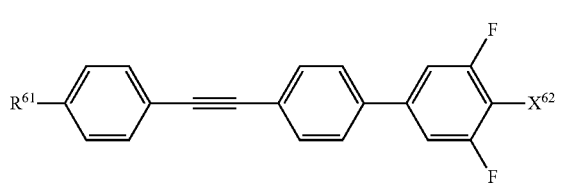

VI-4c
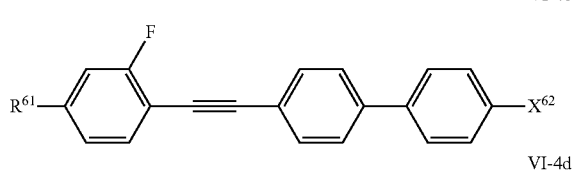

VI-4d
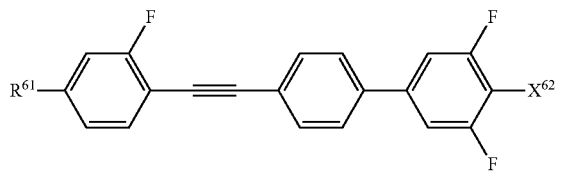

VI-4e
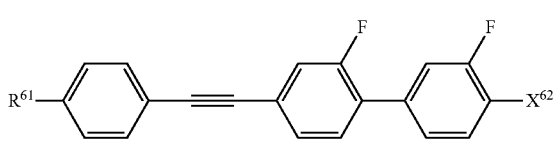

in which the parameters have the meaning given above under formula VI-4 and preferably $R^{61}$ has the meaning indicated above and preferably denotes $C_nH_{2n+1}$, in which n denotes an integer in the range from 1 to 7, preferably in the range from 2 to 5, and $X^{62}$ denotes F, Cl, OCF$_3$, or —CN.

The compounds of the formula VI-5 are preferably selected from the compounds of the formulae VI-5a to VI-5d, preferably VI-5b:

VI-5a

VI-5b
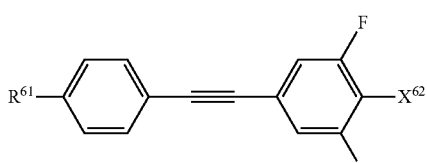

VI-5c
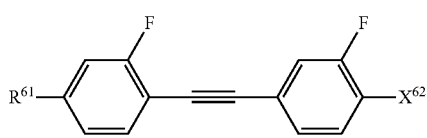

VI-5d
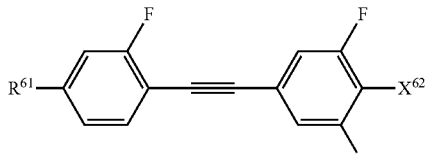

in which the parameters have the meaning given above under formula VI-5 and preferably $R^{61}$ has the meaning indicated above and preferably denotes $C_nH_{2n+1}$, in which n denotes an integer in the range from 1 to 7, preferably in the range from 2 to 5, and $X^{62}$ denotes —F, —Cl, —OCF$_3$, or —CN, particularly preferably —OCF$_3$.

The compounds of the formula VII are preferably selected from the group of the compounds of the formulae VII-1 to VII-6:

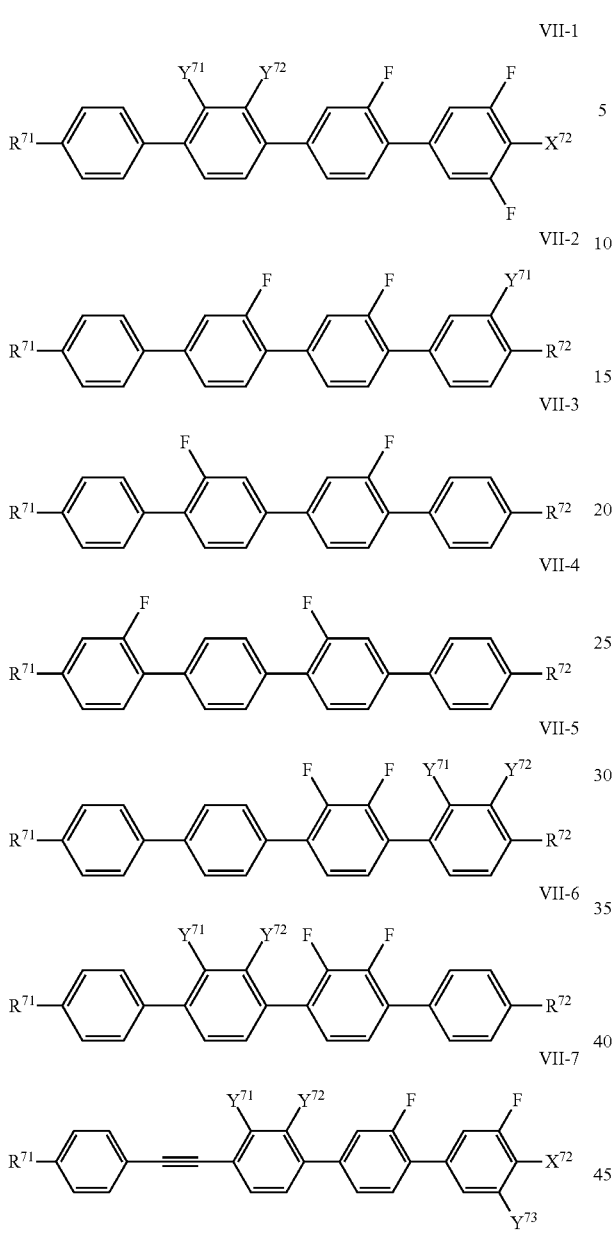

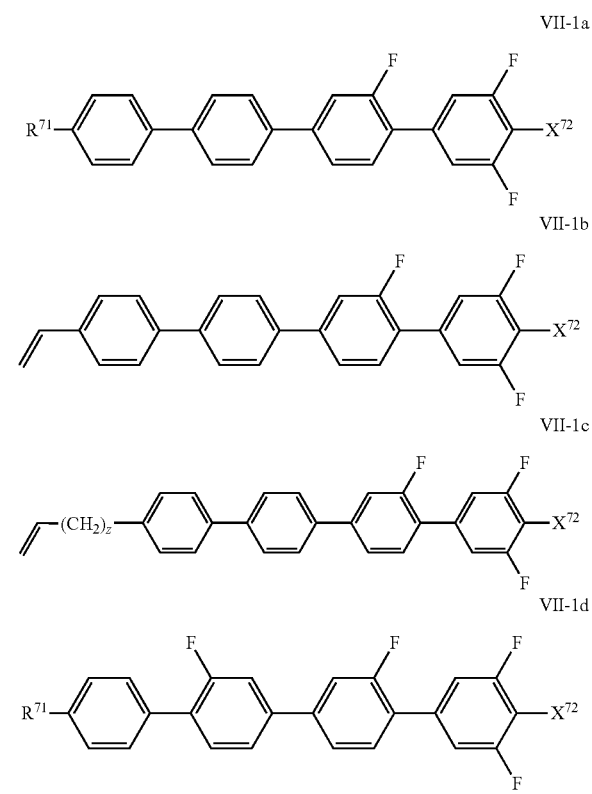

where the compounds of the formula VII-5 are excluded from the compounds of the formula VII-6, and
in which the parameters have the respective meanings indicated above for formula VII,
$Y^{71}$, $Y^{72}$, $Y^{73}$ independently from one another, denote H or F,
and preferably
$R^{71}$ denotes alkyl or alkoxy, each having 1 to 7 C atoms, or alkenyl having 2 to 7 C atoms,
$R^{72}$ denotes alkyl or alkoxy, each having 1 to 7 C atoms, or alkenyl having 2 to 7 C atoms,
$X^{72}$ denotes F, Cl; NCS or —OCF$_3$, preferably F or NCS, and
particularly preferably
$R^{71}$ has the meaning indicated above and preferably denotes $C_nH_{2n+1}$ or $CH_2$=CH—$(CH_2)_Z$, and
$R^{72}$ has the meaning indicated above and preferably denotes $C_mH_{2m+1}$ or O—$C_mH_{2m+1}$ or $(CH_2)_Z$—CH=CH$_2$, and in which n and m, independently of one another, denote an integer in the range from 1 to 7, preferably in the range from 2 to 6 and particularly preferably 2 to 5, and
z denotes 0, 1, 2, 3 or 4, preferably 0 or 2.

The compounds of the formula VII-1 are preferably selected from the group of the compounds of the formulae VII-1a to VII-1d:

in which $X^{72}$ has the meaning given above for formula VII-2 and
$R^{71}$ has the meaning indicated above and preferably denotes $C_nH_{2m+1}$, in which
n denotes 1 to 7, preferably 2 to 6, particularly preferably 2, 3 or 5, and
z denotes 0, 1, 2, 3 or 4, preferably 0 or 2, and
$X^{72}$ preferably denotes F.

The compounds of the formula VII-2 are preferably selected from the group of the compounds of the formulae VII-2a and VII-2b, particularly preferably of the formula VII-2a:

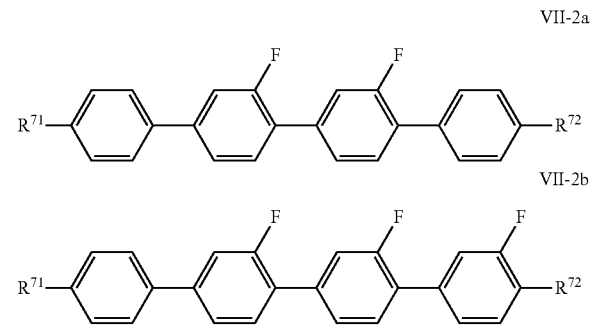

in which
R$^{71}$ has the meaning indicated above and preferably denotes $C_nH_{2n+1}$ or $CH_2=CH—(CH_2)_Z$, and
R$^{72}$ has the meaning indicated above and preferably denotes $C_mH_{2m+1}$ or $O—C_mH_{2m+1}$ or $(CH_2)_Z—CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{71}$ and R$^{72}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula VII-3 are preferably compounds of the formula VII-3a:

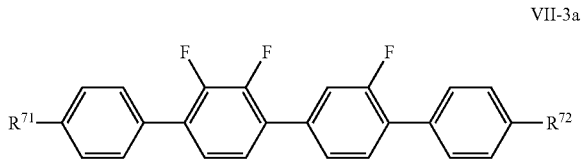

VII-3a in which
R$^{71}$ has the meaning indicated above and preferably denotes $C_nH_{2n+1}$ or $CH_2=CH—(CH_2)_Z$, and
R$^{72}$ has the meaning indicated above and preferably denotes $C_mH_{2m+1}$ or $O—C_mH_{2m+1}$ or $(CH_2)_Z—CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{71}$ and R$^{72}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula VII-4 are preferably compounds of the formula VII-4a:

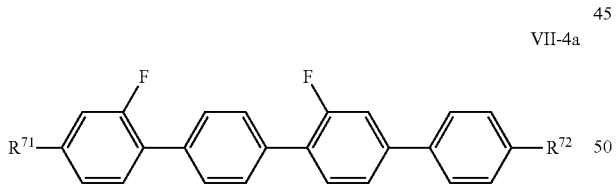

VII-4a in which
R$^{71}$ has the meaning indicated above and preferably denotes $C_nH_{2n+1}$ or $CH_2=CH—(CH_2)_Z$, and
R$^{72}$ has the meaning indicated above and preferably denotes $C_mH_{2m+1}$ or $O—C_mH_{2m+1}$ or $(CH_2)_Z—CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{71}$ and R$^{72}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula VII-5 are preferably selected from the group of the compounds of the formulae VII-5a and VII-5b, more preferably of the formula VII-5a:

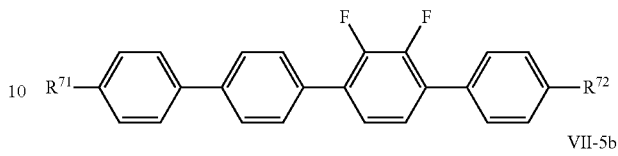

VII-5a

VII-5b

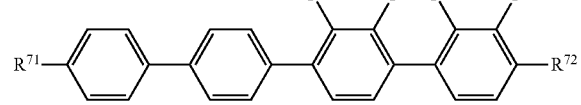

in which
R$^{71}$ has the meaning indicated above and preferably denotes $C_nH_{2n+1}$ or $CH_2=CH—(CH_2)_Z$, and
R$^{72}$ has the meaning indicated above and preferably denotes $C_mH_{2m+1}$ or $O—C_mH_{2m+1}$ or $(CH_2)_Z—CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{71}$ and R$^{72}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula VII-6 are preferably selected from the group of the compounds of the formulae VII-6a and VII-6b:

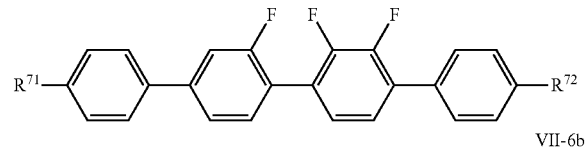

VII-6a

VII-6b

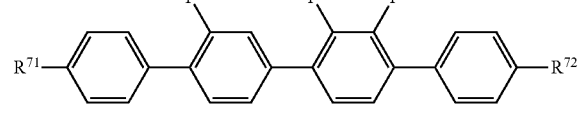

in which
R$^{71}$ has the meaning indicated above and preferably denotes $C_nH_{2n+1}$ or $CH_2=CH—(CH_2)_Z$, and
R$^{72}$ has the meaning indicated above and preferably denotes $C_mH_{2m+1}$ or $O—C_mH_{2m+1}$ or $(CH_2)_Z—CH=CH_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{71}$ and R$^{72}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula VII-7 are preferably selected from the group of the compounds of the formulae VII-7a to VII-7d:

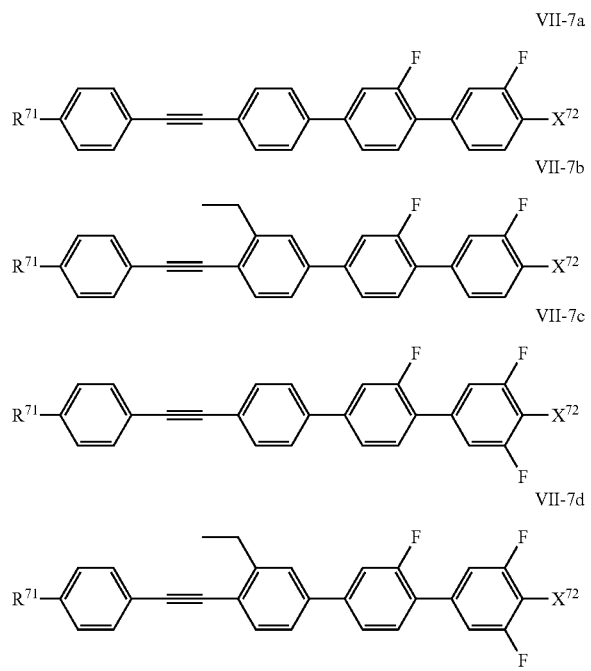

in which
R$^{71}$ has the meaning indicated above and preferably denotes C$_n$H$_{2n+1}$ or CH$_2$=CH—(CH$_2$)$_Z$,
X$^{72}$ denotes F, —OCF$_3$ or —NCS,
n denotes an integer in the range from 1 to 7, preferably in the range from 2 to 6 and particularly preferably 2 to 5, and,
z denotes 0, 1, 2, 3 or 4, preferably 0 or 2.

The compounds of the formula VIII are preferably selected from the group of the compounds of the formulae VIII-1 to VIII-3, more preferably these compounds of the formula VIII predominantly consist, even more preferably essentially consist and very particularly preferably completely consist thereof:

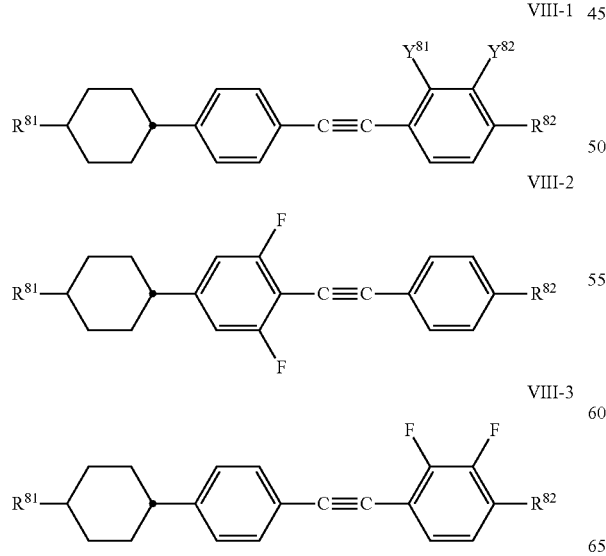

in which
one of
Y$^{81}$ and Y$^{82}$ denotes H and the other denotes H or F, and
R$^{81}$ has the meaning indicated above and preferably denotes C$_n$H$_{2m+1}$ or CH$_2$=CH—(CH$_2$)$_Z$, and
R$^{82}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{81}$ and R$^{82}$) here are, in particular, (C$_n$H$_{2m+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula VIII-1 are preferably selected from the group of the compounds of the formulae VIII-1a to VIII-1c:

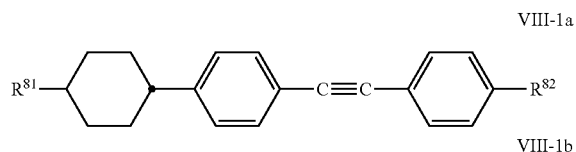

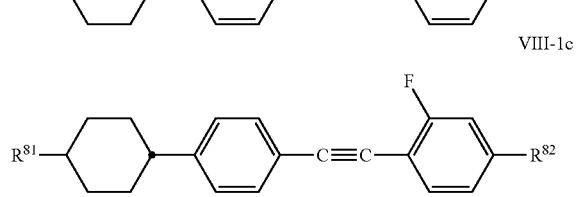

in which
R$^{81}$ has the meaning indicated above and preferably denotes C$_n$H$_{2m+1}$ or CH$_2$=CH—(CH$_2$)$_Z$, and
R$^{82}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 1 to 7, preferably in the range from 2 to 6 and particularly preferably 2 to 5, and
z denotes 0, 1, 2, 3 or 4, preferably 0 or 2.

The preferred combinations of (R$^{81}$ and R$^{82}$) here are, in particular, (C$_n$H$_{2m+1}$ and C$_m$H$_{2m+1}$) and (C$_n$H$_{2m+1}$ and O—C$_m$H$_{2m+1}$), particularly preferably (C$_n$H$_{2m+1}$ and C$_m$H$_{2m+1}$).

The compounds of the formula VIII-2 are preferably compounds of the formula VIII-2a:

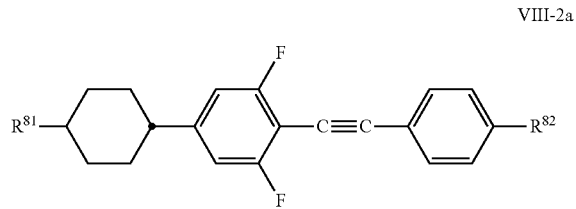

in which $R^{81}$ has the meaning indicated above and preferably denotes $C_nH_{2m+1}$ or $CH_2$=CH—$(CH_2)_z$, and $R^{82}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{81}$ and $R^{82}$) here are, in particular, ($C_nH_{2m+1}$ and $C_mH_{2m+1}$), ($C_nH_{2m+1}$ and O—$C_mH_{2m+1}$) and ($CH_2$=CH—$(CH_2)_z$ and $C_mH_{2m+1}$), particularly preferably ($C_nH_{2m+1}$ and $C_mH_{2m+1}$).

The compounds of the formula VIII-3 are preferably compounds of the formula VIII-3a:

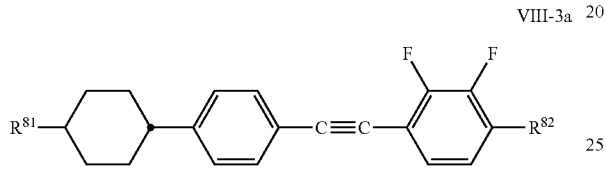

VIII-3a in which $R^{81}$ has the meaning indicated above and preferably denotes $C_nH_{2m+1}$ or $CH_2$=CH—$(CH_2)_z$, and $R^{82}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and O—$C_mH_{2m+1}$).

The compounds of the formula IX are preferably selected from the group of the compounds of the formulae IX-1 to IX-3:

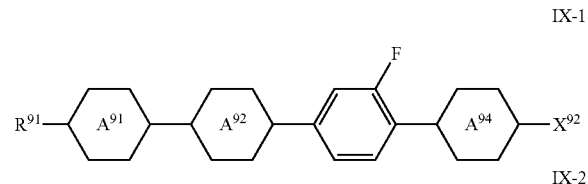

IX-1

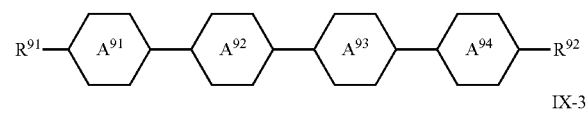

IX-2

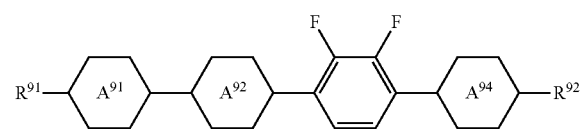

IX-3 in which the parameters have the respective meaning indicated above under formula IX and preferably one of

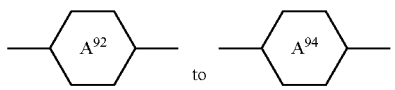

to

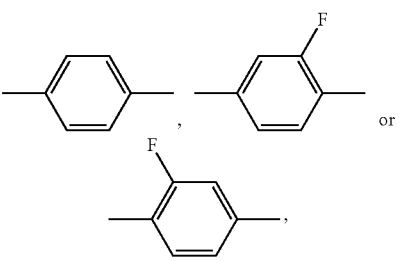

denotes and in which $R^{91}$ has the meaning indicated above and preferably denotes $C_nH_{2n+1}$ or $CH_2$=CH—$(CH_2)_z$, and $R^{92}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and O—$C_mH_{2m+1}$).

The compounds of the formula IX-1 are preferably selected from the group of the compounds of the formulae IX-1a to IX-1e:

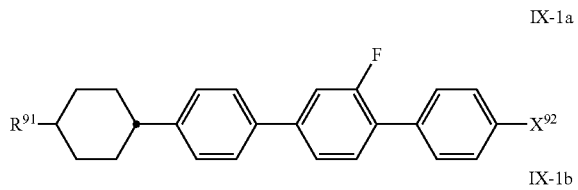

IX-1a

IX-1b

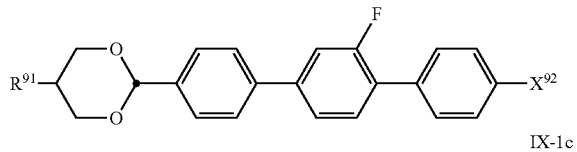

IX-1c

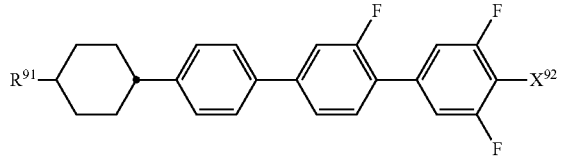

IX-1d

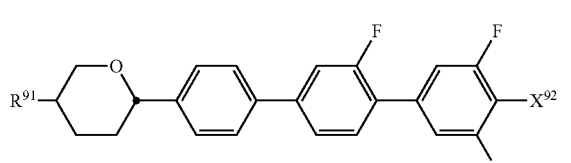

-continued

IX-1e

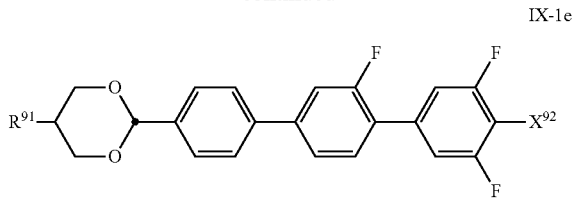

in which the parameters have the meaning given above and preferably $R^{91}$ has the meaning indicated above and preferably denotes $C_nH_{2n+1}$, and n denotes an integer in the range from 1 to 7, preferably in the range from 2 to 6 and particularly preferably 2 to 5, and $X^{92}$ preferably denotes F or $C_1$.

The compounds of the formula IX-2 are preferably selected from the group of the compounds of the formulae IX-2a and IX-2b:

IX-2a

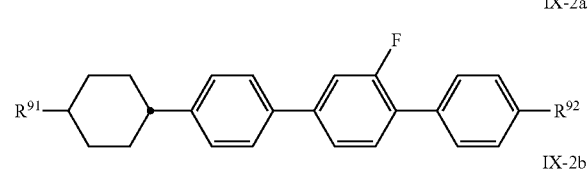

IX-2b

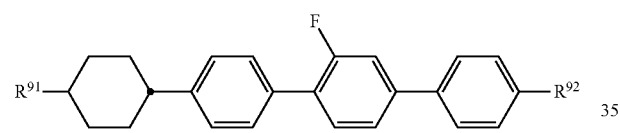

in which $R^{91}$ has the meaning indicated above and preferably denotes $C_nH_{2n+1}$ or $CH_2=CH-(CH_2)_z$, and $R^{92}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combination of ($R^{91}$ and $R^{92}$) here is, in particular, ($C_nH_{2n+1}$ and $C_mH_{2m+1}$).

The compounds of the formula IX-3 are preferably compounds of the formulae IX-3a and IX-3b:

IX-3a

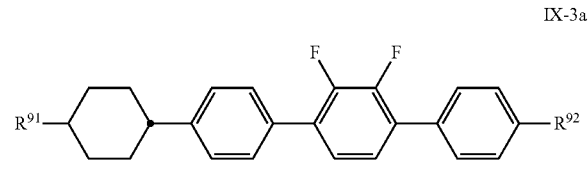

IX-3b

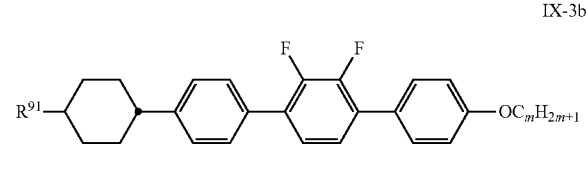

in which $R^{91}$ has the meaning indicated above and preferably denotes $C_nH_{2n+1}$ or $CH_2=CH-(CH_2)_z$, and $R^{92}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 1 to 7, preferably in the range from 2 to 6 and particularly preferably 2 to 5, and z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

In a preferred embodiment of the present invention the medium comprises one or more compounds of formula X

X

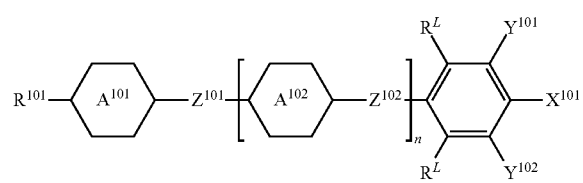

in which $R^{101}$ denotes H, alkyl or alkoxy having 1 to 15, preferably 2 to 7, C atoms or alkenyl, alkenyloxy or alkoxyalkyl having 2 to 15, preferably 2 to 7, C atoms, preferably alkyl or alkenyl, $X^{101}$ denotes H, F, Cl, —CN, $SF_5$, NCS, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F, Cl or NCS, particularly preferably NCS, $Y^{101}$ denotes methyl, ethyl or Cl, $Y^{102}$ denotes H, methyl, ethyl, F or Cl, preferably H or F, $Z^{101}$, $Z^{102}$ identically or differently, denote a single bond, —CH=CH—, —CF=CF— or —C≡C—,

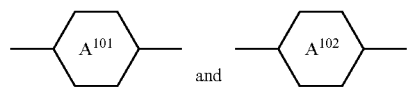

independently of one another, denote

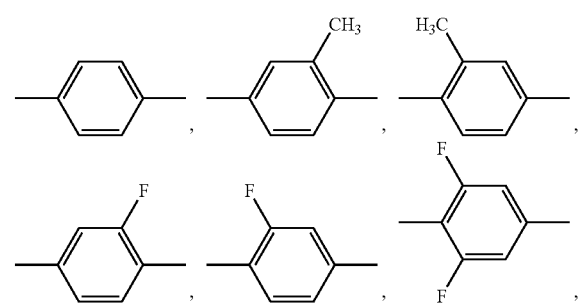

-continued

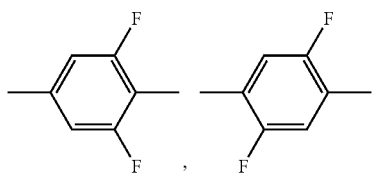

or

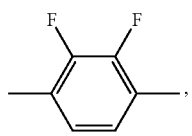

preferably

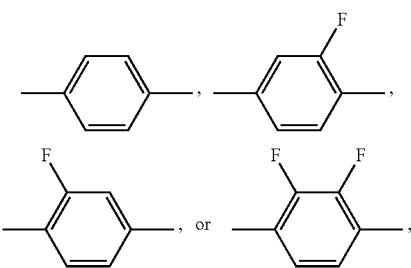

and where

alternatively denotes

and
n is 0 or 1.

Preferably, the compounds of formula X are selected from the sub-formulae X-1 and X-2

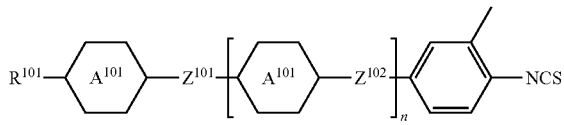

X-1

-continued

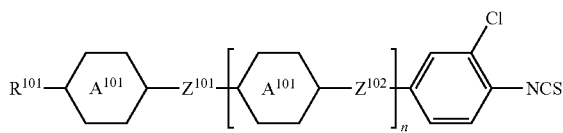

X-2 in which the occurring groups and parameters have the meanings given above for formula X.

Particularly preferably, the media according to the invention comprise one or more compounds selected from the group of compounds of the formulae X-1-1 to X-1-9

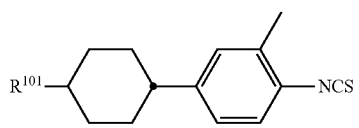

X-1-1

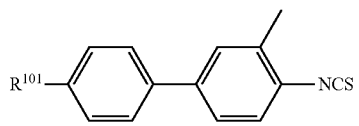

X-1-2

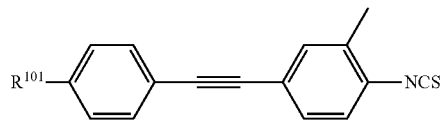

X-1-3

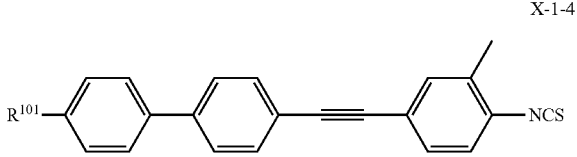

X-1-4

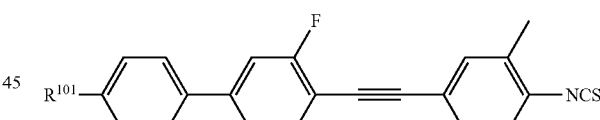

X-1-5

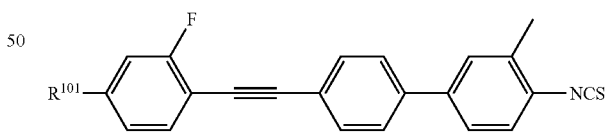

X-1-6

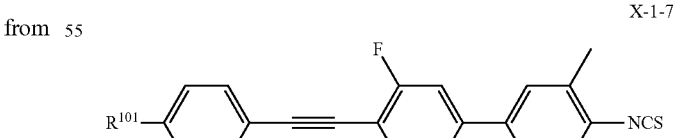

X-1-7

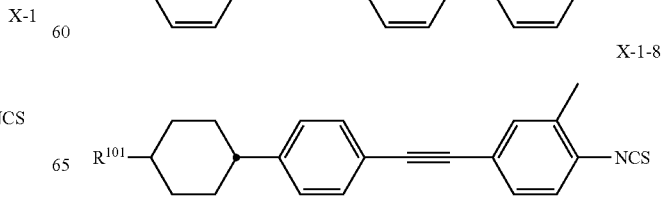

X-1-8

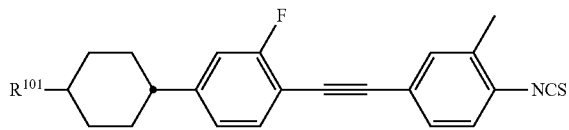

X-1-9

In a preferred embodiment, the medium according to the invention comprises one or more compounds of formula XI

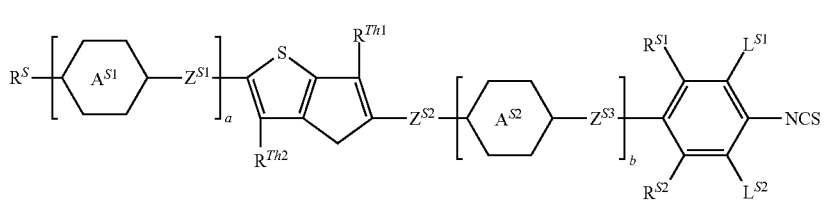

XI in which
$R^S$ denotes H, alkyl or alkoxy having 1 to 12 C atoms, or alkenyl, alkenyloxy or alkoxyalkyl having 2 to 12 C atoms, in which one or more $CH_2$-groups may be replaced by

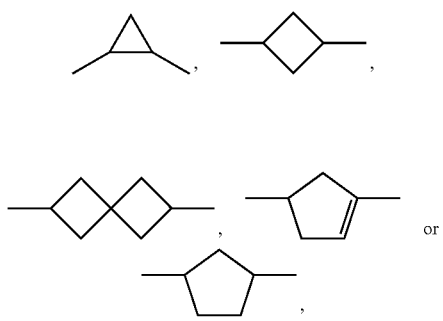

and in which one or more H atoms may be replaced by F,

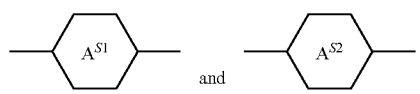

on each occurrence, independently of one another, denote

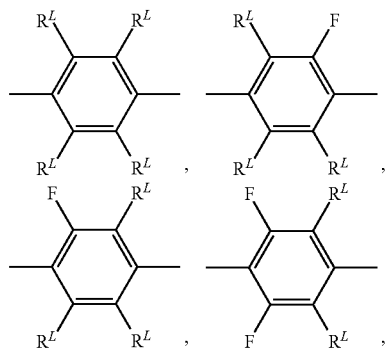

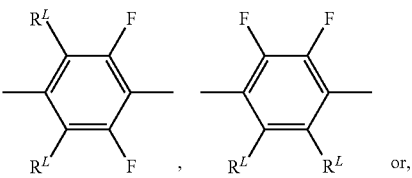

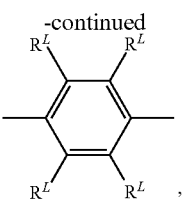

in which $R^L$, on each occurrence identically or differently, denotes H, Cl or straight chain, branched or cyclic alkyl having 1 to 6 C atoms, $L^{S1}$, $L^{S2}$ identically or differently, denote H, Cl or F, $R^{S1}$, $R^{S2}$, identically or differently, denote H, alkyl or alkenyl, having up to 6 C atoms, or cyclopropyl, cyclobutyl, cyclopentenyl, or cyclopentyl, $R^{Th1}$, $R^{Th2}$ identically or differently, denote H, alkyl or alkenyl or alkoxy, having up to 6 C atoms, or cyclopropyl, cyclobutyl, cyclopentenyl or cyclopentyl, $Z^{S1}$, $Z^{S2}$, $Z^{S3}$ identically or differently, denote —CH=CH—, —CH=CF—, —CF=CH—, —CF=CF—, —C≡C—, or a single bond, a, b identically or differently, are 0 or 1.

Preferably, the compounds of formula XI are selected from the group of compounds of the formulae XI-1 to XI-24:

-continued
XI-3
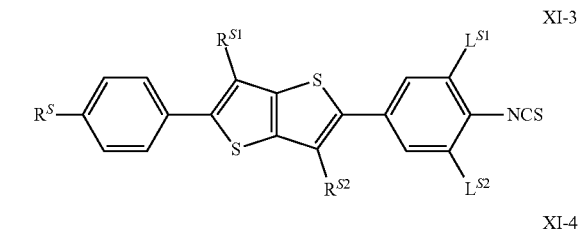
XI-4
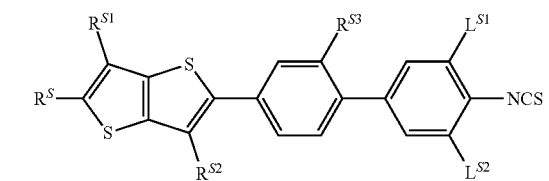
XI-5
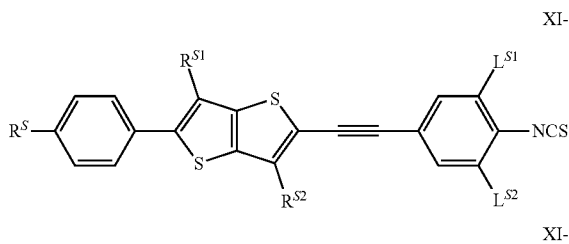
XI-6
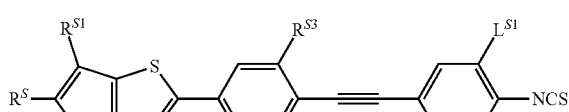
XI-7
XI-8
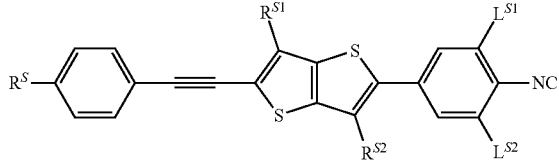
XI-9
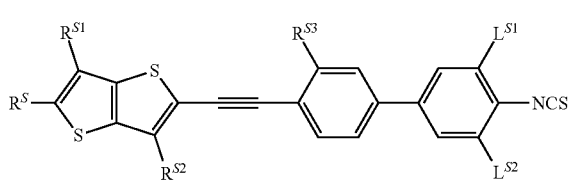
XI-10
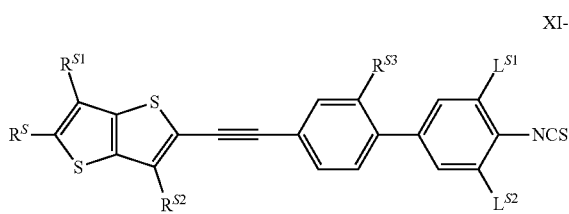
-continued
XI-11
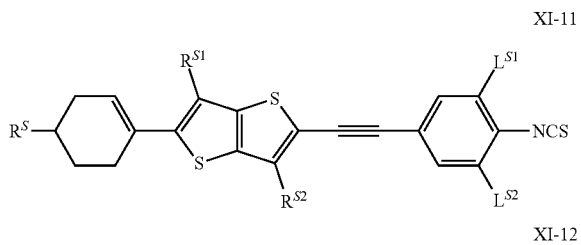
XI-12
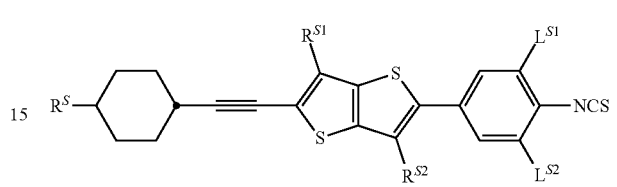
XI-13
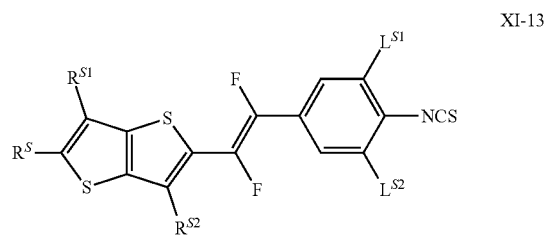
XI-14
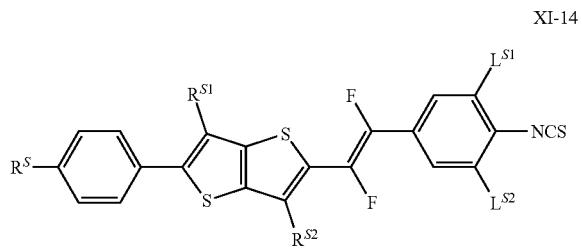
XI-15
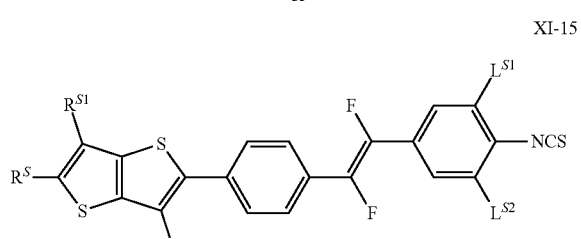
XI-16
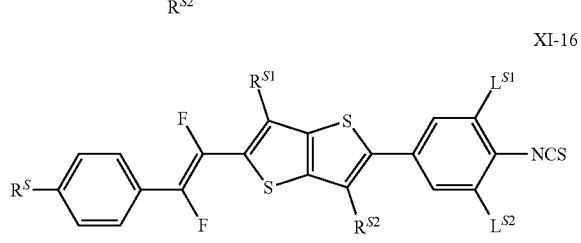
XI-17

-continued

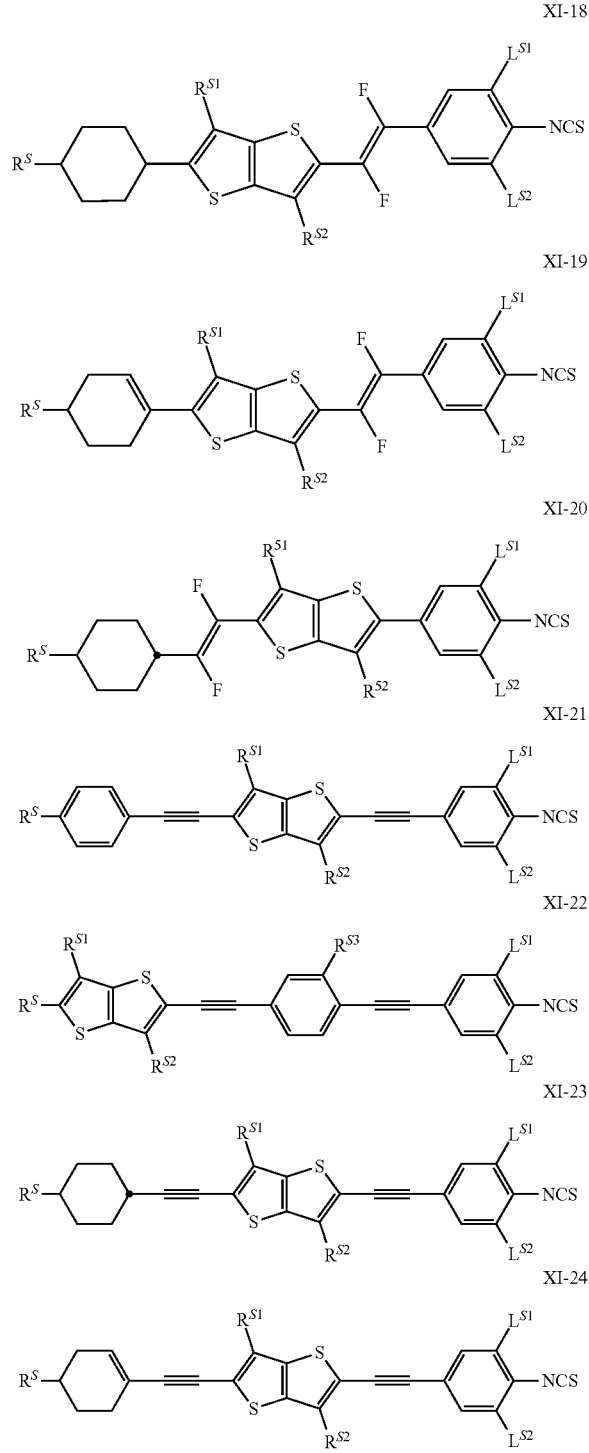

XI-18
XI-19
XI-20
XI-21
XI-22
XI-23
XI-24 in which the occurring groups have the meanings given above for formula XI and preferably $R^S$ denotes alkyl or alkenyl having 2 to 6 C atoms, in which one or more CH$_2$-groups may be replaced by

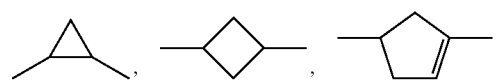 or

-continued

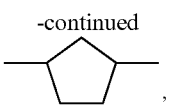, $R^{S1}$ and $R^{S2}$ identically or differently, denote H or alkyl having 1 to 6 C atoms, preferably H,
$R^{S3}$ denotes H, F or alkyl, having up to 6 C atoms, or cyclopropyl, preferably H, F or ethyl, very preferably H,
$L^{S1}$ and $L^{S2}$ identically or differently, denote H or F, preferably F.

Preferably, the medium according to the invention comprises one or more compounds of formula T

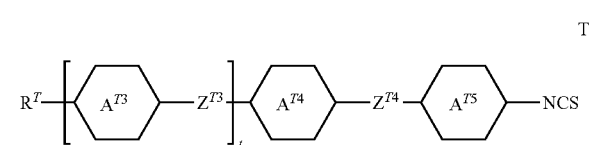

T in which
$R^T$ denotes halogen, CN, NCS, $R^F$, $R^F$—O— or $R^F$—S—, wherein $R^F$ denotes fluorinated alkyl or fluorinated alkenyl having up to 12 C atoms,

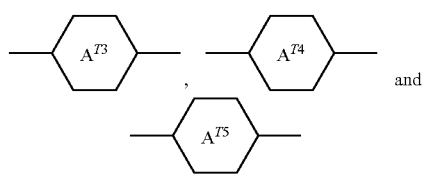

on each occurrence, independently of one another, denote

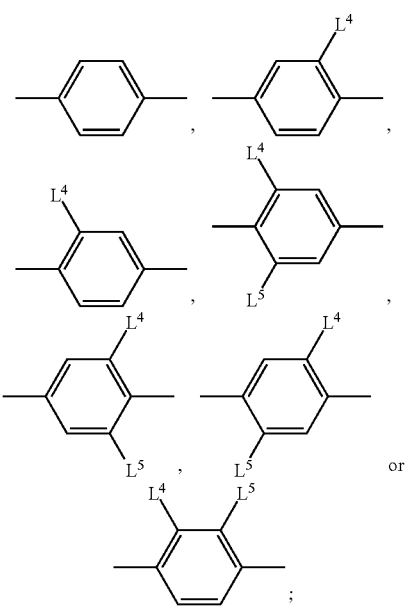

$L^4$ and $L^5$ identically or differently, denote F, Cl or straight chain or branched or cyclic alkyl or alkenyl each having up to 12 C atoms;

$Z^{T3}$, $Z^{T4}$ identically or differently, denote —CH=CH—, —CF=CF—, —CH=CF—, —CF=CH—, —C≡C— or a single bond, and t is 0 or 1.

In a preferred embodiment, the liquid crystalline media according to the invention comprise one or more compounds selected from the group of compounds of the formulae T-1a to T-3b below:

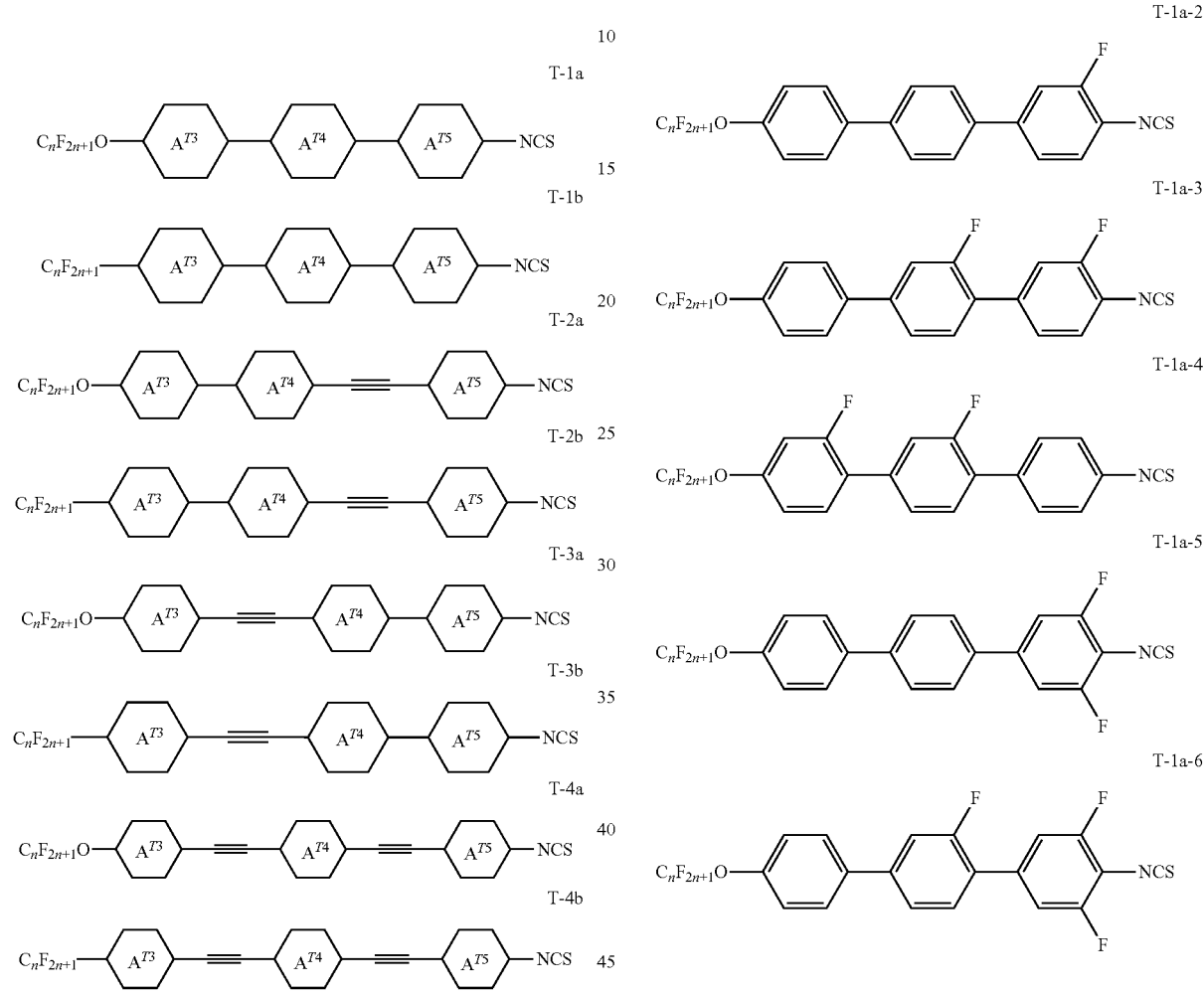

in which

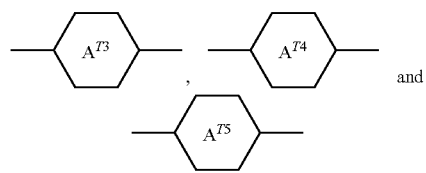

and have the meanings given above and n is 1, 2, 3, 4, 5, 6 or 7, preferably 1, 2, 3 or 4, particularly preferably 1.

In a particularly preferred embodiment of the present invention the media comprise one or more compounds selected from the compounds of the formulae T-1a and T-2a.

Preferred compounds of formula T-1a are selected from the group of compounds of the following sub-formulae:

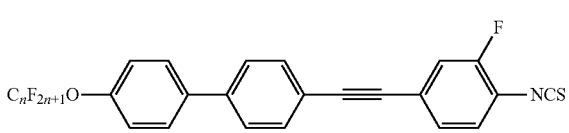

in which n is 1, 2, 3 or 4, preferably 1.

Preferred compounds of formula T-2a are selected from the group of compounds of the following sub-formulae:

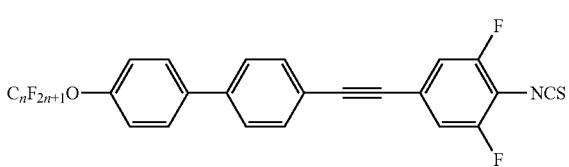

-continued

T-2a-3
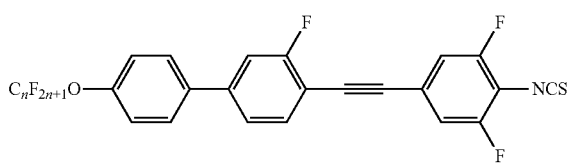

T-2a-4
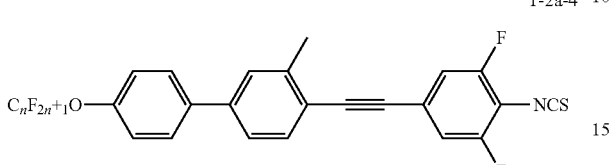

T-2a-5
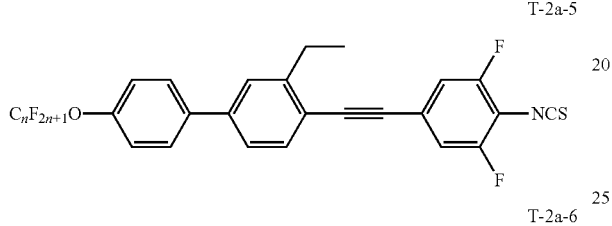

T-2a-6
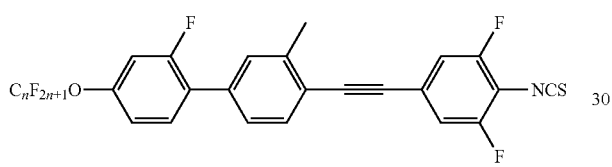

in which n is 1, 2, 3 or 4, preferably 1.

Very preferably, the medium comprises one or more compounds of formula T-1a-5.

Preferably, the medium comprises a compound of formula C

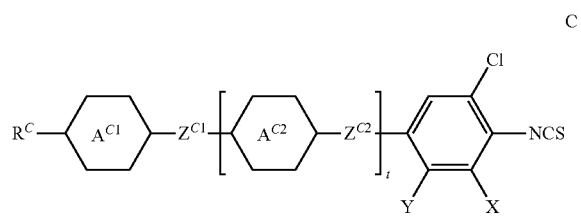

C in which $R^C$ denotes H, alkyl or alkoxy having 1 to 12 C atoms, or alkenyl, alkenyloxy or alkoxyalkyl having 2 to 12 C atoms, in which one or more CH$_2$-groups may be replaced by

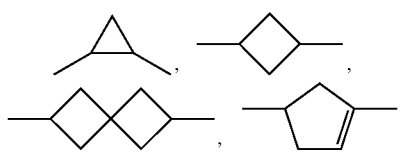

or

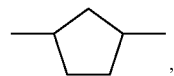

or a group $R^P$, $R^P$ denotes halogen, CN, NCS, $R^F$, $R^F$—O— or $R^F$—S—, wherein $R^F$ denotes fluorinated alkyl or fluorinated alkenyl having up to 9 C atoms, $Z^{C1}$, $Z^{C2}$ identically or differently, denote —CH=CH—, —CF=CF—, —CH=CF—, —CF=CH—, —C≡C— or a single bond, preferably —C≡C— or a single bond, X denotes Cl or F, preferably F, Y denotes H, Cl, F, alkyl or alkoxy each having 1 to 6 C atoms, preferably, H, F, CH$_3$ or C$_2$H$_5$, very preferably H, t is 0, 1 or 2, preferably 0 or 1, and

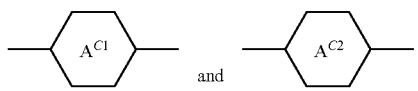

and denote a radical selected from the following groups:
a) the group consisting of 1,4-phenylene, 1,4-naphthylene, and 2,6-naphthylene, in which one or two CH groups may be replaced by N and in which one or more H atoms may be replaced by L,
b) the group consisting of trans-1,4-cyclohexylene, 1,4-cyclo-hexenylene, bicyclo[1.1.1]pentane-1,3-diyl, 4,4'-bicyclohexylene, bicyclo[2.2.2]octane-1,4-diyl, spiro[3.3]heptane-2,6-diyl, in which one or more non-adjacent CH$_2$ groups may be replaced by —O— and/or —S— and in which one or more H atoms may be replaced by F,
c) the group consisting of thiophene-2,5-diyl, thieno[3,2-b]thiophene-2,5-diyl, selenophene-2,5-diyl, each of which may also be mono- or polysubstituted by L, wherein L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms.

The compounds of formula C are preferably selected from the compounds of the following sub-formulae:

C-1
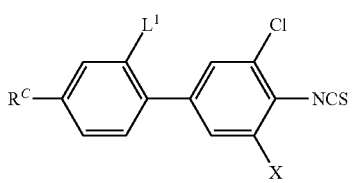

C-2
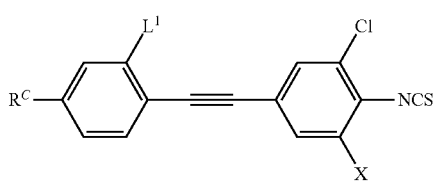

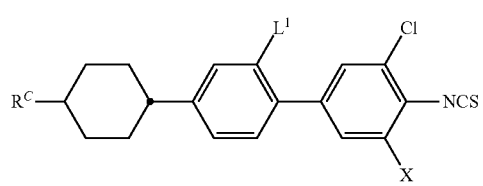
C-3

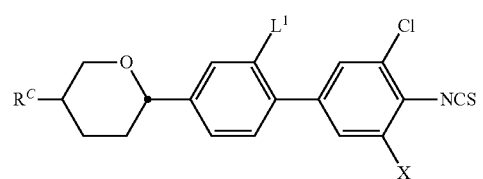
C-4

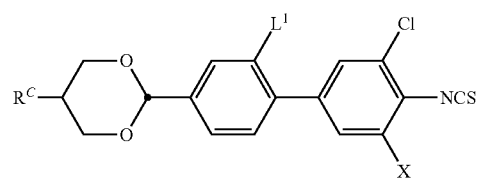
C-5

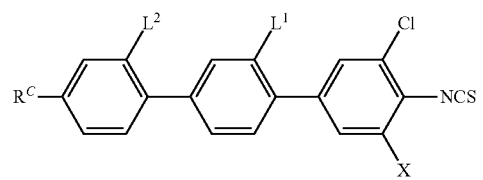
C-6

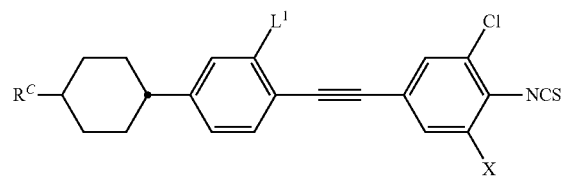
C-7

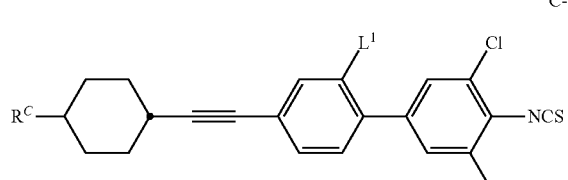
C-8

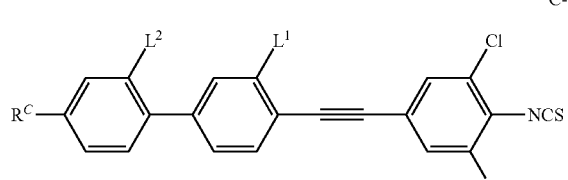
C-9

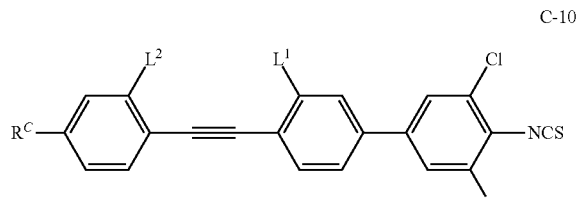
C-10

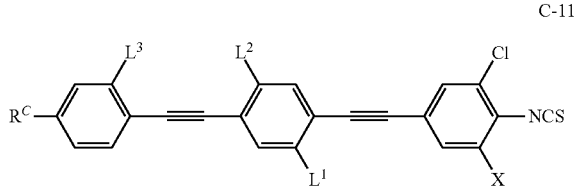
C-11 in which

L¹, L² and L³ identically or differently, denote H, F, Cl, methyl, ethyl, n-propyl, isopropyl, cyclopropyl, cyclobutyl, cyclopentyl or cyclopentenyl, and $R^C$ and X have the meanings given above and preferably $R^C$ denotes alkyl having 1 to 7 C atoms or a group $R^P$, where $R^P$ preferably denotes perfluorinated alkoxy having 1 to 7 C atoms, and X denotes F.

Preferably, one of the groups $Z^{C1}$ and $Z^{C2}$ of formula C denotes a single bond and the other one of $Z^{C1}$ and $Z^{C2}$ denotes —C≡C—.

Very preferred compounds of the formula C are selected from the compounds of the following sub-formulae:

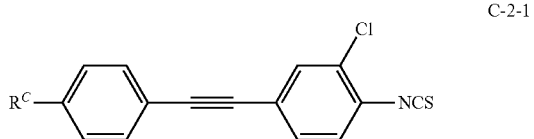
C-2-1

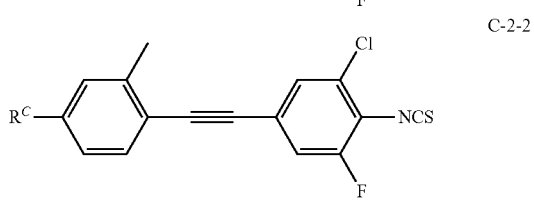
C-2-2

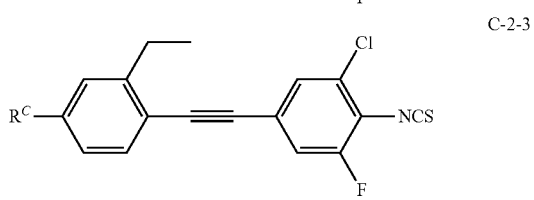
C-2-3

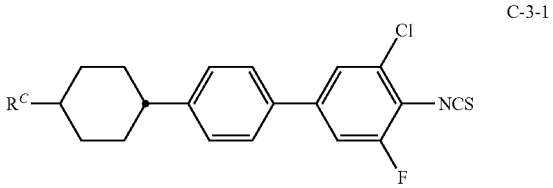
C-3-1

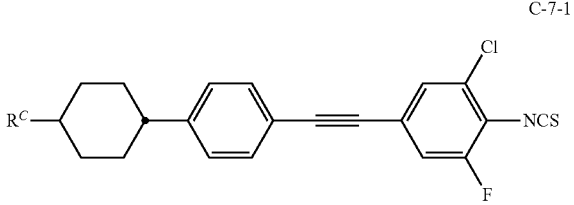
C-7-1 in which R^C has the meanings given above and preferably denotes alkyl having 1 to 7 C atoms or CF$_3$O.

Very particularly preferred compounds are the compounds of the formulae C-7-1, C-9-1, C-9-4, C-10-1, C-10-2, C-10-3, C-10-4, C-10-5, C-10-6, and C-10-7.

Preferably, the medium comprises one or more compounds of formula U a compound of formula U in which R$^U$ denotes H, alkyl or alkoxy having 1 to 12 C atoms, or alkenyl, alkenyloxy or alkoxyalkyl having 2 to 12 C atoms, in which one or more CH$_2$-groups may be replaced by

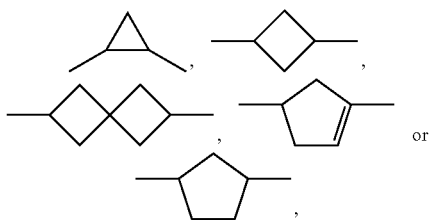

or a group $R^P$, $R^P$ denotes halogen, CN, NCS, $R^F$, $R^F$—O— or $R^F$—S—, wherein $R^F$ denotes fluorinated alkyl or fluorinated alkenyl having up to 9 C atoms, $Z^{U1}$, $Z^{U2}$, $Z^{U3}$ identically or differently, denote —CH=CH—, —CF=CF—, —CH=CF—, —CF=CH—, —C≡C— or a single bond, preferably —C≡C— or a single bond, $X^1$, $X^2$ identically or differently, denote H, Cl, F, CH$_3$ or C$_2$H$_5$, preferably F, $Y^1$, $Y^2$, $Y^3$, $Y^4$, identically or differently, denote H, F, Cl, or straight chain or branched or cyclic alkyl, alkenyl, alkoxy or alkenyloxy, each having up to 12 C atoms, where at least one of $Y^1$, $Y^2$, $Y^3$ and $Y^4$ is different from F, s is 0, 1 or 2, preferably 0 or 1, t is 0, 1 or 2, preferably 0 or 1, and s+t is 0, 1 or 2, preferably 0 or 1,

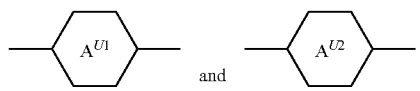

denote a radical selected from the following groups:

a) the group consisting of 1,4-phenylene, 1,4-naphthylene, and 2,6-naphthylene, in which one or two CH groups may be replaced by N and in which one or more H atoms may be replaced by L, b) the group consisting of trans-1,4-cyclohexylene, 1,4-cyclohexenylene, bicyclo[1.1.1]pentane-1,3-diyl, 4,4'-bicyclohexylene, bicyclo[2.2.2]octane-1,4-diyl, spiro[3.3]heptane-2,6-diyl, in which one or more non-adjacent CH2 groups may be replaced by —O— and/or —S— and in which one or more H atoms may be replaced by F, c) the group consisting of thiophene-2,5-diyl, thieno[3,2-b]thiophene-2,5-diyl, selenophene-2,5-diyl, each of which may also be mono- or polysubstituted by L, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms.

The compounds of formula U are preferably selected from the compounds of the following sub-formulae:

In a preferred embodiment of the present invention, the compounds of formula U are selected from the compounds of the formulae U-1 to U-20, very preferably from the compounds of the formulae U-1 to U13:

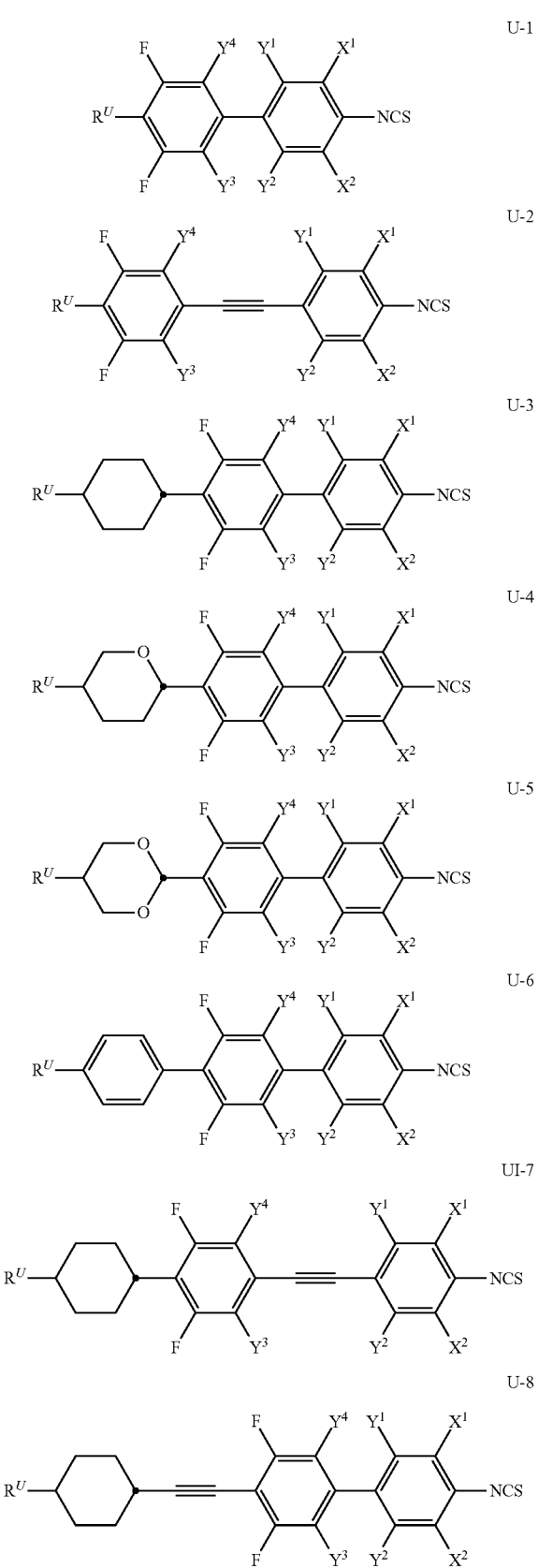

U-9
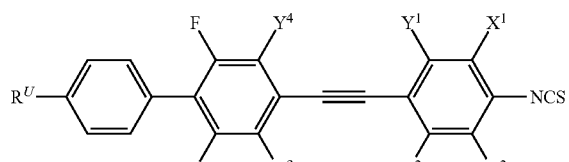

U-10
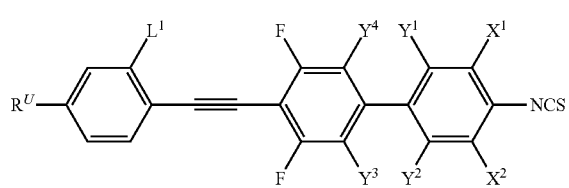

U-11
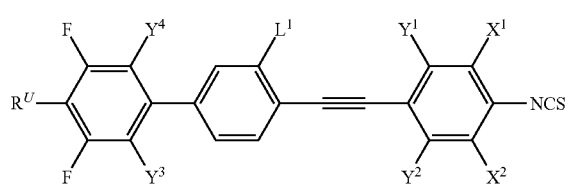

U-12
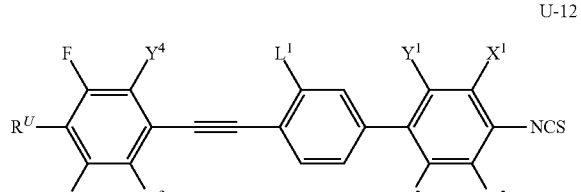

U-13
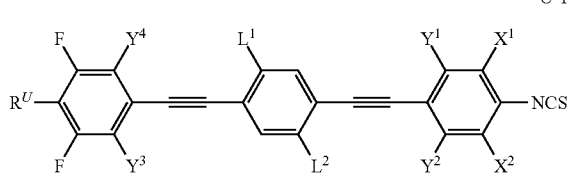

U-14
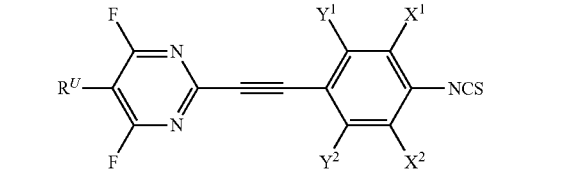

U-15
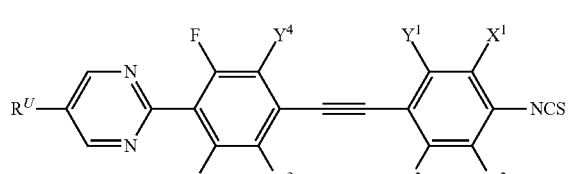

U-16
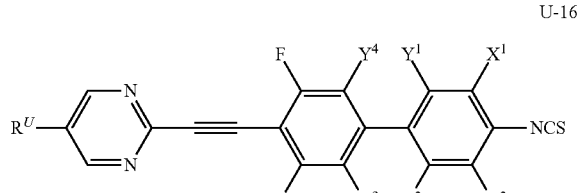

U-17
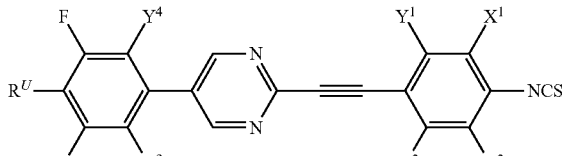

U-18
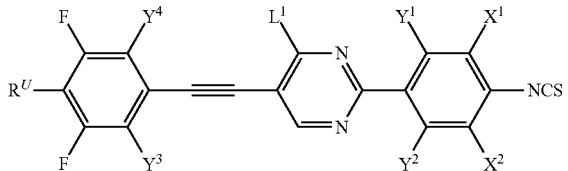

U-19
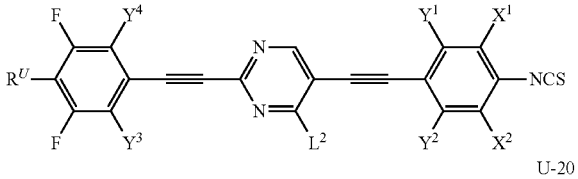

U-20
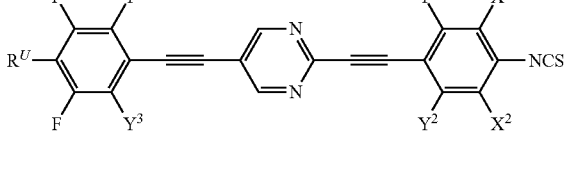

in which the occurring groups have the meanings indicated above for formula U and its subformulae and preferably $R^U$ denotes alkyl having 1 to 7 C atoms, $Y^1$, $Y^2$, $Y^3$, and $Y^4$, identically or differently, denote H, F, Cl, methyl, ethyl, n-propyl, isopropyl, cyclopropyl, cyclobutyl, cyclopentyl or cyclopentenyl, and more preferably $Y^1$ and $Y^2$ independently denote H or F, in particular H, and $Y^3$ and $Y^4$ very preferably denote H, and $L^1$ and $L^2$, identically or differently, very preferably denote H, F, methyl or ethyl, in particular H.

According to one embodiment of the present invention the compounds of formula U are used in which $R^U$ denotes H, alkyl or alkoxy having 1 to 12 C atoms, or alkenyl, alkenyloxy or alkoxyalkyl having 2 to 12 C atoms, in which one or more CH₂-groups may be replaced by

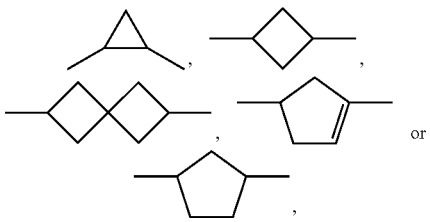

preferably alkyl having 1 to 12 C atoms.

According to another embodiment of the present invention compounds of formula U are used in which the group $R^U$ denotes $R^P$, where $R^P$ denotes halogen, CN, NCS, $R^F$, $R^F$—O— or $R^F$—S—, and wherein $R^F$ denotes fluorinated alkyl or fluorinated alkenyl having up to 9 C atoms, preferably $CF_3$ or $OCF_3$.

Preferably, the medium comprises one or more compounds of formula UF

The present invention relates to a compound of formula U

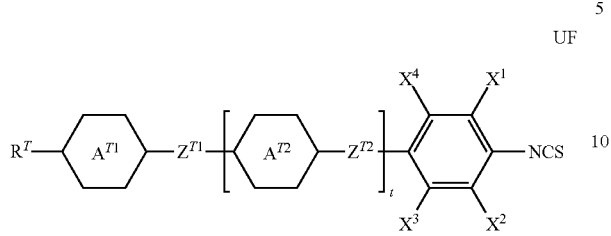

UF in which $R^T$ denotes H, alkyl or alkoxy having 1 to 12 C atoms, or alkenyl, alkenyloxy or alkoxyalkyl having 2 to 12 C atoms, in which one or more $CH_2$-groups may be replaced by

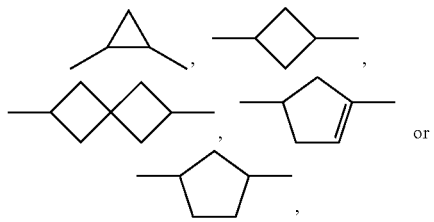

or a group $R^P$, $R^P$ denotes halogen, CN, NCS, $R^F$, $R^F$—O— or $R^F$—S—, wherein $R^F$ denotes fluorinated alkyl or fluorinated alkenyl having up to 9 C atoms, $Z^{T1}$, $Z^{T2}$ identically or differently, denote —CH=CH—, —CF=CF—, —CH=CF—, —CF=CH—, —C≡C— or a single bond, preferably —C≡C— or a single bond, $X^1$, $X^2$, $X^3$ and $X^4$ identically or differently, denote Cl or F, preferably F, t is 0 or 1, and

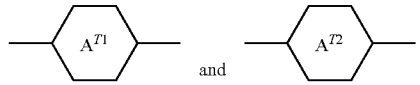

and denote a radical selected from the following groups:
a) the group consisting of 1,4-phenylene, 1,4-naphthylene, and 2,6-naphthylene, in which one or two CH groups may be replaced by N and in which one or more H atoms may be replaced by L, wherein tetrafluoro-1,4-phenylene is excluded,
b) the group consisting of trans-1,4-cyclohexylene, 1,4-cyclo-hexenylene, bicyclo[1.1.1]pentane-1,3-diyl, 4,4'-bicyclohexylene, bicyclo[2.2.2]octane-1,4-diyl, spiro[3.3]heptane-2,6-diyl, in which one or more non-adjacent $CH_2$ groups may be replaced by —O— and/or —S— and in which one or more H atoms may be replaced by F,
c) the group consisting of thiophene-2,5-diyl, thieno[3,2-b]thiophene-2,5-diyl, selenophene-2,5-diyl, each of which may also be mono- or polysubstituted by L, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkyl-carbonyloxy or alkoxycarbonyloxy having 1 to 12 C atoms.

The compounds of formula UF are preferably selected from the following sub-formulae:

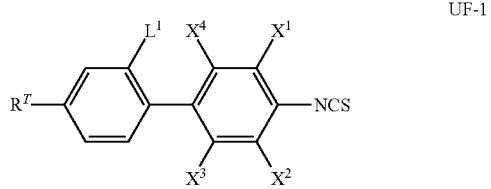

UF-1

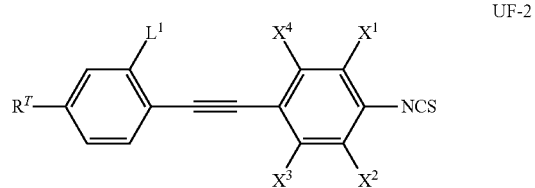

UF-2

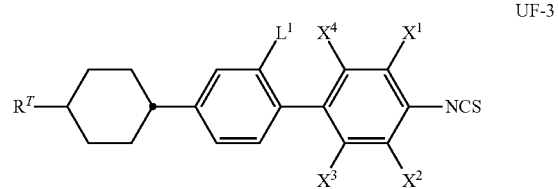

UF-3

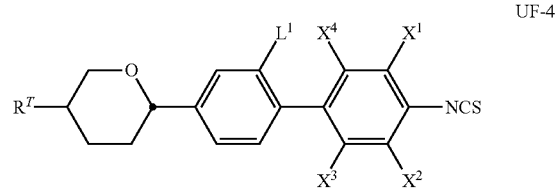

UF-4

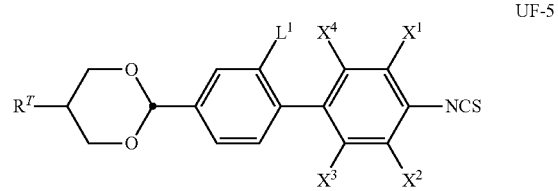

UF-5

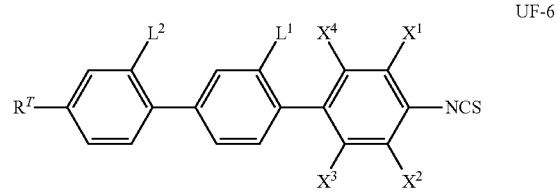

UF-6

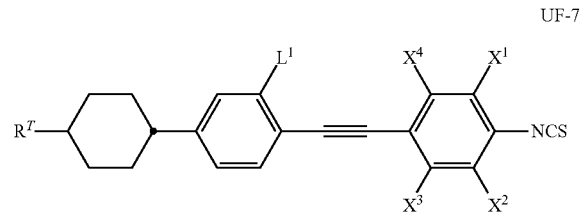

UF-7

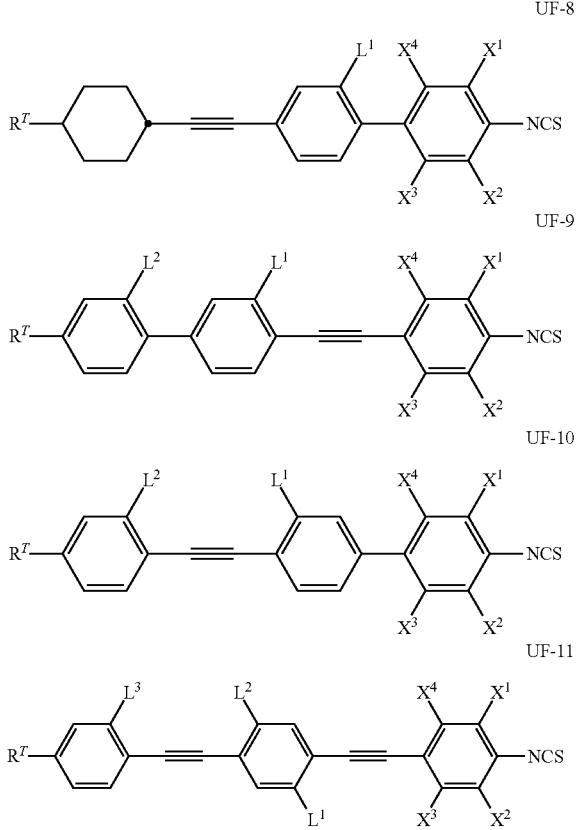

in which

L¹, L² and L³ identically or differently, denote H, F, Cl, methyl, ethyl, n-propyl, isopropyl, cyclopropyl, cyclobutyl, cyclopentyl or cyclopentenyl, and $R^T$, $X^1$, $X^2$, $X^3$ and $X^4$ have the meanings given above.

According to one embodiment of the present invention the compounds of formula UF are used in which $R^U$ denotes H, alkyl or alkoxy having 1 to 12 C atoms, or alkenyl, alkenyloxy or alkoxyalkyl having 2 to 12 C atoms, in which one or more CH₂-groups may be replaced by

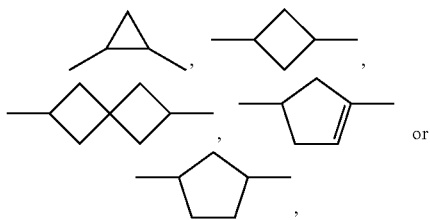

preferably alkyl having 1 to 12 C atoms.

According to another embodiment of the present invention compounds of formula UF are used in which the group $R^U$ denotes $R^P$, where $R^P$ denotes halogen, CN, NCS, $R^F$, $R^F$—O— or $R^F$—S—, and wherein $R^F$ denotes fluorinated alkyl or fluorinated alkenyl having up to 9 C atoms, preferably $CF_3$ or $OCF_3$.

The media according to the present invention comprise one or more chiral dopants. Preferably these chiral dopants have an absolute value of the helical twisting power (HTP) in the range of from 1 μm⁻¹ to 150 μm⁻¹, preferably in the range of from 10 μm⁻¹ to 100 μm⁻¹. In case the media comprise two or more chiral dopants, these may have opposite signs of their HTP-values. This condition is preferred for some specific embodiments, as it allows to compensate the chirality of the respective compounds to some degree and, thus, may be used to compensate various temperature dependent properties of the resulting media in the devices. Generally, however, it is preferred that most, preferably all of the chiral compounds present in the media according to the present invention have the same sign of their HTP-values.

Preferably the chiral dopants present in the media according to the instant application are mesogenic compounds and most preferably they exhibit a mesophase on their own.

In a preferred embodiment of the present invention, the medium comprises two or more chiral compounds which all have the same algebraic sign of the HTP.

The temperature dependence of the HTP of the individual compounds may be high or low. The temperature dependence of the pitch of the medium can be compensated by mixing compounds having different temperature dependencies of the HTP in corresponding ratios.

For the optically active component, a multitude of chiral dopants, some of which are commercially available, is available to the person skilled in the art, such as, for example, cholesteryl nonanoate, R- and S-811, R- and S-1011, R- and S-2011, R- and S-3011, R- and S-4011, or CB15 (all Merck KGaA, Darmstadt).

Particularly suitable dopants are compounds which contain one or more chiral groups and one or more mesogenic groups, or one or more aromatic or alicyclic groups which form a mesogenic group with the chiral group.

Suitable chiral groups are, for example, chiral branched hydrocarbon radicals, chiral ethane diols, binaphthols or dioxolanes, furthermore mono- or polyvalent chiral groups selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral groups are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, in which one or more CH₂ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

The media according to the present invention preferably comprise chiral dopants which are selected from the group of known chiral dopants. Suitable chiral groups and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820. Examples are also compounds listed in Table F below.

Chiral compounds preferably used according to the present invention are selected from the group consisting of the formulae shown below.

Particular preference is given to chiral dopants selected from the group consisting of compounds of the following formulae A-I to A-III and A-Ch:

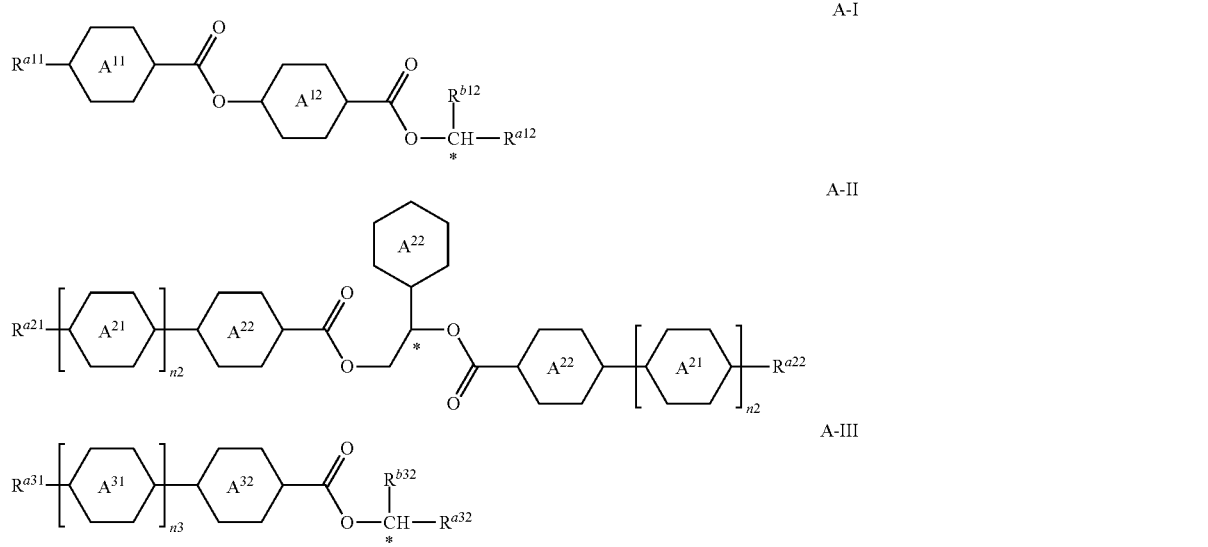

A-I

A-II

A-III in which

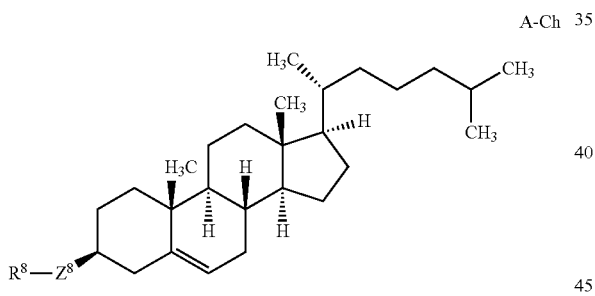

A-Ch $R^{a11}$, $R^{a12}$ and $R^{b12}$, independently of one another, denote alkyl having 1 to 15 C atoms, in which, in addition, one or more non-adjacent CH$_2$ groups may each be replaced, independently of one another, by —C(R$^z$)=C(R$^z$)—, —C≡C—, —O—, —S—, —CO—, —CO—O—, —O—CO— or —O—CO—O— in such a way that O and/or S atoms are not linked directly to one another, and in which, in addition, one or more H atoms may each be replaced by F, Cl, Br, I or CN, preferably alkyl, more preferably n-alkyl, with the proviso that $R^{a12}$ is different from $R^{b12}$, $R^{a21}$ and $R^{a22}$, independently of one another, denote alkyl having 1 to 15 C atoms, in which, in addition, one or more non-adjacent CH$_2$ groups may each be replaced, independently of one another, by —C(R$^z$)=C(R$^z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, preferably both are alkyl, more preferably n-alkyl, $R^{a31}$, $R^{a32}$ and $R^{b32}$, independently of one another, denote straight-chain or branched alkyl having 1 to 15 C atoms, in which, in addition, one or more non-adjacent CH$_2$ groups may each be replaced, independently of one another, by —C(R$^z$)=C(R$^z$)—, —C≡C—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, preferably alkyl, more preferably n-alkyl, with the proviso that $R^{a32}$ is different from $R^{b32}$;

$R^z$ denotes H, CH$_3$, F, Cl, or CN, preferably H or F, $R^8$ has one of the meanings of $R^{a11}$ given above, preferably alkyl, more preferably n-alkyl having 1 to 15 C atoms, $Z^8$ denotes —C(O)O—, CH$_2$O, CF$_2$O or a single bond, preferably —C(O)O—, $A^{11}$ is defined as $A^{12}$ below, or alternatively denotes

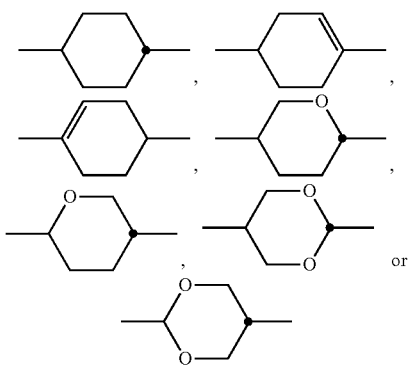

$A^{12}$ denotes

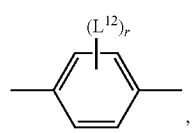

preferably

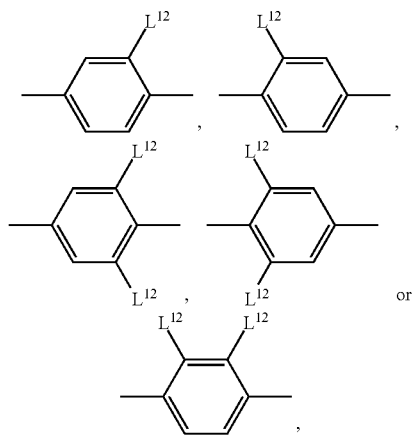

in which
L$^{12}$ on each occurrence, independently of one another, denotes halogen, CN, or alkyl, alkenyl, alkoxy or alkenyloxy having up to 12 C atoms and in which one or more H atoms are optionally replaced with halogen, preferably methyl, ethyl, Cl or F, particularly preferably F, A$^{21}$ denotes

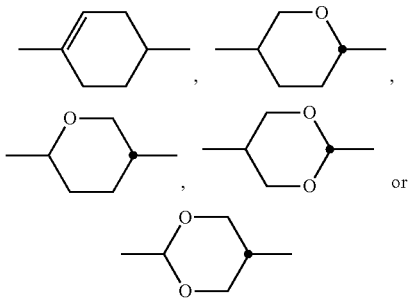

-continued

A$^{22}$ has the meanings given for A$^{12}$

A$^{31}$ has the meanings given for A$^{11}$, or alternatively denotes

A$^{32}$ has the meanings given for A$^{12}$.

n2 on each occurrence, identically or differently, is 0, 1 or 2, and n3 is 1, 2 or 3, and r is 0, 1, 2, 3 or 4.

Particular preference is given to dopants selected from the group consisting of the compounds of the following formulae:

A-I-1

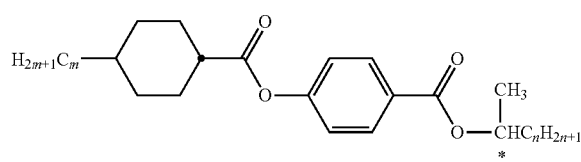

A-II-1

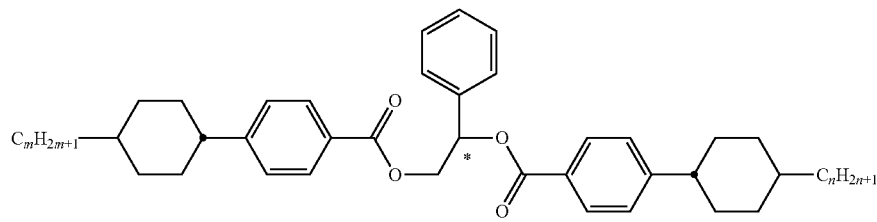

A-III-1

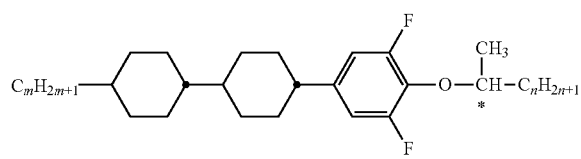

A-III-2

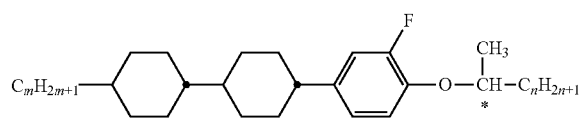

-continued

A-III-3
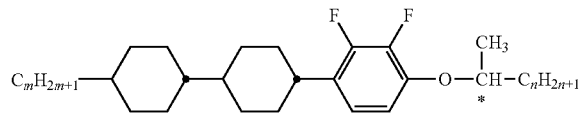

A-III-4
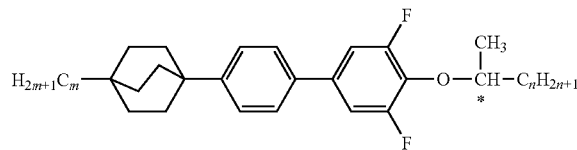

A-III-5
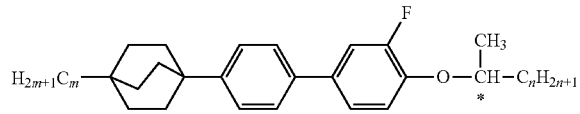

A-III-6
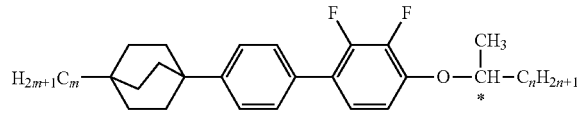

A-III-7
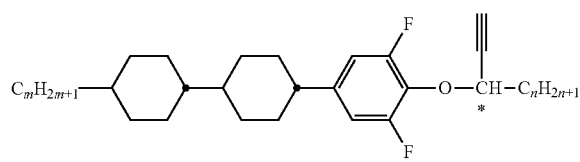

A-III-8
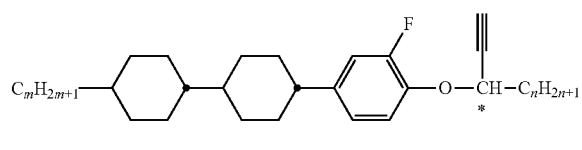

A-III-9
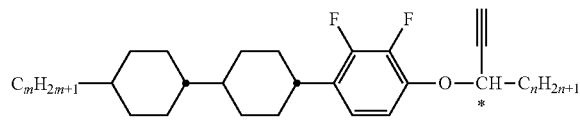

in which m is, on each occurrence, identically or differently, an integer from 1 to 9 and n is, on each occurrence, identically or differently, an integer from 2 to 9.

Particularly preferred compounds of formula A are compounds of formula A-III.

Further preferred dopants are derivatives of the isosorbide, isomannitol or isoiditol of the following formula A-IV:

A-IV
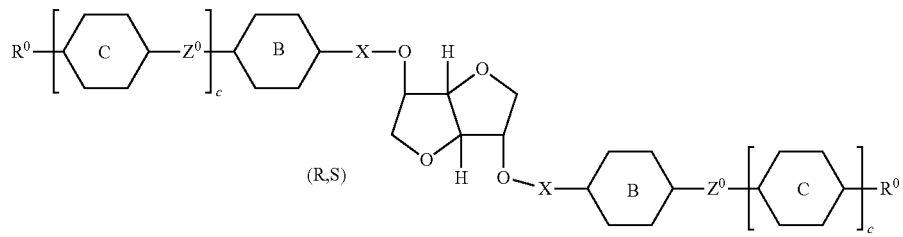

in which the group is

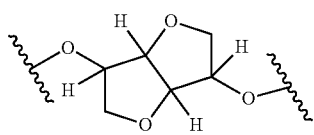 [SMILES: *OC1COC2C(O*)COC12]

(R,S)

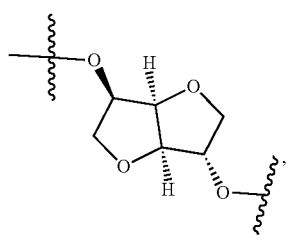

(dianhydrosorbitol)

-continued (dianhydromannitol)

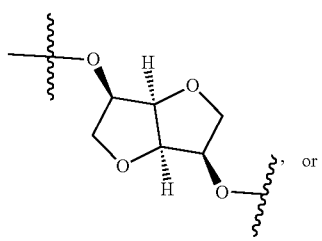, or

-continued (dianhydroiditol)

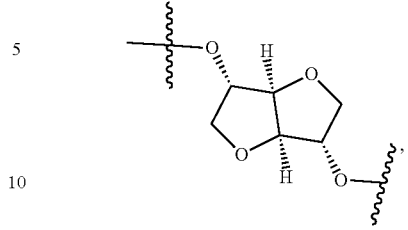, preferably dianhydrosorbitol,
and chiral ethane diols, such as, for example, diphenylethanediol (hydrobenzoin), in particular mesogenic hydrobenzoin derivatives of the following formula A-V:

A-V

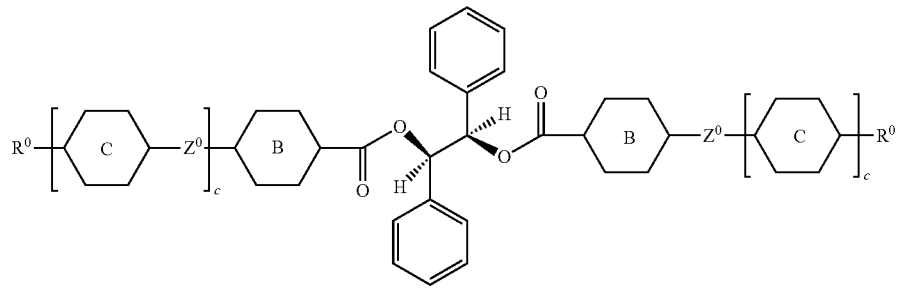

including the (S,S) enantiomers, which are not shown, in which

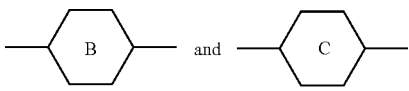

are each, independently of one another, 1,4-phenylene, which may also be mono-, di- or trisubstituted by L, or 1,4-cyclo-hexylene,
L is H, F, Cl, CN or optionally halogenated alkyl, alkoxy, alkylcarbonyl, alkoxycarbonyl or alkoxycarbonyloxy having 1-7 carbon atoms,
c is 0 or 1,
X is $CH_2$ or —C(O)—,
$Z^0$ is —COO—, —OCO—, —$CH_2CH_2$— or a single bond, and
$R^0$ is alkyl, alkoxy, alkylcarbonyl, alkoxycarbonyl or alkylcarbonyloxy having 1-12 carbon atoms.
Examples of compounds of formula IV are:

A-IV-1

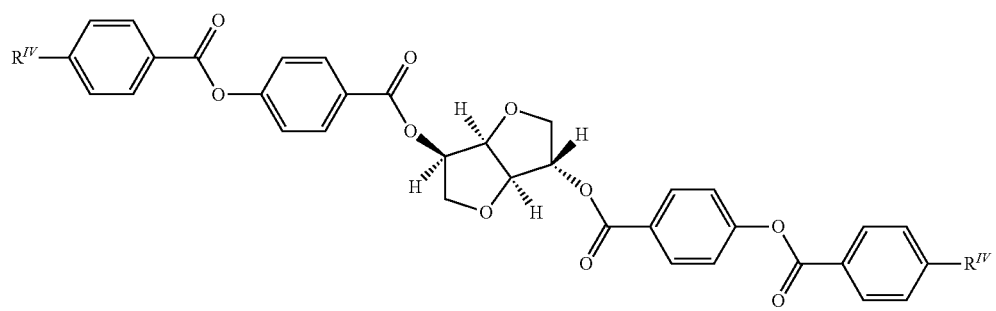

-continued

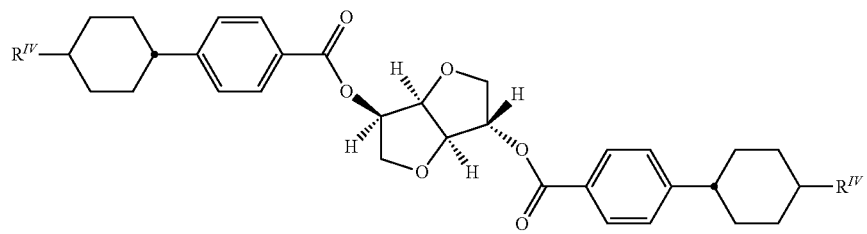
A-IV-2

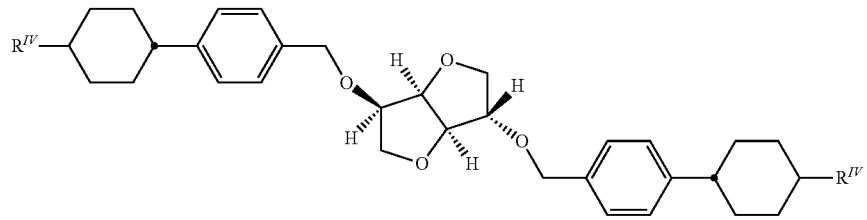
A-IV-3

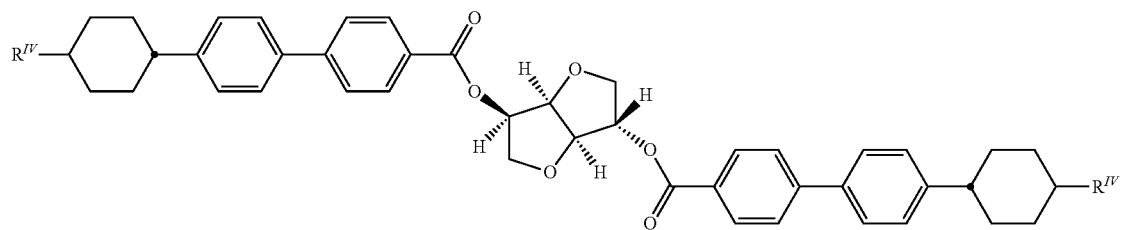
A-IV-4

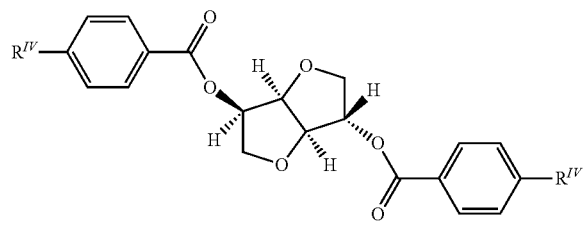
A-IV-5

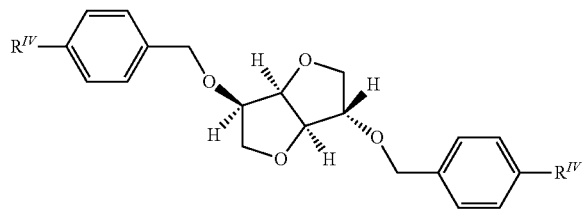
A-IV-6

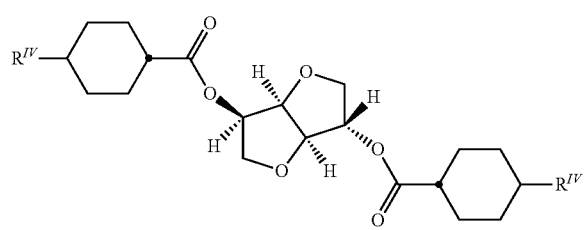
A-IV-7

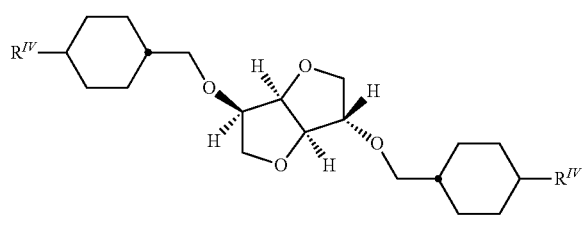
A-IV-8

The compounds of the formula A-IV are described in WO 98/00428. The compounds of the formula A-V are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

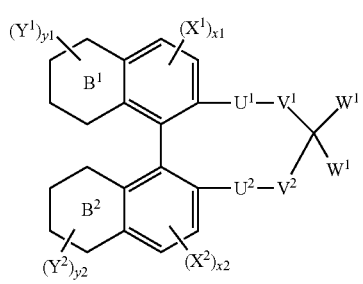
A-VI in which
$X^1$, $X^2$, $Y^1$ and $Y^2$ are each, independently of one another, F, Cl, Br, I, CN, SCN, $SF_5$, straight-chain or branched alkyl having from 1 to 25 carbon atoms, which is unsubstituted or monosubstituted or polysubstituted by F, Cl, Br, I or CN and in which, in addition, one or more non-adjacent $CH_2$ groups may each, independently of one another, be replaced by —O—, —S—, —NH—, $NR^x$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may each be replaced by N and one or more non-adjacent $CH_2$ groups may each be replaced by O or S, $W^1$ and $W^2$ are each, independently of one another, $-Z^1-A^1-(Z^2-A^2)_m-R$, and one of the two is alternatively $R^1$ or $A^3$, but both are not simultaneously H, or

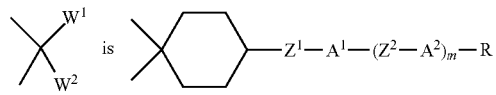

or

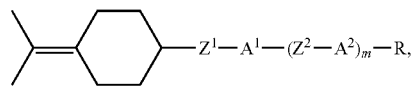

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may each be replaced by O or S, and one of $V^1$ and $V^2$ and, in the case where

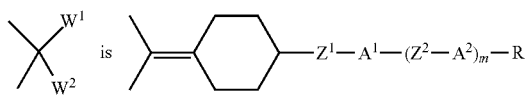

are a single bond, n is 1, 2 or 3

$Z^1$ and $Z^2$ are each, independently of one another, —O—, —S—, —CO—, —COO—, —OCO—, —O—COO—, —CO—$NR^x$—, —$NR^x$—CO—, —O—$CH_2$—, —$CH_2$—O—, —S—$CH_2$—, —$CH_2$—S—, —$CF_2$—O—, —O—$CF_2$—, —$CF_2$—S—, —S—$CF_2$—, —$CH_2$—$CH_2$—, —$CF_2$—$CH_2$—, —$CH_2$—$CF_2$—, —$CF_2$—$CF_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, $R^x$ denotes alkyl having 1 to 6 C atoms, $A^1$, $A^2$ and $A^3$ are each, independently of one another, 1,4-phenylene, in which one or two non-adjacent CH groups may each be replaced by N, 1,4-cyclohexylene, in which one or two non-adjacent $CH_2$ groups may each be replaced by O or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ can be a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may each be replaced by F or C, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to 25 carbon atoms respectively, which may optionally be monosubstituted or polysubstituted by F, Cl, Br, I or CN, and in which one or more non-adjacent $CH_2$ groups may each be replaced by —O—, —S—, —NH—, —$NR^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

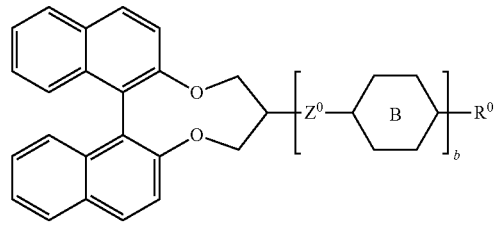

A-VI-1 in which ring B, $R^0$ and $Z^0$ are as defined for the formulae A-IV and A-V, and b is 0, 1, or 2, in particular those selected from the following formulae A-VI-1a to A-VI-1c:

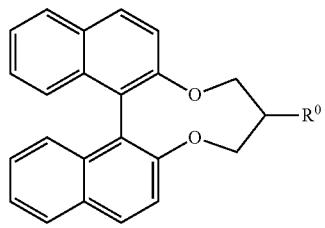

A-VI-1a

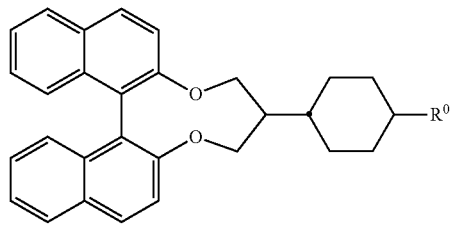

A-VI-1b

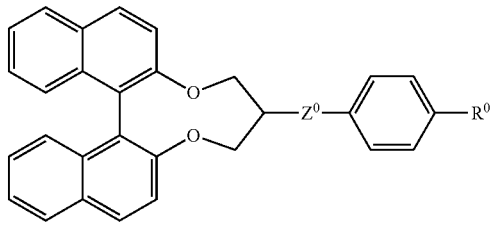

in which ring B, $R^0$ and $Z^0$ are as defined for the formula A-VI-1, and
$R^0$ as defined for formula A-IV or H or alkyl having from 1 to 4 carbon atoms, and
b is 0, 1 or 2,
and $Z^0$ is, in particular, —OC(O)— or a single bond.

The concentration of the one or more chiral dopant(s), in the LC medium is preferably in the range from 0.001% to 20%, preferably from 0.05% to 5%, more preferably from 0.1% to 2%, and, most preferably from 0.5% to 1.5%. These preferred concentration ranges apply in particular to the chiral dopant S-4011 or R-4011 (both from Merck KGaA) and for chiral dopants having the same or a similar HTP. For Chiral dopants having either a higher or a lower absolute value of the HTP compared to S-4011 these preferred concentrations have to be decreased, respectively increased proportionally according to the ratio of their HTP values relatively to that of S-4011.

The pitch p of the LC media or host mixtures according to the invention is preferably in the range of from 5 to 50 μm, more preferably from 8 to 30 μm and particularly preferably from 10 to 20 μm.

Preferably, the media according to the invention comprise a stabiliser selected from the group of antioxidants, preferably hindered phenol antioxidants, and hindered amine light stabilisers (HALS), more preferably selected from the group of compounds of the formulae ST-1 to ST-18.

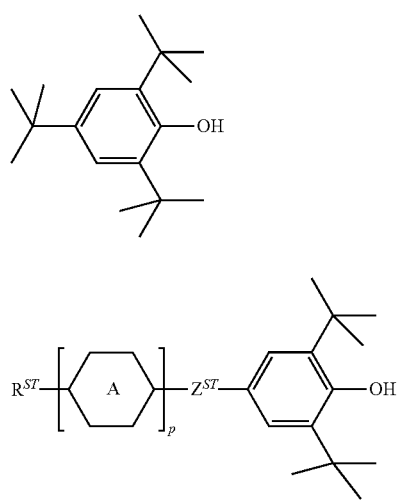

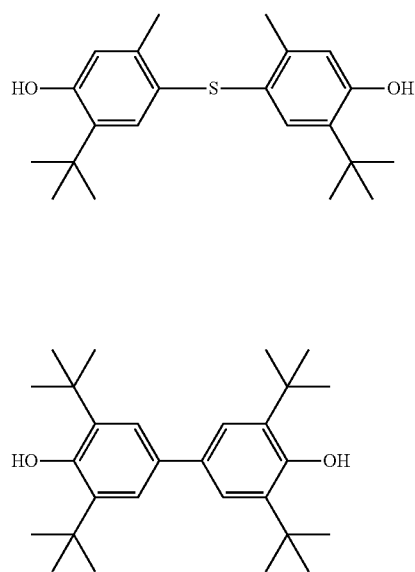

-continued
ST-9
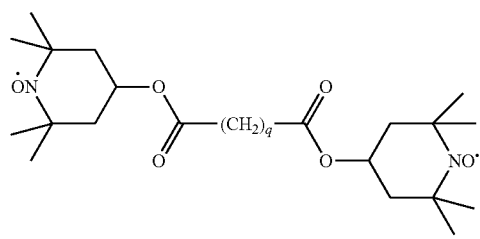
ST-10
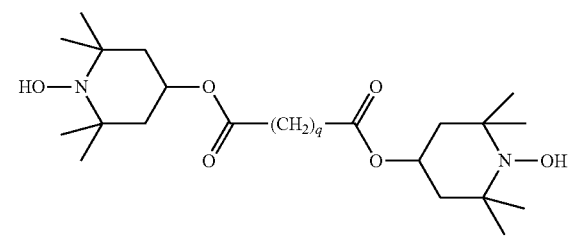
ST-11
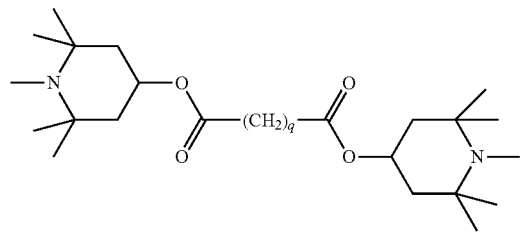
ST-12
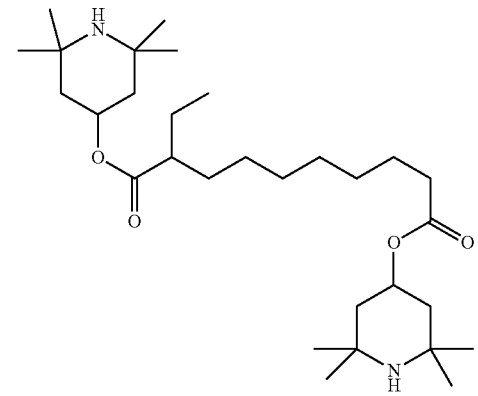
ST-13
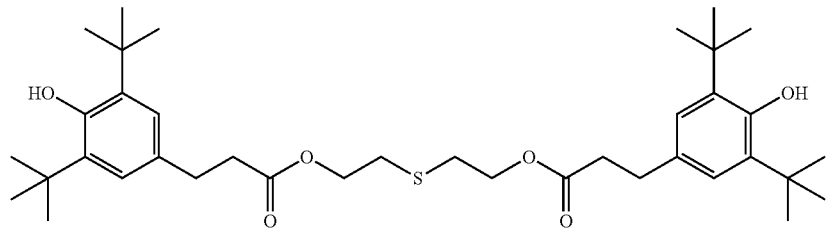
ST-14
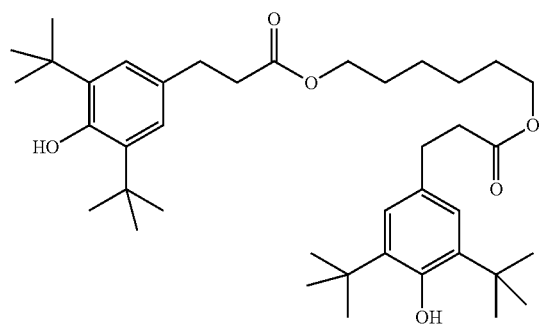
ST-15
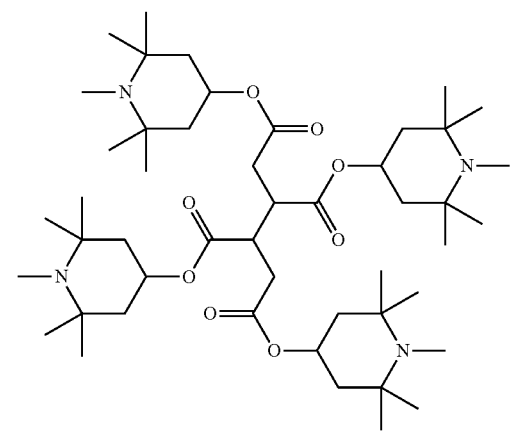

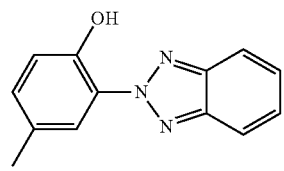
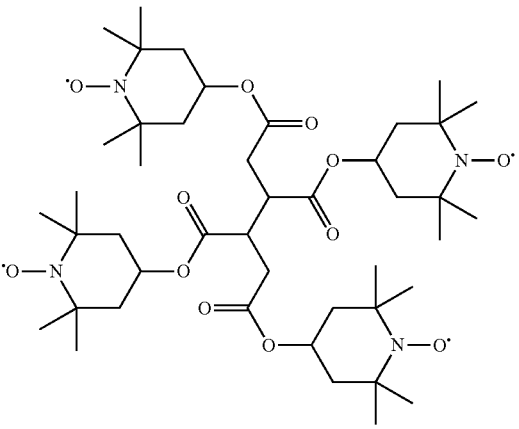
ST-16
ST-17
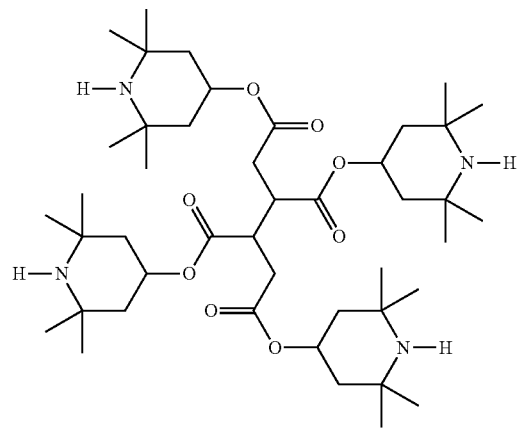
ST-18
in which
$R^{ST}$ denotes H, an alkyl or alkoxy radical having 1 to 15 C atoms, where, in addition, one or more $CH_2$ groups in these radicals may each be replaced, independently of one another, by —C≡C—, —$CF_2$O—, —O$CF_2$—, —CH=CH—,
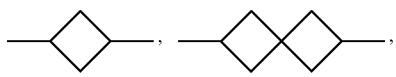
—O—, —CO—O—, —O—CO— in such a way that O atoms are not linked directly to one another, and in which, in addition, one or more H atoms may be replaced by halogen,
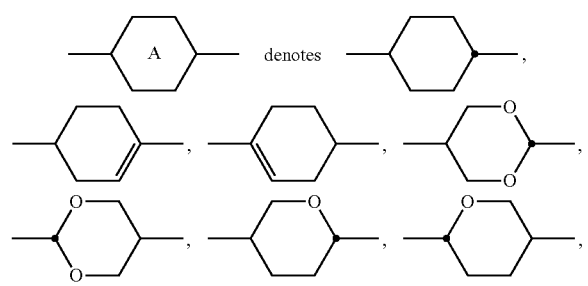
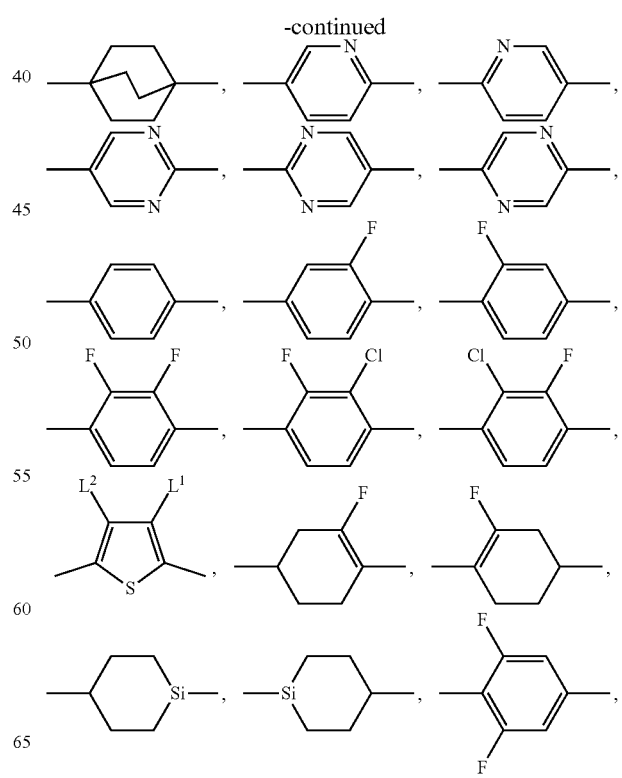

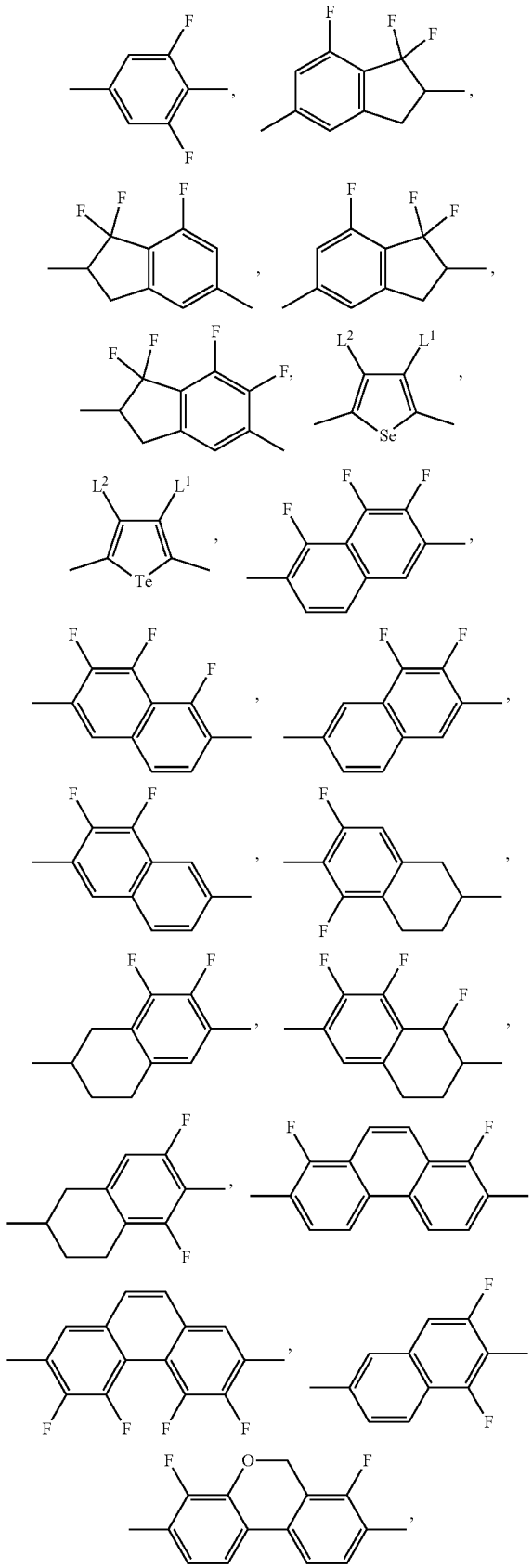

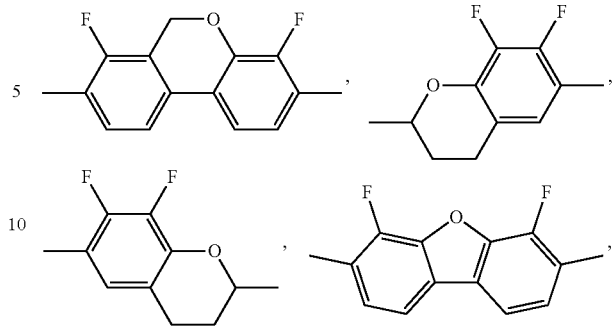

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$, —CH$_2$CF$_2$, —CF$_2$CH$_2$, —CF=CF, —CH=CF, —CF=CH, —CH=CH—, —C≡C— or a single bond, L$^1$ and L$^2$ each, independently of one another, denote F, Cl, CF$_3$ or CHF$_2$, p denotes 1 or 2, q denotes 1, 2, 3, 4, 5, 6, 7, 8, 9 or 10.

Of the compounds of the formula ST, special preference is given to the compounds of the formulae

ST-1

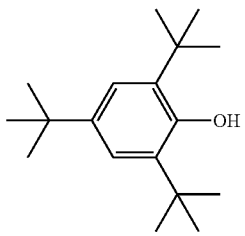

ST-2a

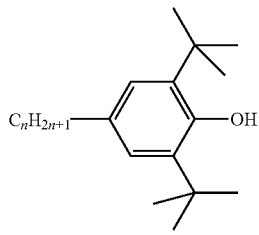

in which n=1, 2, 3, 4, 5, 6 or 7, preferably n=1 or 7

ST-3a

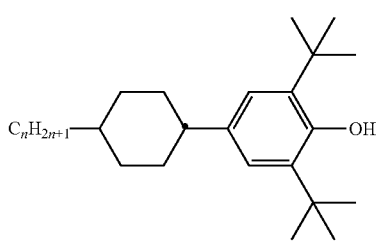

in which n=1, 2, 3, 4, 5, 6 or 7, preferably n=3

ST-3b
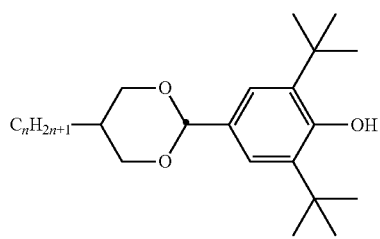
in which n=1, 2, 3, 4, 5, 6 or 7, preferably n=3
ST-8-1
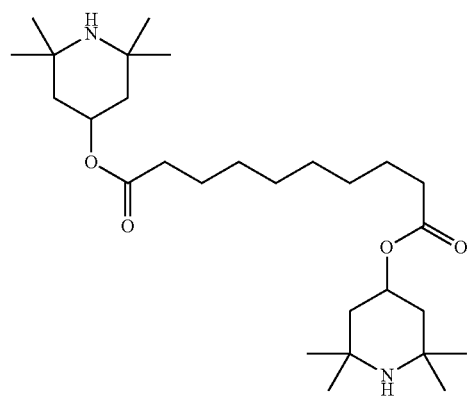
ST-9-1
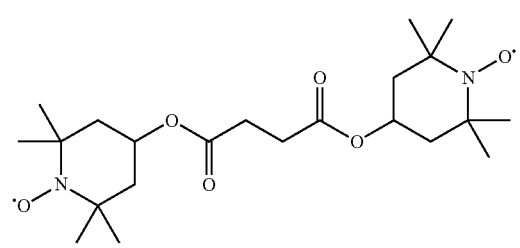
ST-12
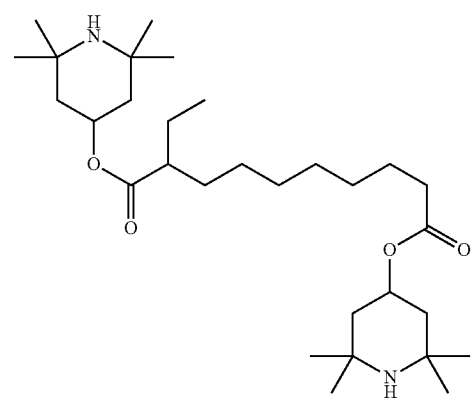
ST-16
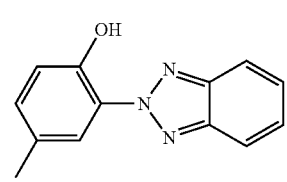
ST-17
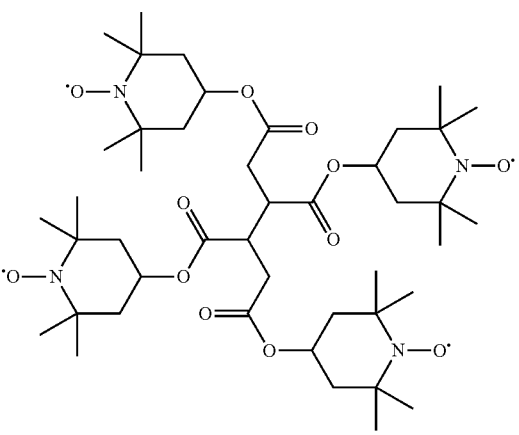
ST-18
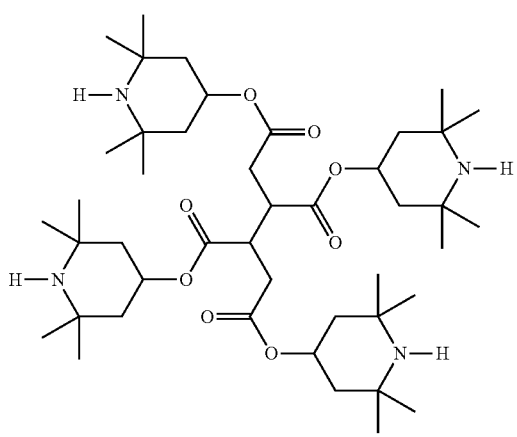
In the compounds of the formulae ST-3a and ST-3b, n preferably denotes 3. In the compounds of the formula ST-2a, n preferably denotes 7.
Very particularly preferred mixtures according to the invention comprise one or more stabilisers from the group of the compounds of the formulae ST-2a-1, ST-3a-1, ST-3b-1, ST-8-1, ST-9-1 and ST-12:
ST-2a-1
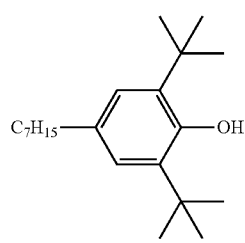
ST-3a-1
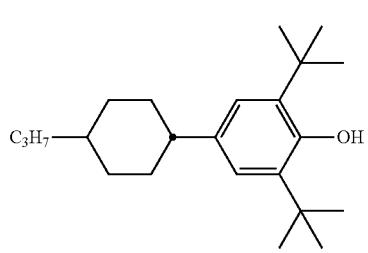

-continued

ST-3b-1

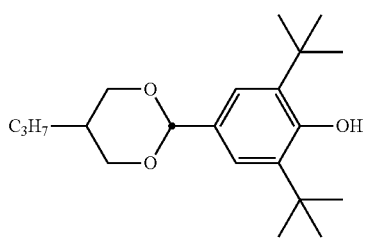

ST-8-1

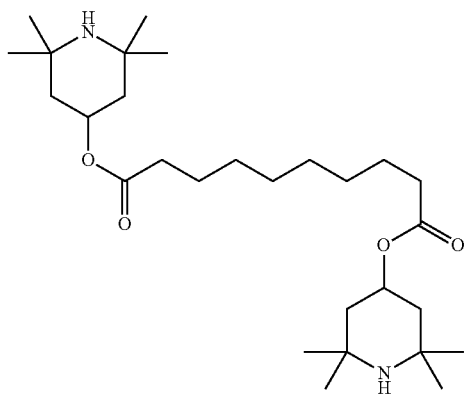

ST-9-1

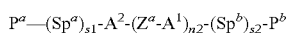

ST-12

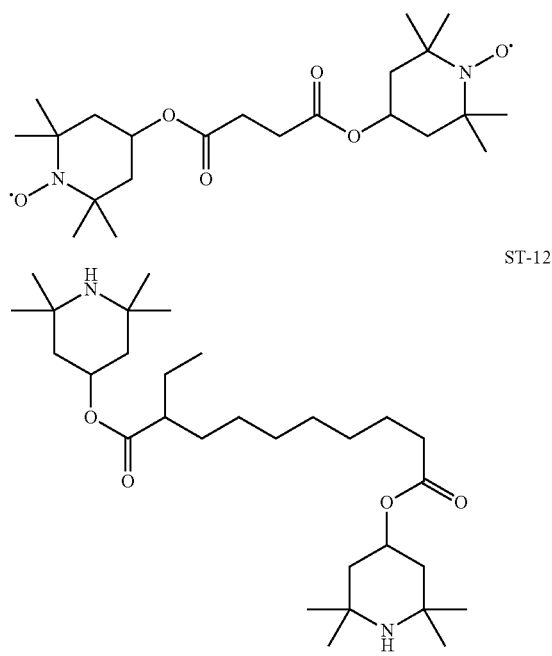

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

According to another aspect of the present invention, the optical component comprises a polymer network liquid crystal obtained by polymerisation of one or more compounds of formula P defined below, in the liquid crystal host mixture comprising one or more compounds selected from the group consisting of the compounds of the formulae I, II and III as defined above. A is described in for example Peng, Fenglin, Chen, Haiwei, Tripathi, Suvagata, Twieg, Robert, Wu, Shin-Tson. (2015). Fast-response infrared phase modulator based on polymer network liquid crystal. Optical Materials Express. Vol. 5, Issue 2, pp. 265-273. doi: 10.1364/OME.5.000265.

$$P^a-(Sp^a)_{s1}-A^2-(Z^a-A^1)_{n2}-(Sp^b)_{s2}-P^b \qquad P$$

in which the individual radicals have the following meanings:

$P^a$, $P^b$ each, independently of one another, denote a polymerisable group, $Sp^a$, $Sp^b$ on each occurrence, identically or differently, denote a spacer group, s1, s2 each, independently of one another, denote 0 or 1, $A^1$, $A^2$ each, independently of one another, denote a radical selected from the following groups:

a) the group consisting of trans-1,4-cyclohexylene, 1,4-cyclohexenylene and 4,4'-bicyclohexylene, wherein, in addition, one or more non-adjacent $CH_2$ groups may be replaced by —O— and/or —S— and wherein, in addition, one or more H atoms may be replaced by F, b) the group consisting of 1,4-phenylene and 1,3-phenylene, wherein, in addition, one or two CH groups may be replaced by N and wherein, in addition, one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of

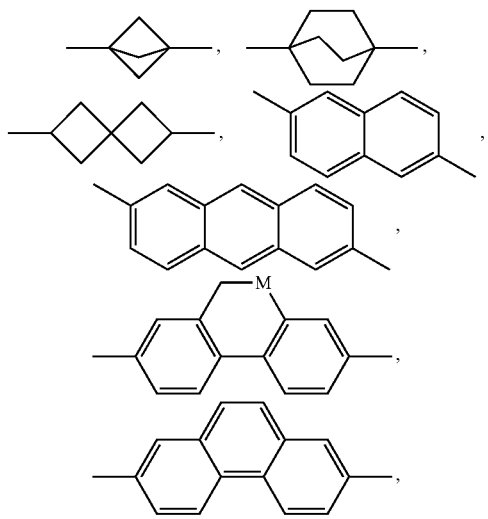

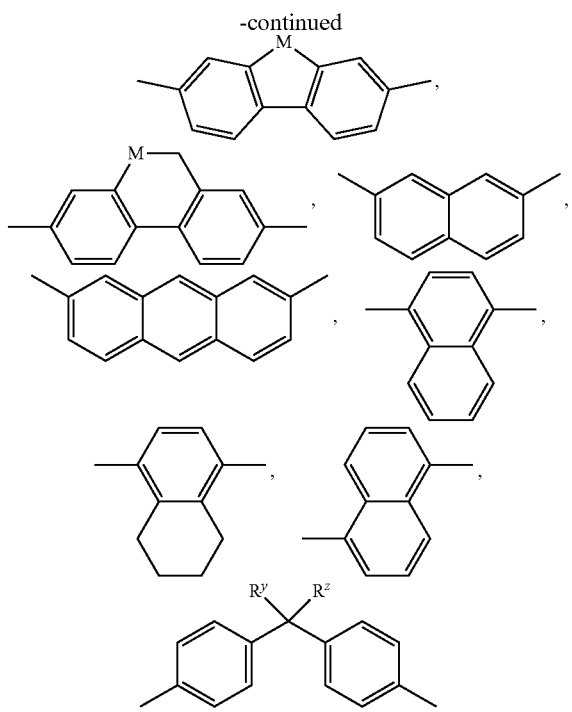

where one or more H atoms in these radicals may be replaced by L, and/or one or more double bonds may be replaced by single bonds, and/or one or more CH groups may be replaced by N, n2 denotes 0, 1, 2 or 3, $Z^a$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^y$R$^z$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkyl-carbonyloxy or alkoxycarbonyloxy having 1 to 12 C atoms, R$^y$, R$^z$ each, independently of one another, denote H, F or straight-chain or branched alkyl having 1 to 12 C atoms, wherein, in addition, one or more H atoms may be replaced by F, M denotes —O—, —S—, —CH$_2$—, —CHY$^1$— or —CY$^1$Y$^2$—, and Y$^1$ and Y$^2$ each, independently of one another, have one of the meanings indicated above for R$^Y$ or denote C or CN.

The polymerisable group $P^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{a,b}$ are selected from the group consisting of CH$_2$=CW$^1$—CO—O—, CH$_2$=CW$^1$—CO—,

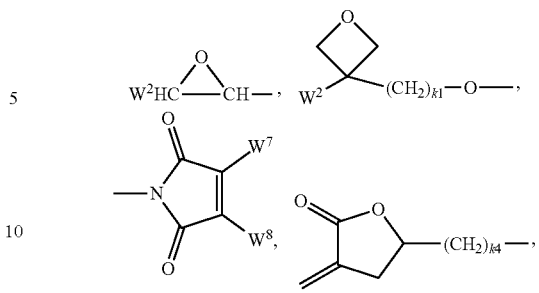

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, wherein W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{a,b}$ are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, CH$_2$=CH)$_2$CH—O—CO—, (CH$_2$=CH)$_2$CH—O—,

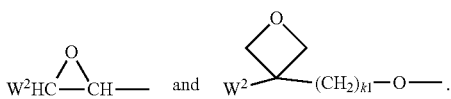

Very particularly preferred groups $P^{a,b}$ are selected from the group consisting of acrylate, methacrylate, fluoroacrylate, furthermore vinyloxy, chloroacrylate, oxetane and epoxide groups, and of these preferably an acrylate or methacrylate group.

Preferred spacer groups $Sp^{a,b}$ are selected from the formula Sp"—X", so that the radical $P^{a,b}$-$Sp^{a,b}$- conforms to the formula $P^{a,b}$—Sp"—X"—, where Sp" denotes alkylene having 1 to 20, preferably 1 to 12, C atoms, which is optionally mono- or polysubstituted by F, Cl, Br, I or CN and wherein, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^{00}$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^3$=CY$^4$—, —C≡C—, —CH=CH—CO—O—, —O—CO—CH=CH— or a single bond, R$^0$, R$^{00}$ and R$^{000}$ each, independently of one another, denote H or alkyl having 1 to 12 C atoms, and Y$^3$ and Y$^4$ each, identically or differently, denote H, F, C or CN.

X" is preferably —O—, —S—, —CO—, —C(O)O—, —OC(O)—, —O—C(O)O—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, wherein p1 is an integer from 1 to 12, q1 is an integer from 1 to 3, and R$^{00}$ and R$^{000}$ have the meanings indicated above.

Particularly preferred groups -Sp"—X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, wherein p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers of formula P are the following:

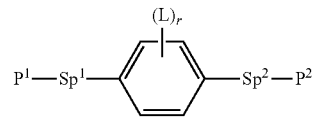
P1

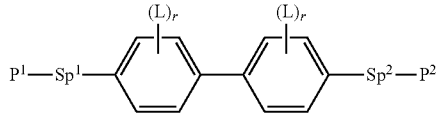
P2

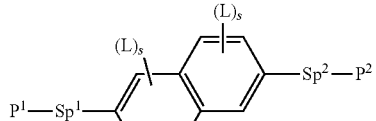
P3

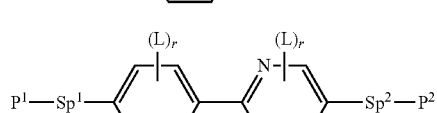
P4

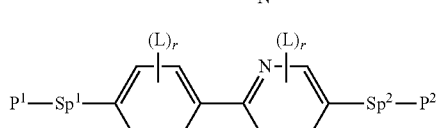
P5

-continued

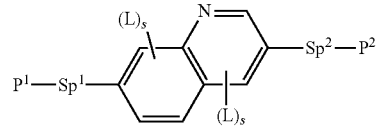
P6

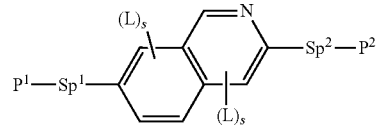
P7

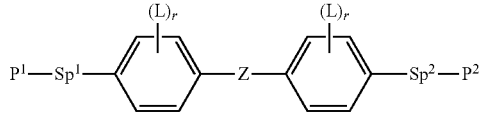
P8

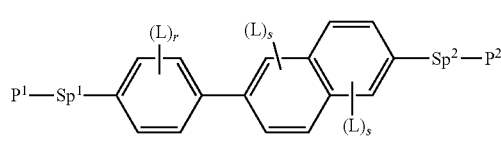
P9

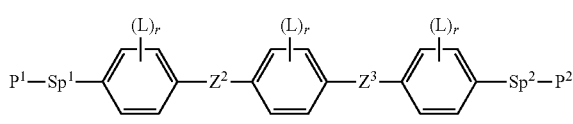
P10

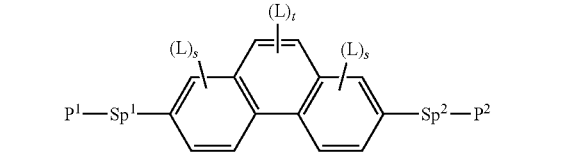
P11

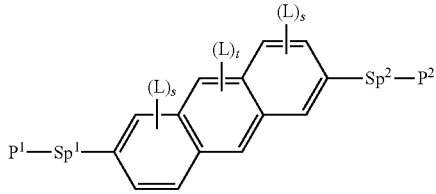
P12

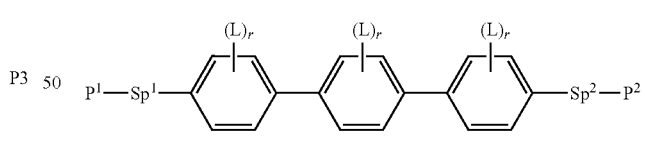
P13

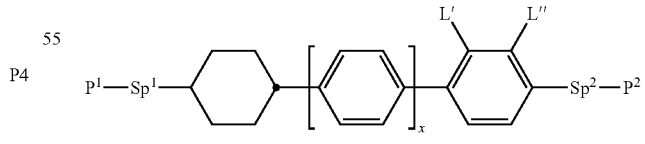
P14

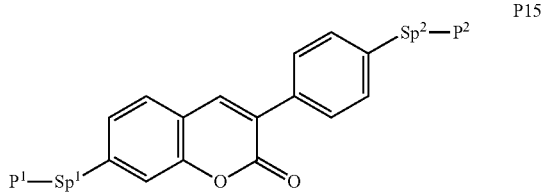
P15

P16
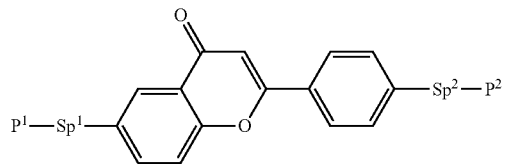
P17
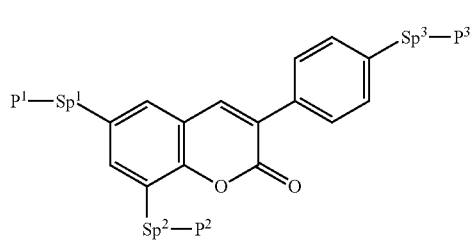
P18
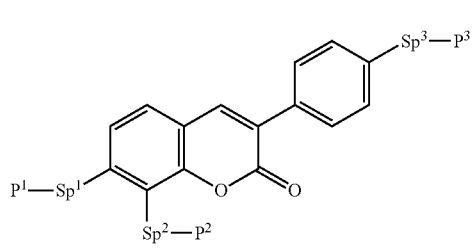
P19
P20
P21
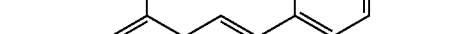
P22
P23
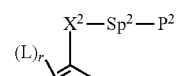
P24
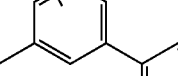
P25
P26
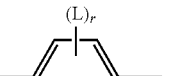
P27
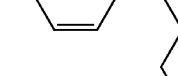
P28
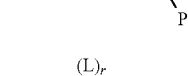
P29
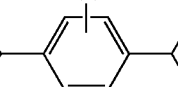
P30
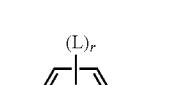

-continued

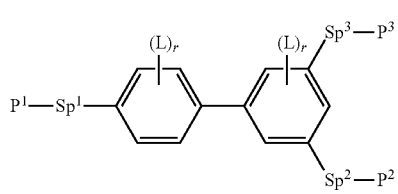
P31 in which the individual radicals have the following meanings:

$P^1$, $P^2$ and $P^2$ each, independently of one another, denote a polymerisable group as defined for formula P, preferably an acrylate, methacrylate, fluoroacrylate, oxetane, vinyloxy or epoxide group, $Sp^1$, $Sp^2$ and $Sp^3$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, and where the linking to the adjacent ring in the last-mentioned groups takes place via the O atom, where, in addition, one or more of the radicals $P^1$-$Sp^1$-, $P^2$—$Sp^2$- and $P^3$-$Sp^3$- may denote a radical $R^{aa}$, with the proviso that at least one of the radicals $P^1$-$Sp^1$-, $P^2$—$Sp^2$- and $P^3$—$Sp^3$- present does not denote $R^{aa}$, $R^{aa}$ denotes H, F, Cl, CN or straight-chain or branched alkyl having 1 to 25 C atoms, wherein, in addition, one or more non-adjacent $CH_2$ groups may each be replaced, independently of one another, by $C(R^0)$═C($R^{00}$)—, —C≡C—, —N($R^0$)—, —O—, —S—, —CO—, —CO—O—, —O—CO—, —O—CO—O— in such a way that —O— and/or —S— atoms are not linked directly to one another, and wherein, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another, denote H or alkyl having 1 to 12 C atoms, $R^y$ and $R^z$ each, independently of one another, denote H, F, $CH_3$ or $CF_3$, $Z^{p1}$ denotes —O—, —CO—, —C($R^yR^z$)— or —$CF_2CF_2$—, $Z^{p2}$ and $Z^{p3}$ each, independently of one another, denote —CO—O—, —O—CO—, —$CH_2$O—, —O$CH_2$—, —$CF_2$O—, —O$CF_2$— or —$(CH_2)_{n3}$—, where n3 is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

In a particularly preferred embodiment of the present invention the LC mixture comprises one or more compounds or formula P10-1

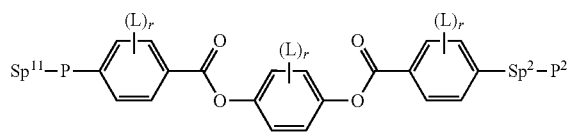
P10-1 wherein the parameters are defined as described above and $P^1$ and $P^2$ preferably denote acrylate or methacrylate.

Particularly preferred compounds of formula P10-1 are selected from the group of the following subformulae

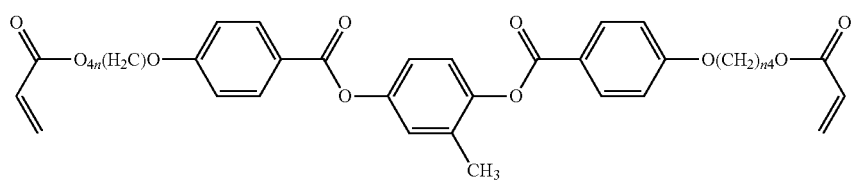
P10-1-1

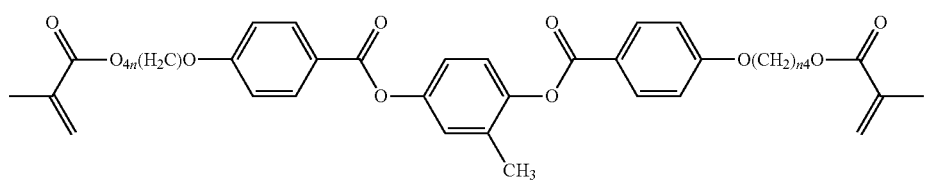
P10-1-2 wherein each n4 denote independently of each other an integer between 2 and 10, preferably 3, 4, 5 or 6.

In one embodiment of the present invention the liquid crystal composition is injected between the first and second substrates or is filled into the cell by capillary force after combining the first and second substrates. In an alternative embodiment, the liquid crystal composition may be interposed between the first and second substrates by combining the second substrate to the first substrate after loading the liquid crystal composition on the first substrate.

The total amount of the compounds of formula P in the medium is in the range of from >0% to 20%, preferably 2% to 15%, very preferably 3% to 10%, in particular 4%, 5%, 6%, 7% or 8%.

The polymerisable compounds are polymerised or cross-linked (if a polymerisable compound contains two or more polymerisable groups) by in-situ polymerisation in the LC medium between the sub-strates of the optical component, optionally with application of a voltage. The poly-merisation can be carried out in one step or in more than one step ("end curing").

Suitable and preferred polymerisation methods are, for example, thermal or photopolymerisation, preferably photopolymerisation, in particular UV photo-polymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369@ or Darocure1173® (BASF SE). If an initiator is employed, its proportion is preferably 0.001 to 5% by weight, par-ticularly preferably 0.001 to 1% by weight.

The polymerisable compounds according to the invention are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the com-mer-cially available stabilisers from the Irganox® series (BASF SE), such as, for example, Irganox®1076. If stabilisers are employed, their propor-tion, based on the total amount of the RMs or the polymerisable component, is preferably 10-10,000 ppm, particularly preferably 50-500 ppm.

Other mesogenic compounds which are not explicitly mentioned above can optionally and advantageously also be used in the media in accordance with the present invention. Such compounds are known to the person skilled in the art.

In a preferred embodiment of the present invention, the liquid-crystalline medium comprises in total 30% or more, preferably 40% or more and particularly preferably 50% or more compounds of formula I, preferably selected from the group of compounds of the I-1, I-2 and I-3, particularly preferably selected from the compounds of the formulae I-2 and I-3.

In another preferred embodiment of the present invention, the liquid-crystalline medium comprises in total 20% or less, preferably 18% or less and particularly preferably 15% or less compounds of formula I, preferably selected from the group of compounds of the I-1, I-2 and I-3, particularly preferably selected from the compounds of the formulae I-2 and I-3.

Preferably, the proportion of the compounds if formula I-1 in the medium is 20% or less, more preferably 15% or less, particularly preferably 10% or less and very particularly preferably 5% or less.

In a preferred embodiment, the medium comprises one or more compounds of formula I-2 in a total concentration in the range of from 5% to 25%, more preferably from 7% to 25%, and particularly preferably from 10% to 20%.

In another preferred embodiment, the medium comprises one or more compounds of formula I-2 in a total concentration of 10% or less, preferable of 5% or less and particularly preferably of 2% or less.

In a preferred embodiment, the medium comprises a compound of the formula I-3, preferably in the range of from 5% to 50%, more preferably from 10% to 40%, and particularly preferably from 15% to 35%.

In a preferred embodiment, the total concentration of the compounds of formula I-3 in the media according to the present invention is 20% or more, more preferably 25% or more and particularly preferably 30% or more.

In a preferred embodiment of the present invention the medium comprises one or more compounds of formula II and/or RO-2, preferably II-1 and/or RO-2, in a total concentration of 5% to 40%, more preferably 10% to 37%, particularly preferably 15% to 35%.

Preferably, the medium comprises one or more the compounds of the formula II-1.

In a preferred embodiment of the present invention the medium comprises one or more compounds of formula II-1 in a total concentration of 25% or less, more preferably 20% or less, particularly preferably 15% or less, very particularly preferably 10% or less.

In a preferred embodiment of the present invention the medium comprises one or more compounds of formula III, preferably III-1, very preferably of formula III-1b in a total concentration of 2% to 30%, more preferably 5% to 25%, very preferably 10% to 25%, and in particular 10% to 20%.

In a preferred embodiment of the present invention the medium comprises one or more compounds of formula RO in a total concentration in the range of from 2% to 35%, more preferably from 5% to 30%, particularly preferably from 7% to 25%.

In a preferred embodiment of the present invention, the liquid-crystalline media preferably comprise in total 5% to 35%, preferably 10% to 32% and particularly preferably 20% to 30% of compounds of formula T.

In a preferred embodiment of the present invention, the liquid-crystalline medium comprises in total 30% or less, preferably 15% or less and particularly preferably 10% or less compounds of formula T.

Preferably, the medium comprises one or more compounds of formula C, preferably in a total concentration in the range of from 5% to 50%, preferably from 10% to 40% and particularly preferably from 15% to 30%.

Further preferred embodiments of the present invention, taken alone or in combination with one another, are as follows, wherein some compounds are abbreviated using the acronyms given in Table C:

- The medium comprises one or more compounds of formula RO and one or more compounds of formula T
- The medium comprises one or more compounds of formula T-1;
- The medium comprises one or more compounds of formula T-2;
- The medium comprises one or more compounds of formula T-1 and T-2;
- The medium comprises one or more compounds of formula T-1 and/or T-2 and one or more compounds of formula I and/or II and/or III;
- The medium comprises one or more compounds of formula III-1;

The medium comprises two or more compounds of formula T-1;
The medium comprises two or more compounds of formula T-2;
The medium comprises the compound PPU-TO-S;
The medium comprises one or more compounds of formula RO and one or more compounds of formula III-1, in particular of formula RO-2 and of formula III-1b, preferably in a total concentration in the range of from 20 to 70%, more preferably 30 to 65%, very preferably from 35 to 62%, and particularly preferably from 40 to 60%;
The medium comprises one or more compounds of formula PPTU-n-S and/or PPTU-(cn)m-S in an total concentration in the range of from 10 to 20%;
The medium comprises one or more compounds of formula PTPU-n-S and/or PTPU-(cn)m-S in an total concentration in the range of from 10 to 20%;
The medium comprises one or more compounds of formula PPTU-n-S and PGTU-n-S in an total concentration in the range of from 15 to 25%;

The liquid-crystal media in accordance with the present invention preferably have a clearing point of 90° C. or more, more preferably 100° C. or more, more preferably 110° C. or more, more preferably 120° C. or more, more preferably 130° C. or more, particularly preferably 140° C. or more and very particularly preferably 150° C. or more.

The liquid-crystal media in accordance with the present invention preferably have a clearing point of 160° C. or less, more preferably 140° C. or less, particularly preferably 120° C. or less, and very particularly preferably 100° C. or less.

The nematic phase of the media according to the invention preferably extends at least from 0° C. or less to 90° C. or more. It is advantageous for the media according to the invention to exhibit even broader nematic phase ranges, preferably at least from −10° C. or less to 120° C. or more, very preferably at least from −20° C. or less to 140° C. or more and in particular at least from −30° C. or less to 150° C. or more, very particularly preferably at least from −40° C. or less to 170° C. or more.

The $\Delta\varepsilon$ of the liquid-crystal medium according to the present invention, at 1 kHz and 20° C., is preferably 10 or more, more preferably 15 or more and very preferably 18 or more.

The birefringence ($\Delta n$) of the liquid-crystal media according to the present invention, at 589 nm ($Na^D$) and 20° C., is preferably 0.280 or more, more preferably 0.300 or more, even more preferably 0.320 or more, very preferably 0.330 or more and in particular 0.350 or more.

The $\Delta n$ of the liquid-crystal media according to the present invention, at 589 nm ($Na^D$) and 20° C., is preferably in the range from 0.200 to 0.900, more preferably in the range from 0.250 to 0.800, even more preferably in the range from 0.300 to 0.700 and very particularly preferably in the range from 0.350 to 0.600.

In a preferred embodiment of the present application, the $\Delta n$ of the liquid-crystal media in accordance with the present invention is preferably 0.50 or more, more preferably 0.55 or more.

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

The compounds of the formulae I, II and III are preferably dielectrically positive.

In some embodiments, however, liquid crystals having a negative value of the dielectric anisotropy can also advantageously be used.

Preferably, the optical component according to the invention is arranged and configured as an optical phase modulator.

In a preferred embodiment, the optical component according to the invention is designed and configured for use in a transparent device for phase modulation of IR radiation.

In another preferred embodiment, the optical component according to the invention is designed and configured for use in a reflective device for phase modulation of IR radiation.

A typical electro-optical modulator comprises conducting, infrared transmitting windows consisting for example of Ge, separated from one anther by spacers and having a cell gap in the range of from 1 mm to 5 mm.

According to another aspect of the present invention there is provided a LIDAR scanning system as described in WO2018/156643 A1, including a laser configured to emit pulses of light at an operating wavelength in the infrared. The LIDAR scanning system includes a transmit reconfigurable-metasurface configured to reflect an incident pulse of light from the laser as an illumination beam pointing at a selected portion of a field of view, preferably a two dimensional field of view. The pointing of the illumination beam is responsive to a first selected holographic beam steering pattern implemented in the transmit reconfigurable-metasurface. The system further includes a receive reconfigurable-metasurface configured to reflect a return of the illumination beam from the selected portion of the field of view as a relay beam pointing at an optical detector. The pointing of the relay beam is responsive to a second selected holographic beam steering pattern implemented in the receiving reconfigurable-metasurface. The system includes an optical detector comprising an array of detector pixels. Each detector pixel includes (i) a photodetector configured to detect light in the return of the illumination beam and (ii) a timing circuit configured to determine a time of flight of the detected light. The optical detector is also configured to output a detection signal indicative of the detected light and a time of flight of the detected light for each pixel of the array. The transmit reconfigurable-metasurface includes a plurality of dynamically adjustable high-Q dielectric resonators arranged on a surface of the reconfigurable-metasurface with inter-element spacing less than the operating wavelength of the laser, where the surface of the reconfigurable-metasurface includes a conducting surface, and the plurality of resonators have a corresponding plurality of adjustable reflection phases providing a dynamically adjustable reflected wave responsive to an incident wave, wherein the conducting surface and the plurality of resonators define a metasurface. Each of the plurality of dielectric resonators includes (i) a pair of regions having high refractive index; and (ii) an electrically-adjustable material disposed in a gap between the regions, wherein the electrically-adjustable material is a liquid crystal material as set forth above and below.

According to another aspect of the invention and referring to FIG. 1 there is provided a reflective spatial light modulator, in particular an LCoS device 100 including the liquid crystal material 140 as defined above, sandwiched between a transparent glass layer 110 having a transparent electrode 120, a mirror 150 mounted on a silicon CMOS backplane 160 and PCB mounting (not shown). The mirror is divided into a two-dimensional array of individually addressable pixels. Each pixel is individually drivable by a voltage signal to provide a local phase change to at least one polarization component of an optical signal, thereby providing a two-dimensional array of phase manipulating regions. Pre-alignment of the liquid crystal 140 is provided by alignment layers 131 and 132.

Said LCoS device is useful for the integration into optical devices. Preferred devices are a wavelength selective switch (WSS), LIDAR scanner, infrared scene projector, as well as other beam steering applications as shown in the article Micallef, F. (2019). Middle infrared beam-steering using liquid crystals for spatial light modulation (Doctoral thesis). https://doi.org/10.17863/CAM.39602 (https://www.repository.cam.ac.uk/handle/1810/292443).

In the present application, the expression "dielectrically positive" means compounds or components where $\Delta\varepsilon > 3.0$, dielectrically neutral means those where $-1.5 \leq \Delta\varepsilon \leq 3.0$ and dielectrically negative means those where $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{ave.}$ is $(\varepsilon_\| + 2\varepsilon_\perp)/3$.

The host mixture used for the determination of physical constants of pure compounds by extrapolation is ZLI-4792 from Merck KGaA, Germany. The absolute values of the dielectric constants, the birefringence ($\Delta n$) and the rotational viscosity ($\gamma_1$) of the compounds are determined from the change in the respective values of the host mixture on addition of the compounds. The concentration in the host is 10% or in case of insufficient solubility 5%. The values are extrapolated to a concentration of 100% of the added compounds.

In the examples, the phase sequences of pure compounds are given using the following abbreviations:

K: crystalline, N: nematic, SmA: smectic A, SmB: smectic B, I: isotropic.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon_\|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

In the present application, the term compounds is taken to mean both one compound and a plurality of compounds, unless expressly stated otherwise.

All mixtures according to the invention are nematic. The liquid-crystal media according to the invention preferably have nematic phases in preferred ranges given above. The expression have a nematic phase here means on the one hand that no smectic phase and no crystallisation are observed at low temperatures at the corresponding temperature and on the other hand that no clearing occurs on heating from the nematic phase. At high temperatures, the clearing point is measured in capillaries by conventional methods. The investigation at low temperatures is carried out in a flow viscometer at the corresponding temperature and checked by storage of bulk samples: The storage stability in the bulk (LTS) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallisation. For every material and at each temperature two bottles are stored. If crystallisation or the appearance of a smectic phase is observed in at least one of the two correspondent bottles the test is terminated and the time of the last inspection before the one at which the occurrence of a higher ordered phase is observed is recorded as the respective storage stability. The test is finally terminated after 1000 h, i.e. an LTS value of 1000 h means that the mixture is stable at the given temperature for at least 1000 h.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.05% to 15%, more preferably from 1% to 10% and most preferably from 2% to 6%.

Optionally the media according to the present invention may comprise further liquid crystal compounds in order to adjust the physical properties. Such compounds are known to the skilled person. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electro-optical response, from 0% to 90% ($t_{90}-t_0$), i.e. including the delay time ($t_{10}-t_0$), as decay time ($\tau_{off}$) for the time for the change of the relative tuning, respectively of the relative contrast for the electro-optical response, from 100% back to 10% ($t_{100}-t_{10}$) and as the total response time ($\tau_{total}=\tau_{on}+\tau_{off}$), respectively.

The liquid-crystal media according to the invention consist of a plurality of compounds, preferably 3 to 30, more preferably 4 to 20 and very preferably 4 to 16 compounds.

These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to D below. All groups $C_nH_{2n+1}$, $C_mH_{2m+1}$, and $C_lH_{l+1}$, and $C_nH_{2n}$, $C_mH_{2m}$ and $C_lH_{2l}$ denote straight-chain alkyl or akylene, respectively, in each case having n, m or l C atoms, wherein n and m, independently are 1, 2, 3, 4, 5, 6 or 7 and l is 1, 2 or 3. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

| Ring elements | |
|---|---|
| C |  |
| D | 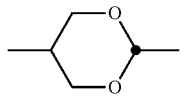 |

TABLE A-continued

| Ring elements | |
|---|---|
| DI | 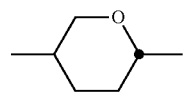 |
| A | 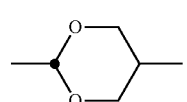 |
| AI | 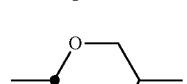 |
| G | 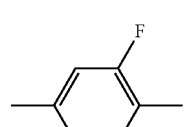 |
| GI | 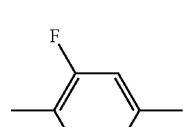 |
| G(Cl) | 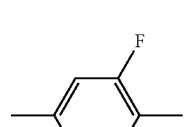 |
| P(Cl,Cl) | 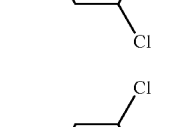 |
| U | 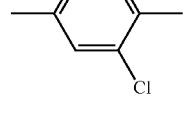 |
| UI | 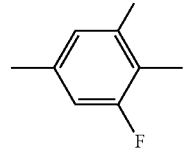 |
| U(F,F) | 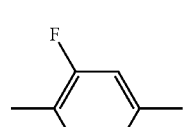 |

TABLE A-continued
| | Ring elements | | | Ring elements |
|---|---|---|---|---|
| Y | 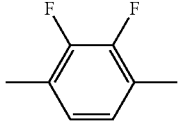 | tH2fI | 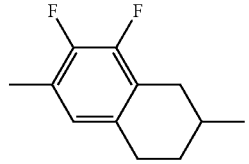 |
| M | 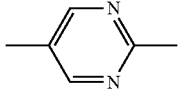 | dH | 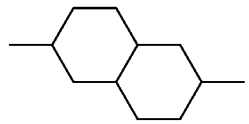 |
| MI | 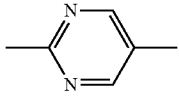 | K | 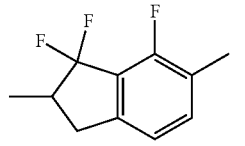 |
| N | 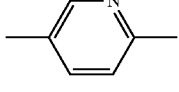 | KI | 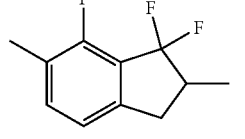 |
| NI | 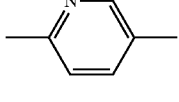 | L | 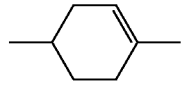 |
| Np | 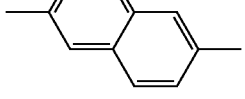 | LI | 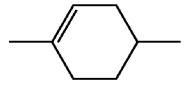 |
| N3f | 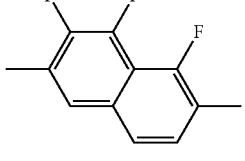 | F | 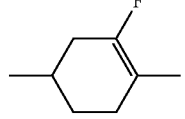 |
| N3fI | 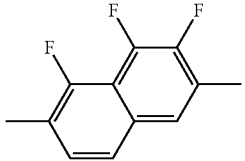 | FI | 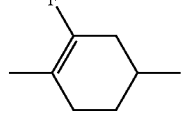 |
| tH | 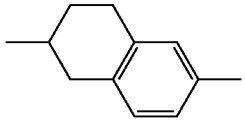 | P | 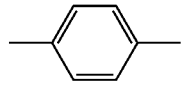 |
| tHI | 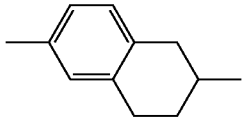 | P(n,m) | 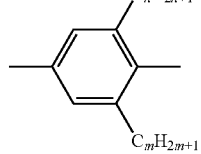 |
| tH2f | 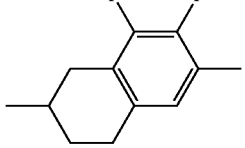 | P(o) | 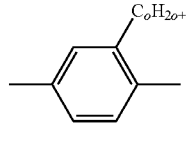 |

TABLE A-continued

| Ring elements | |
|---|---|
| Pl(o) | $C_oH_{2o+1}$ substituted benzene |
| P(i3) | isopropyl substituted benzene |
| Pl(ic3) | isopropyl substituted benzene |
| P(t4) | tert-butyl substituted benzene |
| Pl(t4) | tert-butyl substituted benzene |
| P(c3) | cyclopropyl substituted benzene |
| Pl(c3) | cyclopropyl substituted benzene |
| P(c4) | cyclobutyl substituted benzene |
| Pl(c4) | cyclobutyl substituted benzene |
| P(c5) | cyclopentyl substituted benzene |
| Pl(c5) | cyclopentyl substituted benzene |
| P(e5) | cyclopentenyl substituted benzene |
| Pl(e5) | cyclopentenyl substituted benzene |
| P(c6) | cyclohexyl substituted benzene |
| Pl(c6) | cyclohexyl substituted benzene |
| P(e6) | cyclohexenyl substituted benzene |

TABLE A-continued
Ring elements
PI(e6) 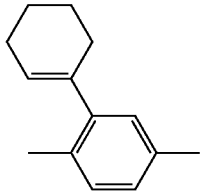
GI(o) 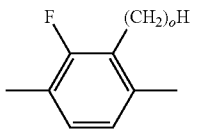
in which o = 1, 2, 3, 4, 5, or 6
G(o) 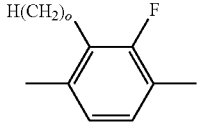
in which o = 1, 2, 3, 4, 5, or 6
GI(i3) 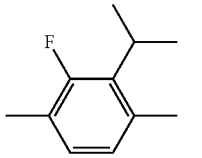
G(i3) 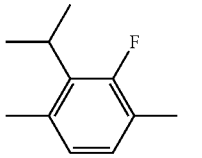
GI(t4) 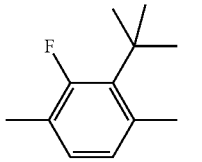
G(t4) 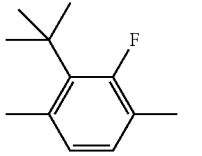
GI(c3) 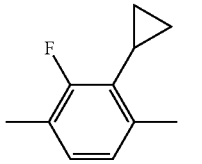
G(c3) 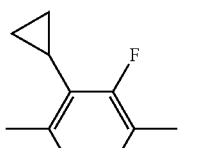
TABLE A-continued
Ring elements
GI(c4) 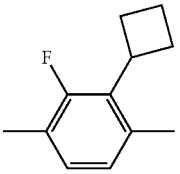
G(c4) 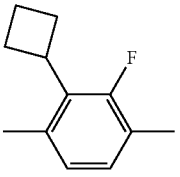
GI(c5) 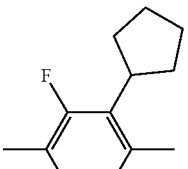
G(c5) 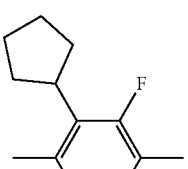
GI(e5) 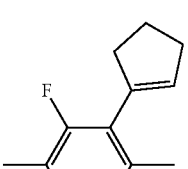
G(e5) 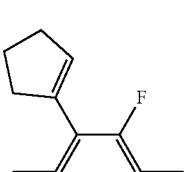
GI(c6) 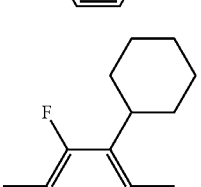
G(c6) 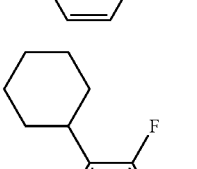

TABLE A-continued

Ring elements

| | | |
|---|---|---|
| GI(e6) | 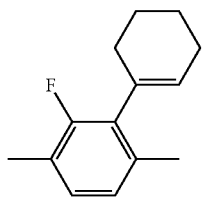 | |
| G(e6) | 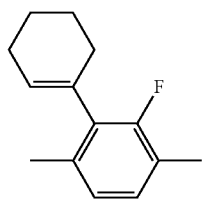 | |
| Np(1,4) | 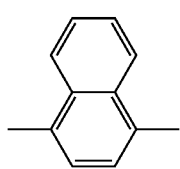 | |
| Th | 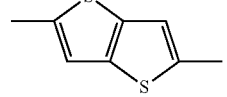 | |

TABLE B

Linking groups

| | | | | |
|---|---|---|---|---|
| E | —CH$_2$CH$_2$— | Z | —CO—O— |
| V | —CH=CH— | Zl | —O—CO— |
| X | —CF=CH— | O | —CH$_2$—O— |
| Xl | —CH=CF— | Ol | —O—CH$_2$— |
| B | —CF=CF— | Q | —CF$_2$—O— |
| T | —C≡C— | Ql | —O—CF$_2$— |
| W | —CF$_2$CF$_2$— | | |

TABLE B

End groups

| Left-hand side | | Right-hand side | |
|---|---|---|---|
| *Used alone* | | | |
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| -(cn)- | 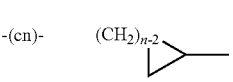 | -(cn) | 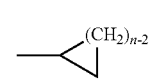 |
| -(cn)m- | 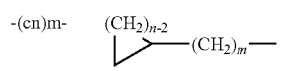 | -m(cn) | 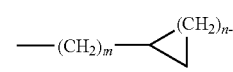 |
| *Used in combination with others* | | | |
| -...A...- | —C≡C— | -...A...- | —C≡C— |
| -...V...- | —CH=CH— | -...V...- | —CH=CH— |
| -...Z...- | —CO—O— | -...Z...- | —CO—O— |
| -...ZI...- | —O—CO— | -...ZI...- | —O—CO— |
| -...K...- | —CO— | -...K...- | —CO— |
| -...W...- | —CF=CF— | -...W...- | —CF=CF— | in which n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

Table C: Illustrative Structures

The following illustrative structures are compounds, which are preferably additionally used in the media:

PG-n-S
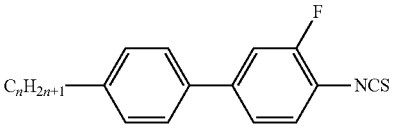

PU-n-S
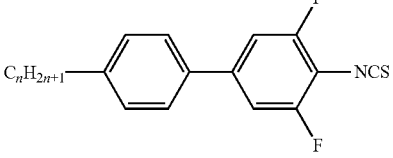

PTP-(c3)m-S
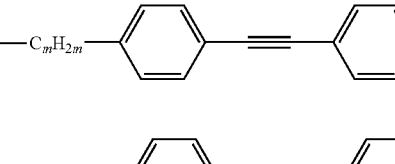

PTP-(c4)m-S

PPG-n-S
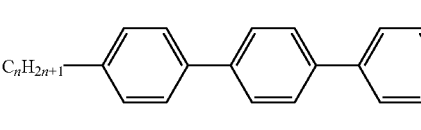

PGG-n-S
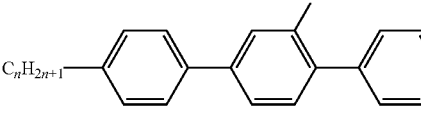

PPU-n-S
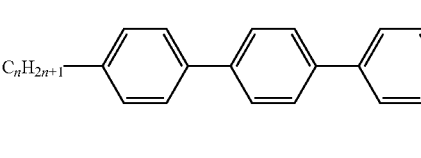

GGP-n-S
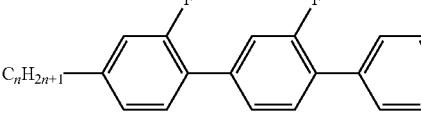

PGP-(c3)m-S
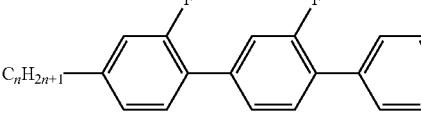

PGU-n-S
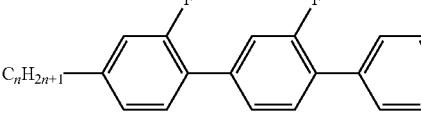

CPG-n-S
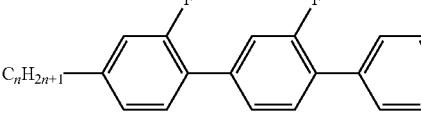

CGG-n-S
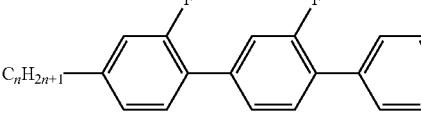

CPU-n-S
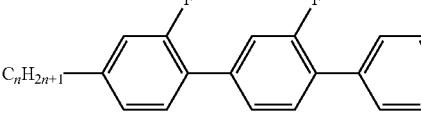

CPTU-n-S
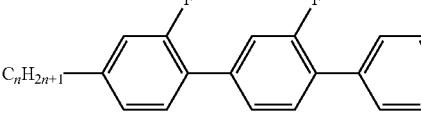

CPTU-(c3)m-S
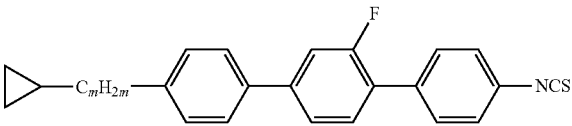

CPU(F,F)-n-S
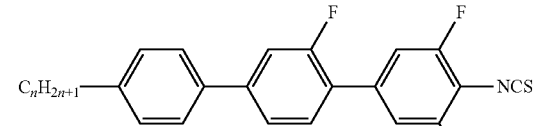

CGU-n-S
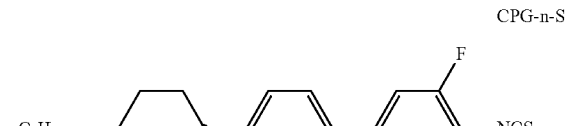

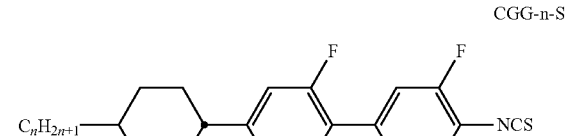
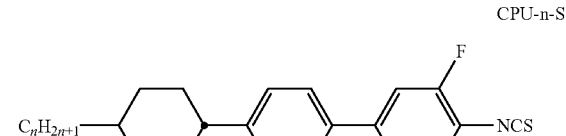
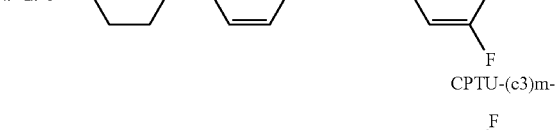
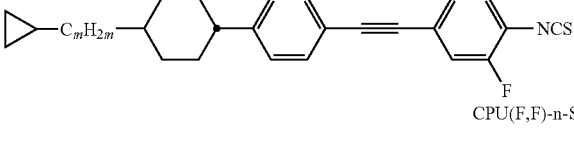
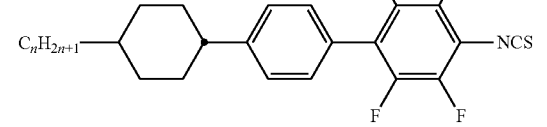
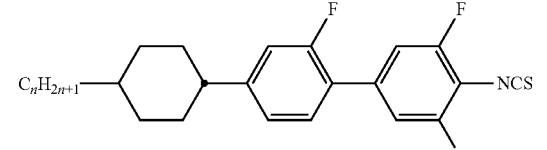

-continued
PVG-n-S
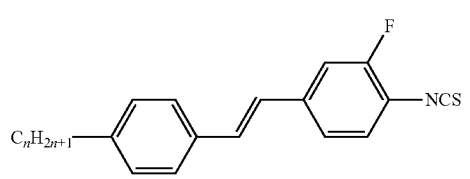
PVU-n-S
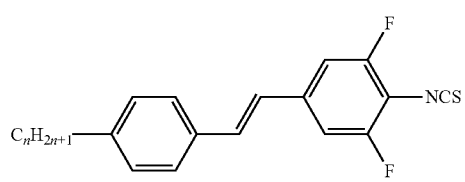
PTG-n-S
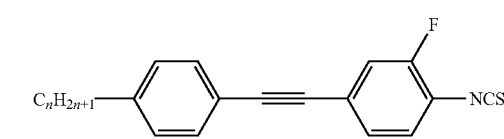
PTU-n-S
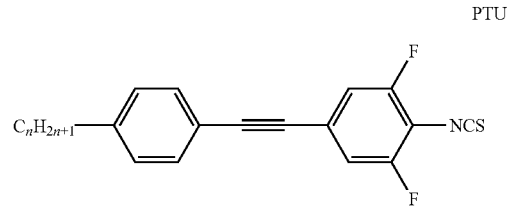
P(2)TU-n-S
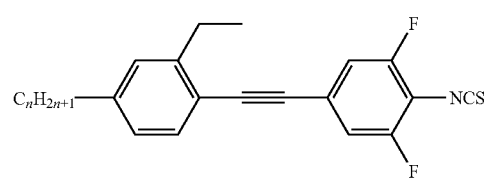
PI(2)TU-n-S
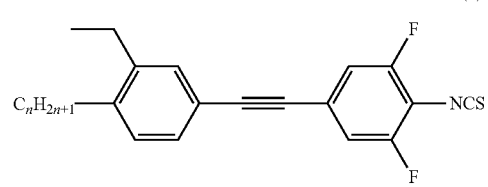
PTP(1)-n-S
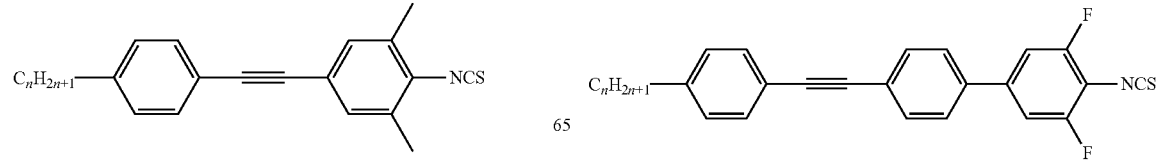
PTP(1,1)-n-S
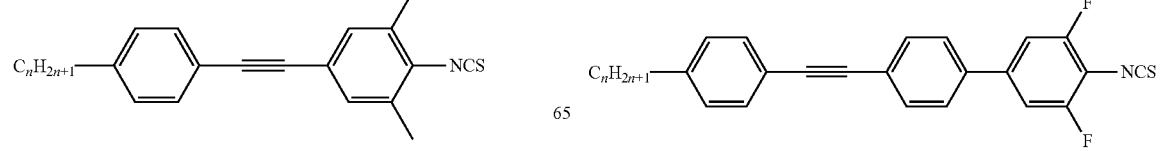
-continued
PTU-Vn-OT
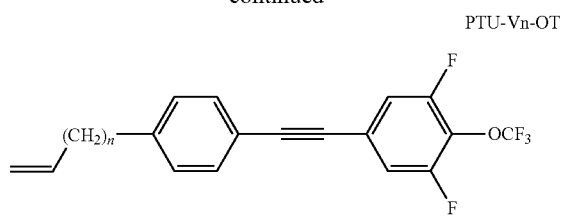
ThU-n-S
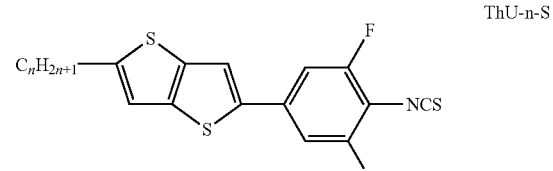
ThTU-n-S
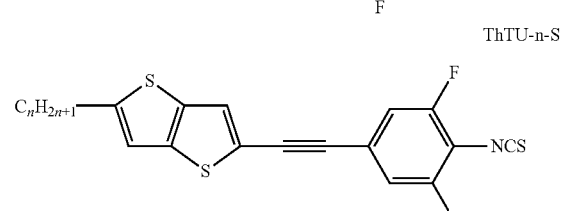
PPTG-n-S
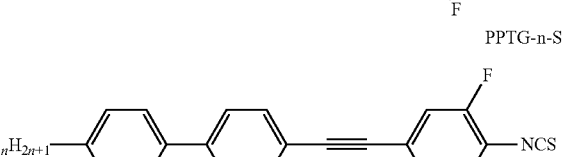
PGTG-n-S
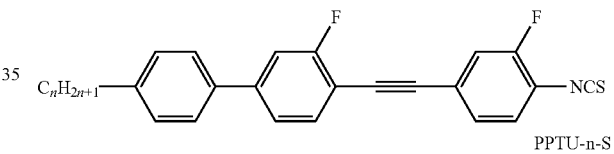
PPTU-n-S
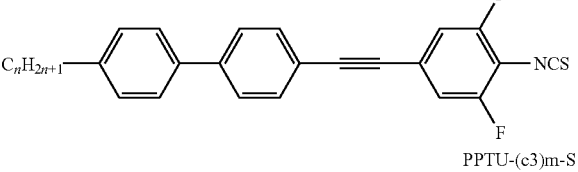
PPTU-(c3)m-S
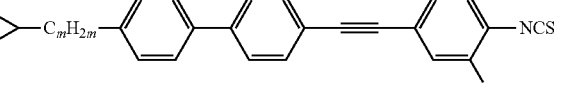
PPTU-(c3)mO-S
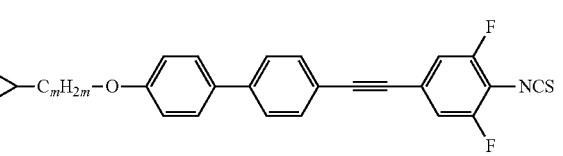
PTPU-n-S
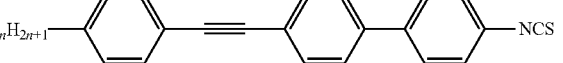

PTPU-(c3)m-S
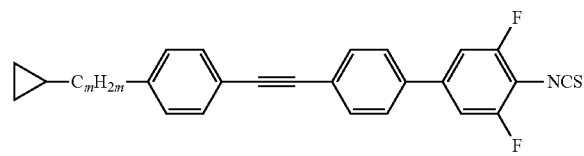
PTPG(Cl)-n-S
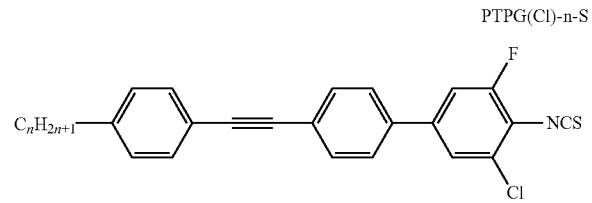
PTPP(Cl,Cl)-n-S
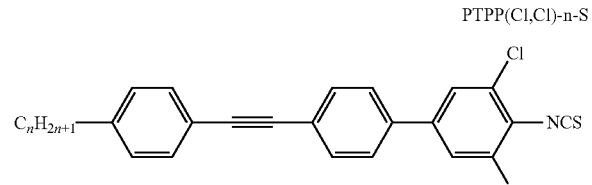
PTPI(c3)TU-n-F
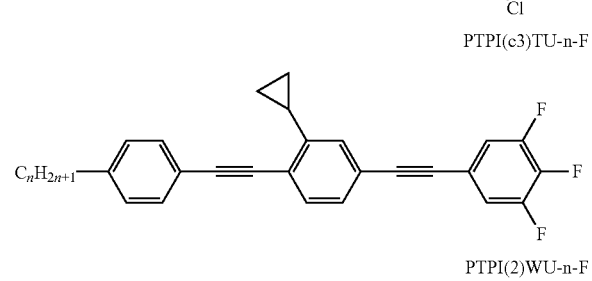
PTPI(2)WU-n-F
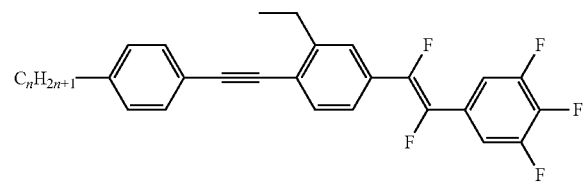
PTPI(2)GU-n-F
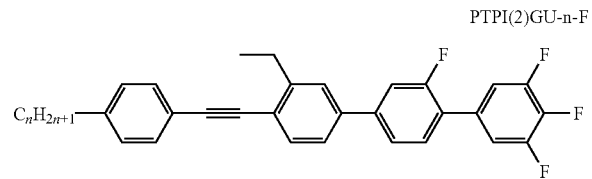
PTG(c3)TU-n-F
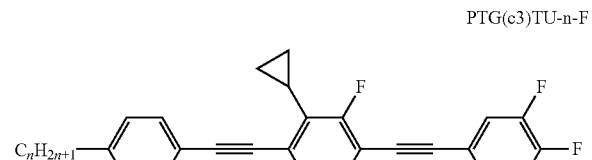
PTN(1,4)TP-n-F
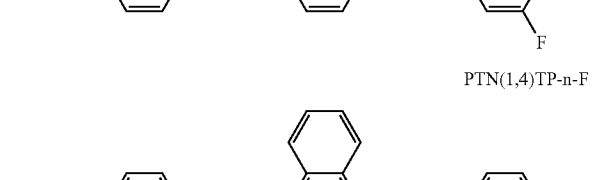
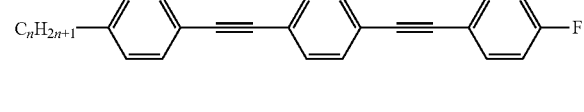
PGP-n-m
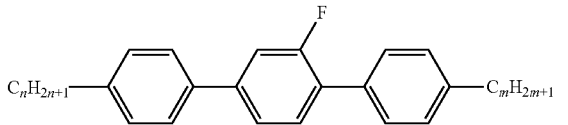
PGP-F-OT
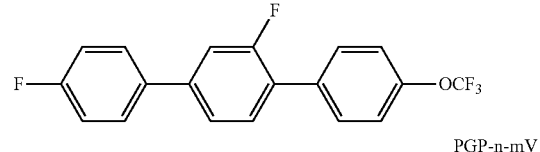
PGP-n-mV
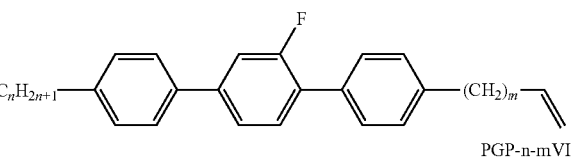
PGP-n-mVI
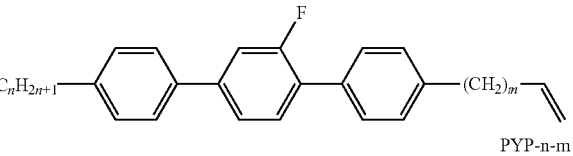
PYP-n-m
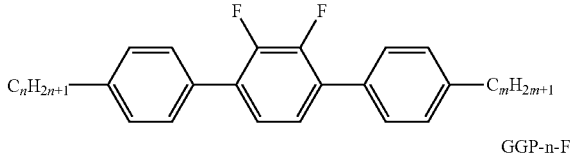
GGP-n-F
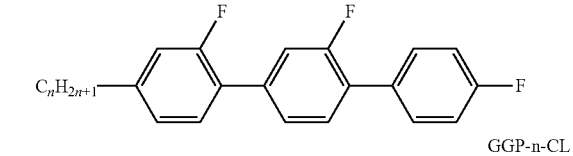
GGP-n-CL
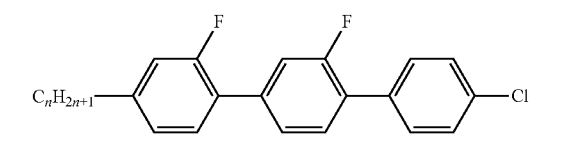
GGP-n-m
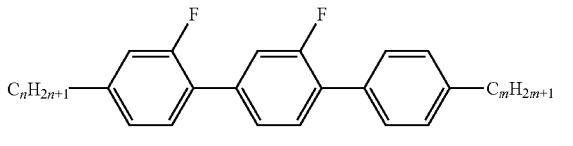
PGIGI-n-F
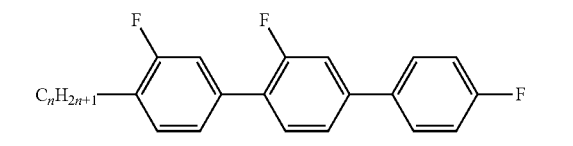
PGIGI-n-CL
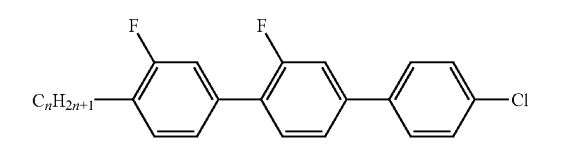

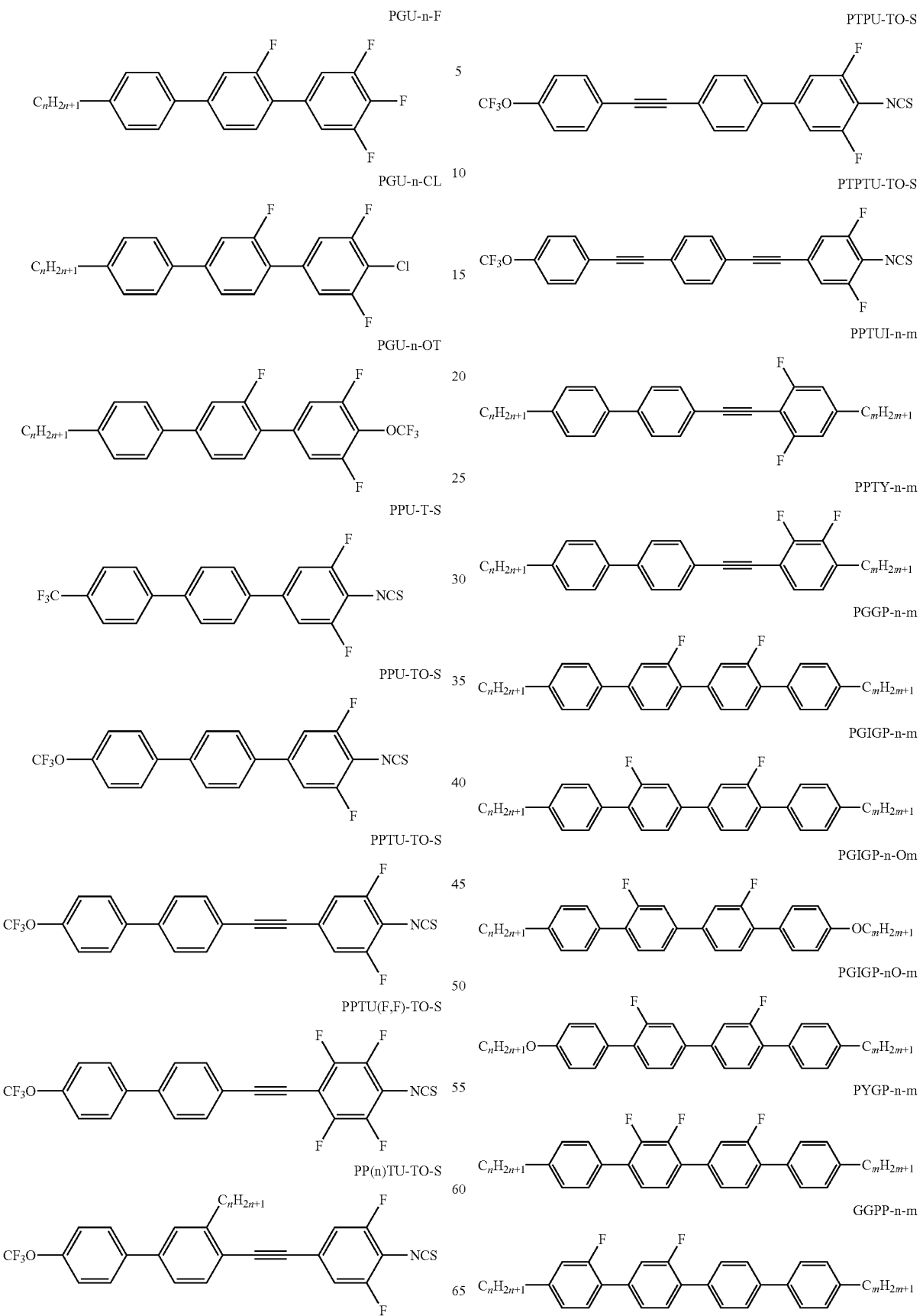

PPGU-n-F
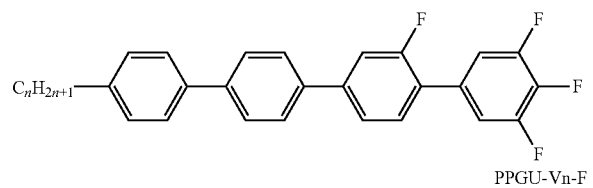

PPGU-Vn-F
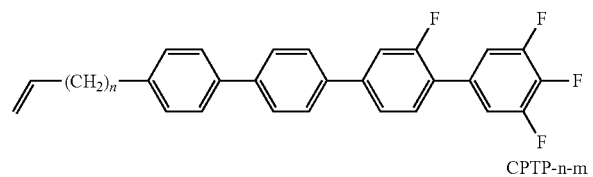

CPTP-n-m
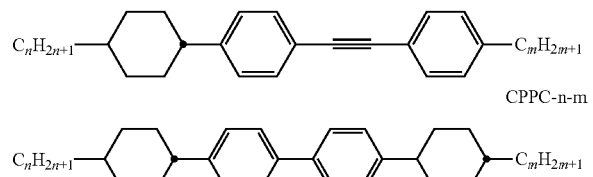

CGPC-n-m
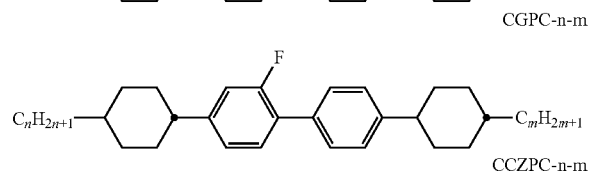

CCZPC-n-m
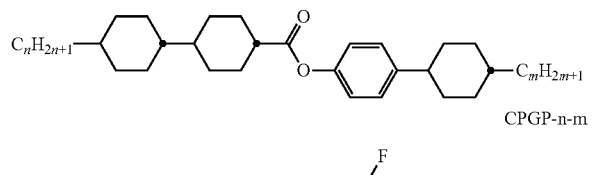

CPGP-n-m
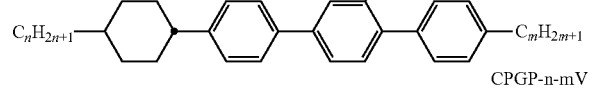

CPGP-n-mV
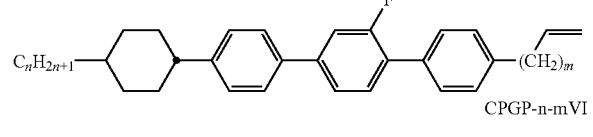

CPGP-n-mVI
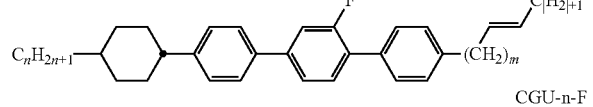

CGU-n-F
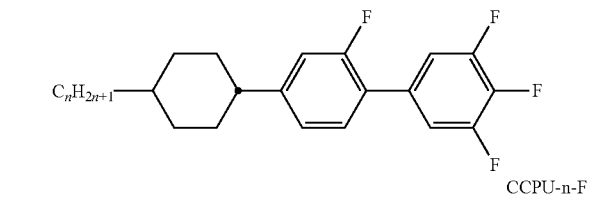

CCPU-n-F
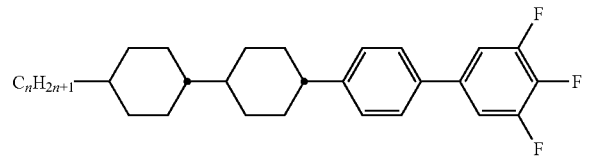

CCGU-n-F
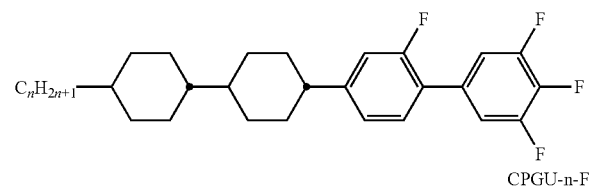

CPGU-n-F
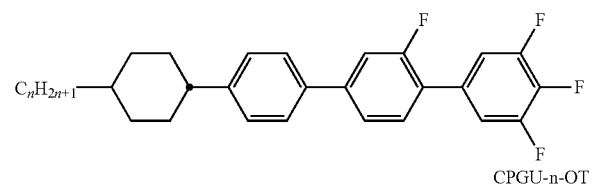

CPGU-n-OT
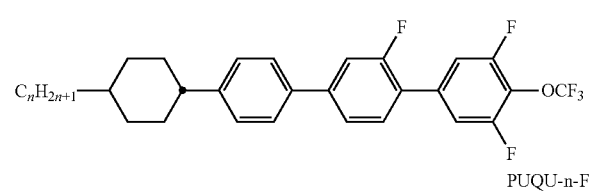

PUQU-n-F
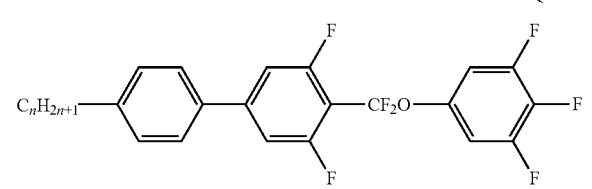

PGUQU-n-F
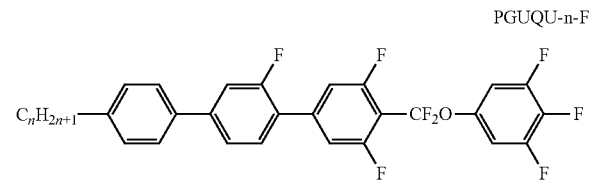

DPGU-n-F

DPGU-n-OT
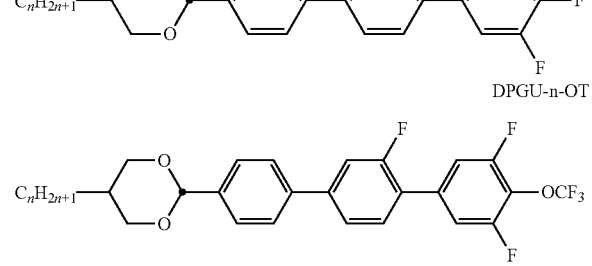

APGP-n-m
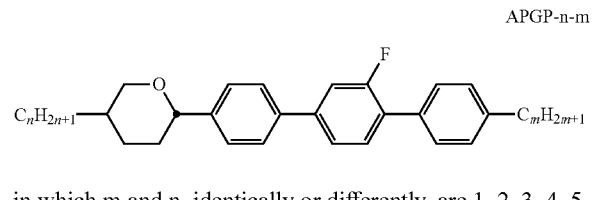

in which m and n, identically or differently, are 1, 2, 3, 4, 5, 6 or 7.

Preferably, the medium according to the invention comprises one or more compounds selected from the compounds of Table C.

The following table, Table D, shows illustrative compounds which can be used as alternative stabilisers in the mesogenic media in accordance with the present invention.

The total concentration of these and similar compounds in the media is preferably 5% or less.
Table D
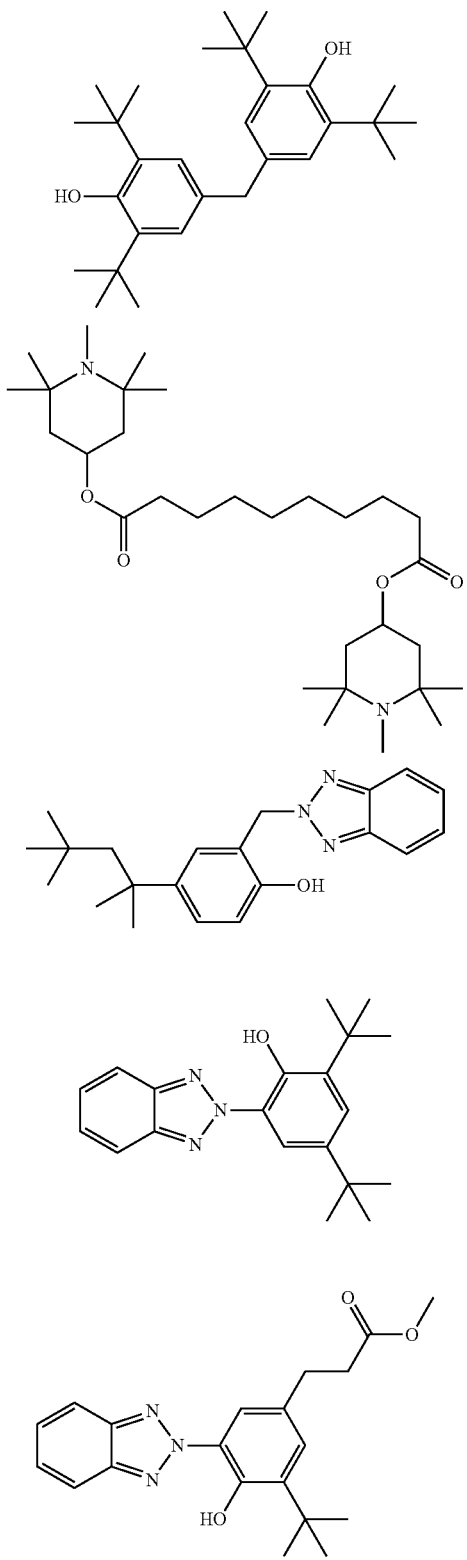
-continued
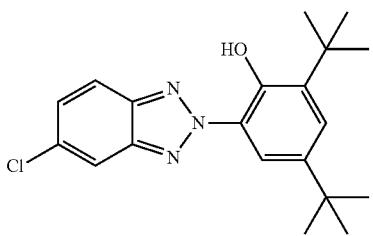
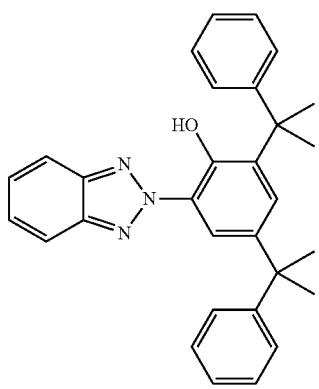
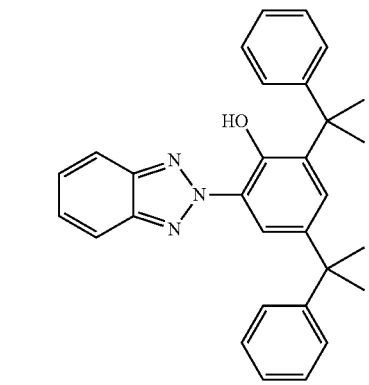
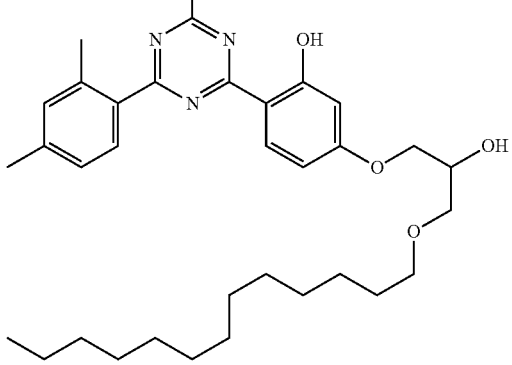

151
-continued

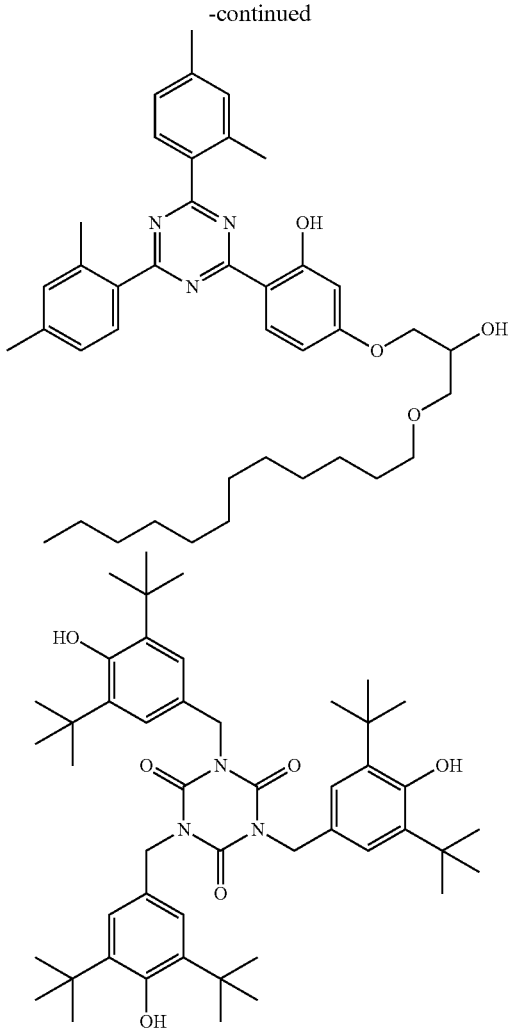

152
-continued

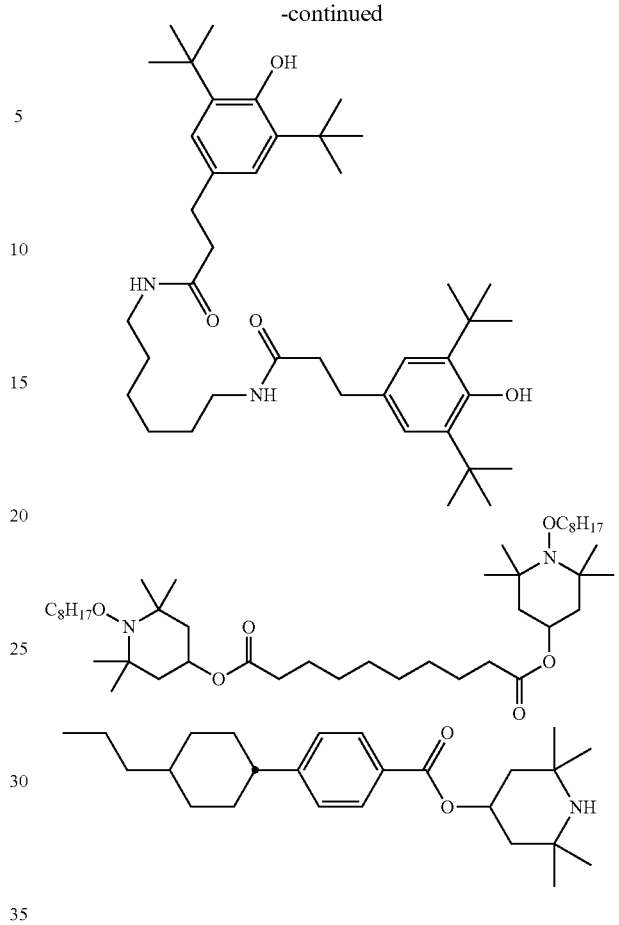

In a preferred embodiment of the present invention, the mesogenic media comprise one or more compounds selected from the group of the compounds from Table D. The following table, Table E, shows illustrative compounds which can preferably be used as chiral dopants in the mesogenic media in accordance with the present invention.

Table E

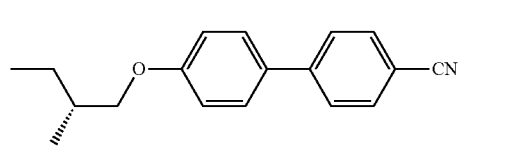
C 15

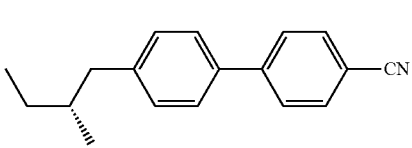
CB 15

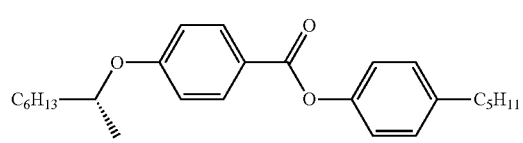
CM 21

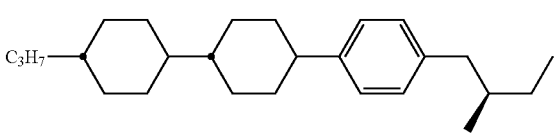
CM 44

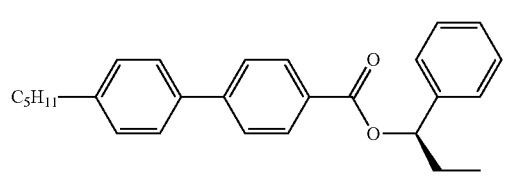
CM 45

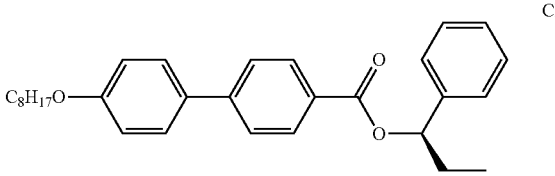
CM 47

-continued

CC

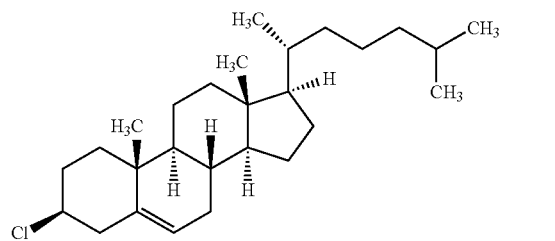

CN

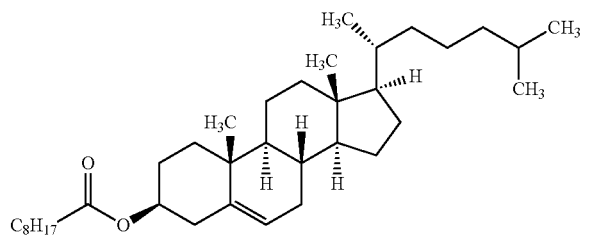

R/S-811

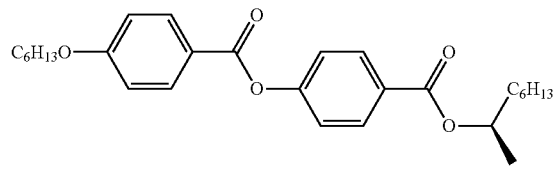

R/S-1011

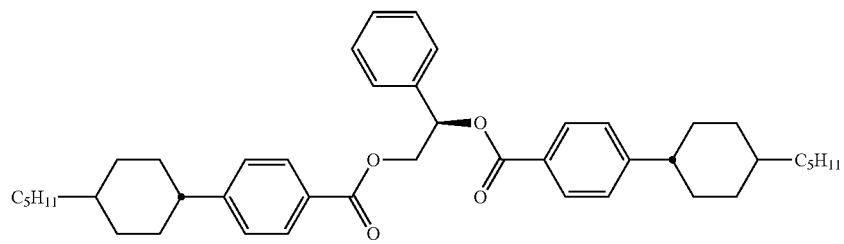

R/S-2011

R/S-3011

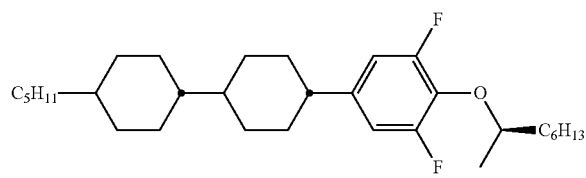

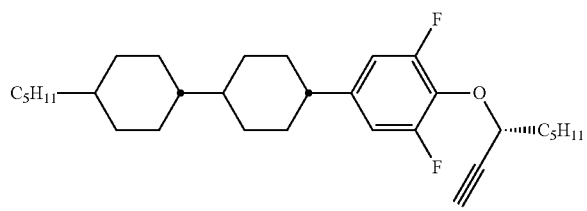

R/S-4011

R/S-5011

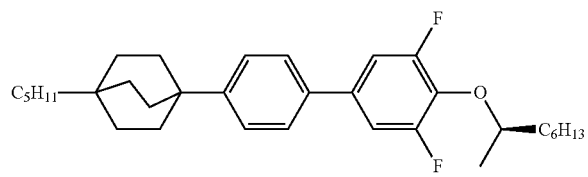

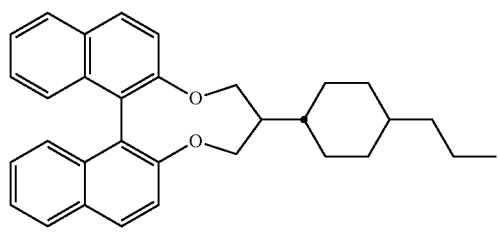

In a preferred embodiment of the present invention, the mesogenic media comprise one or more compounds selected from the group of the compounds of Table E.

The mesogenic media in accordance with the present application preferably comprise two or more, preferably four or more, compounds selected from the group consisting of the compounds from the above tables.

Without further elaboration, it is believed that one skilled in the art can, using the preceding description, utilize the present invention to its fullest extent. The following examples are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

EXAMPLES

Comparative Mixture C1 and Example mixtures N1 to N22 for use according to the invention having the compositions and properties as indicated in the following tables are prepared and characterized with respect to their general physical properties and their applicability in optical components.

An optical component comprising the media according to the invention as defined in claim 1, and fabricated according to the process as defined in claim 12 is distinguished by excellent operational stability when exposed to the environment because of high clearing temperature, broad nematic phase range and excellent low-temperature stability (LTS) of the liquid crystal medium used therein. As a result, the component, and devices containing the component, are operable under extreme temperature conditions. Surprisingly, the temperature dependence of the birefringence of said liquid crystal medium is very small, i.e. the Δn changes little with the temperature which makes a device reliable and easy to control.

| Comparative Mixture C1 | | | |
|---|---|---|---|
| CP-1V-N | 12.0% | $T_{N,I}$ [° C.]: | 111 |
| ME3N.F | 3.0% | Δn [589.3 nm, 20° C.] | 0.2939 |
| ME4.NF | 13.0% | $n_e$ [589.3 nm, 20° C.] | 1.8139 |
| PTP-1-O2 | 4.0% | $n_o$ [589.3 nm, 20° C.] | 1.5200 |
| PTP-2-O1 | 5.0% | Δε [1 kHz, 20° C.]: | 13.4 |
| PTP-3-O1 | 5.0% | $\varepsilon_\parallel$ [1 kHz, 20° C.]: | 17.8 |
| CPTP-3-O1 | 3.0% | $\varepsilon_\perp$ [1 kHz, 20° C.]: | 4.4 |
| PPTUI-3-2 | 20.0% | $\gamma_1$ [mPas, 20° C.]: | 334 |
| PPTUI-3-4 | 35.0% | $K_1$ [pN, 20° C.]: | 13.0 |
| Σ | 100.0% | $K_3$ [pN, 20° C.]: | 16.5 |
| | | $K_3/K_1$ [pN, 20° C.]: | 1.27 |
| | | $V_0$ [V, 20° C.]: | 1.04 |
| | | $LTS_{bulk}$ (−20° C.) | 192 |

| Example N1 | | | |
|---|---|---|---|
| PTU-3-S | 15.0% | $T_{N,I}$ [° C.]: | 124.5 |
| PTU-5-S | 15.0% | Δn [589.3 nm, 20° C.] | 0.3628 |
| PGU-3-S | 15.0% | $n_e$ [589.3 nm, 20° C.] | 1.9034 |
| PPTU-5-S | 10.0% | $n_o$ [589.3 nm, 20° C.] | 1.5406 |
| CPU-2-S | 28.0% | Δε [1 kHz, 20° C.]: | 22.0 |
| CPU-4-S | 17.0% | $\varepsilon_\parallel$ [1 kHz, 20° C.]: | 26.7 |
| Σ | 100.0% | $\varepsilon_\perp$ [1 kHz, 20° C.]: | 4.6 |
| | | $\gamma_1$ [mPas, 20° C.]: | 307 |
| | | $K_1$ [pN, 20° C.]: | 14.5 |
| | | $K_3$ [pN, 20° C.]: | 18.0 |
| | | $K_3/K_1$ [pN, 20° C.]: | 1.24 |
| | | $V_0$ [V, 20° C.]: | 0.85 |
| | | $LTS_{bulk}$ (−20° C.) | >1000 |

| Example N2 | | | |
|---|---|---|---|
| PTU-3-S | 10.0% | $T_{N,I}$ [° C.]: | 149.5 |
| PTU-5-S | 8.0% | Δn [589.3 nm, 20° C.] | 0.3838 |
| PGU-3-S | 18.0% | $n_e$ [589.3 nm, 20° C.] | 1.9232 |
| PPTU-4-S | 7.0% | $n_o$ [589.3 nm, 20° C.] | 1.5394 |
| PPTU-5-S | 9.0% | Δε [1 kHz, 20° C.]: | 23.3 |
| PGTU-4-S | 6.0% | $\varepsilon_\parallel$ [1 kHz, 20° C.]: | 27.7 |
| CPU-2-S | 22.0% | $\varepsilon_\perp$ [1 kHz, 20° C.]: | 4.5 |
| CPU-4-S | 20.0% | $\gamma_1$ [mPas, 20° C.]: | 394 |
| Σ | 100.0% | $K_1$ [pN, 20° C.]: | 16.8 |
| | | $K_3$ [pN, 20° C.]: | 20.6 |
| | | $K_3/K_1$ [pN, 20° C.]: | 1.23 |
| | | $V_0$ [V, 20° C.]: | 0.90 |
| | | $LTS_{bulk}$ (−20° C.) | >1000 |
| | | $LTS_{bulk}$ (−30° C.) | 768 |
| | | $LTS_{bulk}$ (−40° C.) | 96 |

The birefringence of comparative mixture C-1 and of mixture examples N-1 and N-2 are determined at 20° C. and 60° C. The results are shown in Table 1.

TABLE 1

| Mixture | $\Delta n_{20}$ | $\Delta n_{60}$ | $\Delta n_{20}/\Delta n_{60}$ |
|---|---|---|---|
| C-1 | 0.2939 | 0.2511 | 1.170 |
| N-2 | 0.3838 | 0.3538 | 1.085 |
| N-3 | 0.4267 | 0.3951 | 1.080 |

Surprisingly, the ratio $\Delta n_{20}/\Delta n_{60}$ is favorably smaller for the media according to the invention, i.e. they show less variation of the birefringence with temperature compared to the medium of the state of the art.

| Example N3 | | | |
|---|---|---|---|
| PTU-3-S | 10.0% | $T_{N,I}$ [° C.]: | 156 |
| PTU-5-S | 11.0% | Δn [589.3 nm, 20° C.] | 0.4267 |
| PPTU-4-S | 6.0% | Δε [1 kHz, 20° C.]: | 18.8 |
| PPTU-5-S | 10.0% | $\varepsilon_\parallel$ [1 kHz, 20° C.]: | 22.8 |
| PGTU-4-S | 6.0% | $\varepsilon_\perp$ [1 kHz, 20° C.]: | 4.0 |
| PGU-3-S | 12.0% | $\gamma_1$ [mPas, 20° C.]: | 461 |
| PPU-TO-S | 23.0% | $K_1$ [pN, 20° C.]: | 17.0 |
| CPTU-5-S | 22.0% | $K_3$ [pN, 20° C.]: | 25.0 |
| Σ | 100.0% | $K_3/K_1$ [pN, 20° C.]: | 1.47 |
| | | $V_0$ [V, 20° C.]: | 1.01 |

| Example N4 | | | |
|---|---|---|---|
| PTU-3-S | 10.0% | $T_{N,I}$ [° C.]: | 152 |
| PTU-5-S | 11.0% | Δn [589.3 nm, 20° C.] | 0.4263 |
| PPTU-4-S | 6.0% | Δε [1 kHz, 20° C.]: | 18.5 |
| PPTU-5-S | 5.0% | $\varepsilon_\parallel$ [1 kHz, 20° C.]: | 22.6 |
| PPTU-(c3)1-S | 5.0% | $\varepsilon_\perp$ [1 kHz, 20° C.]: | 4.1 |
| PGTU-4-S | 6.0% | $\gamma_1$ [mPas, 20° C.]: | 472 |
| PGU-3-S | 12.0% | $K_1$ [pN, 20° C.]: | 16.9 |
| PPU-TO-S | 23.0% | $K_3$ [pN, 20° C.]: | 24.8 |
| CPTU-5-S | 22.0% | | |
| Σ | 100.0% | | |

| Example N5 | |
|---|---|
| PTU-3-S | 12.0% |
| PTU-5-S | 12.0% |
| PPTU-4-S | 6.0% |
| PPTU-5-S | 5.0% |
| PPTU-(c3)1-S | 6.0% |
| PGTU-4-S | 6.0% |
| PGU-3-S | 12.0% |
| PPU-TO-S | 23.0% |
| CPTU-(c3)1-S | 18.0% |
| Σ | 100.0% |

| Example N6 | |
|---|---|
| PTU-3-S | 12.0% |
| PTU-5-S | 12.0% |
| PPTU-4-S | 6.0% |
| PPTU-5-S | 5.0% |
| PTPU-(c3) 1-S | 6.0% |
| PGTU-4-S | 6.0% |
| PGU-3-S | 12.0% |
| PPU-TO-S | 23.0% |
| CPTU-(c3)1-S | 18.0% |
| Σ | 100.0% |

| Example N7 | | | |
|---|---|---|---|
| PTU-3-S | 10.0% | $T_{N,I}$ [° C.]: | 155.5 |
| PTU-4O-S | 8.0% | Δn [589.3 nm, 20° C.] | 0.3874 |
| PTU-3-S | 18.0% | Δε [1 kHz, 20° C.]: | 24.0 |
| PPTU-4-S | 7.0% | | |
| PPTU-5-S | 9.0% | | |
| PGTU-4-S | 6.0% | | |

Example N7

| | |
|---|---|
| CPU-2-S | 22.0% |
| CPU-4-S | 20.0% |
| Σ | 100.0% |

Example N8

| | | | |
|---|---|---|---|
| PTU-2O-S | 8.0% | $T_{N,I}$ [° C.] | 155.5 |
| PTU-4O-S | 10.0% | $\Delta n$ [589.3 nm, 20° C.] | 0.3874 |
| PGU-3-S | 18.0% | $\Delta \varepsilon$ [1 kHz, 20° C.] | 24.0 |
| PPTU-4-S | 7.0% | | |
| PPTU-5-S | 9.0% | | |
| PGTU-4-S | 6.0% | | |
| CPU-2-S | 22.0% | | |
| CPU-4-S | 20.0% | | |
| Σ | 100.0% | | |

Example N9

| | | | |
|---|---|---|---|
| PTG-2O-S | 8.0% | $T_{N,I}$ [° C.] | 162.5 |
| PTG-4O-S | 8.0% | $\Delta n$ [589.3 nm, 20° C.] | 0.3919 |
| PTU-2O-S | 8.0% | $\Delta \varepsilon$ [1 kHz, 20° C.] | 24.6 |
| PTU-4O-S | 10.0% | | |
| PGU-3-S | 15.0% | | |
| PPTU-4-S | 10.0% | | |
| PPTU-5-S | 9.0% | | |
| PGTU-4-S | 6.0% | | |
| CPU-2-S | 6.0% | | |
| CPU-4-S | 20.0% | | |
| Σ | 100.0% | | |

Example N10

| | | | |
|---|---|---|---|
| PTG-2O-S | 8.0% | $T_{N,I}$ [° C.] | 148.0 |
| PTG-4O-S | 8.0% | $\Delta n$[589.3nm,20°C.] | 0.4191 |
| PTU-2O-S | 8.0% | | |
| PTU-(c3)1-O-S | 10.0% | | |
| PGU-3-S | 15.0% | | |
| PPTU-4-S | 10.0% | | |
| PPTU-5-S | 9.0% | | |
| PGTU-4-S | 6.0% | | |
| CPU-2-S | 6.0% | | |
| CPU-4-S | 20.0% | | |
| Σ | 100.0% | | |

Example N11

| | | | |
|---|---|---|---|
| PTG-2O-S | 8.0% | $T_{N,I}$ [° C.]: | 157.0 |
| PTG-4O-S | 8.0% | $\Delta n$ [589.3 nm, 20° C.] | 0.4114 |
| PTU-4O-S | 10.0% | $\Delta \varepsilon$ [1 kHz, 20° C.]: | 24.1 |
| PGU-3-S | 18.0% | | |
| PPTU-4-S | 10.0% | | |
| PPTU-5-S | 9.0% | | |
| PGTU-4-S | 6.0% | | |
| CPU-2-S | 11.0% | | |
| CPU-4-S | 20.0% | | |
| Σ | 100.0% | | |

Example N12

| | | | |
|---|---|---|---|
| PTU-3-S | 15.0% | $T_{N,I}$ [° C.]: | 135.5 |
| PTU-4O-S | 15.0% | $\Delta n$[589.3nm,20°C.] | 0.3696 |
| PGU-3-S | 15.0% | | |
| PPTU-5-S | 10.0% | | |
| CPU-2-S | 28.0% | | |
| CPU-4-S | 17.0% | | |
| Σ | 100.0% | | |

Example N13

| | | | |
|---|---|---|---|
| PTU-3-S | 5.0% | $T_{N,I}$ [° C.]: | 143.0 |
| PTU-2O-S | 10.0% | $\Delta n$ [589.3 nm, 20° C.] | 0.3746 |
| PTU-4O-S | 15.0% | | |
| PGU-3-S | 15.0% | | |
| PPTU-5-S | 10.0% | | |
| CPU-2-S | 28.0% | | |
| CPU-4-S | 17.0% | | |
| Σ | 100.0% | | |

Example N14

| | | | |
|---|---|---|---|
| PTG-2O-S | 10.0% | $T_{N,I}$ [° C.]: | 147.0 |
| PTG-4O-S | 10.0% | $\Delta n$ [589.3 nm, 20° C.] | 0.3812 |
| PTU-4O-S | 10.0% | | |
| PGU-3-S | 15.0% | | |
| PPTU-5-S | 10.0% | | |
| CPU-2-S | 28.0% | | |
| CPU-4-S | 17.0% | | |
| Σ | 100.0% | | |

Example N14

| | | | |
|---|---|---|---|
| PTG-2O-S | 8.0% | $T_{N,I}$ [° C.]: | 143.0 |
| PTG-4O-S | 8.0% | $\Delta n$ [589.3 nm, 20° C.] | 0.3865 |
| PTU-2O-S | 8.0% | $\Delta \varepsilon$ [1 kHz, 20° C.]: | 24.2 |
| PTU-4O-S | 10.0% | | |
| PGU-3-S | 15.0% | | |
| PPTU-5-S | 10.0% | | |
| CPU-2-S | 28.0% | | |
| CPU-4-S | 13.0% | | |
| Σ | 100.0% | | |

Example N16

| | | | |
|---|---|---|---|
| PTU-3-S | 10.0% | $T_{N,I}$ [° C.]: | 164 |
| PTU-4O-S | 11.0% | $\Delta n$ [589.3 nm, 20° C.] | 0.4316 |
| PPTU-4-S | 6.0% | $\Delta \varepsilon$ [1 kHz, 20° C.]: | 20.0 |
| PPTU-5-S | 10.0% | | |
| PGTU-4-S | 6.0% | | |
| PGU-3-S | 12.0% | | |
| PPU-TO-S | 23.0% | | |
| CPTU-5-S | 22.0% | | |
| Σ | 100.0% | | |

| Example N17 | | | |
|---|---|---|---|
| PTU-2O-S | 8.0% | $T_{NI}$ [° C.]: | 172.5 |
| PTU-4O-S | 12.0% | Δn [589.3 nm, 20° C.] | 0.4358 |
| PPTU-4-S | 6.0% | Δε [1 kHz, 20° C.]: | 23.3 |
| PPTU-5-S | 10.0% | | |
| PGTU-4-S | 6.0% | | |
| PGU-3-S | 13.0% | | |
| PPU-TO-S | 23.0% | | |
| CPTU-5-S | 22.0% | | |
| Σ | 100.0% | | |

| Example N18 | | | |
|---|---|---|---|
| PTG-2O-S | 8.0% | $T_{NI}$ [° C.]: | 162 |
| PTG-4O-S | 8.0% | Δn [589.3 nm, 20° C.] | 0.4459 |
| PTU-2O-S | 8.0% | Δε [1 kHz, 20° C.]: | 20.6 |
| PTU-4O-S | 10.0% | | |
| PPTU-4-S | 6.0% | | |
| PPTU-5-S | 10.0% | | |
| PGTU-4-S | 6.0% | | |
| PPU-TO-S | 23.0% | | |
| CPTU-5-S | 22.0% | | |
| Σ | 100.0% | | |

| Example N19 | | | |
|---|---|---|---|
| PTG-2O-S | 8.0% | $T_{NI}$ [° C.]: | 167.5 |
| PTG-4O-S | 8.0% | Δn [589.3 nm, 20° C.] | 0.4420 |
| PTU-4O-S | 10.0% | Δε [1 kHz, 20° C.]: | 19.5 |
| PPTU-4-S | 6.0% | | |
| PPTU-5-S | 10.0% | | |
| PGTU-4-S | 6.0% | | |
| PGU-3-S | 7.0% | | |
| PPU-TO-S | 23.0% | | |
| CPTU-5-S | 22.0% | | |
| Σ | 100.0% | | |

| Example N20 | | | |
|---|---|---|---|
| PTG-(c3)1O-S | 8.0% | $T_{NI}$ [° C.]: | 158 |
| PTG-4O-S | 7.0% | Δn [589.3 nm, 20° C.] | 0.4457 |
| PTU-2O-S | 8.0% | | |
| PTU-4O-S | 10.0% | | |
| PPTU-4-S | 6.0% | | |
| PPTU-5-S | 10.0% | | |
| PGTU-4-S | 6.0% | | |
| PPU-TO-S | 23.0% | | |
| CPTU-5-S | 22.0% | | |
| Σ | 100.0% | | |

| Example N21 | | | |
|---|---|---|---|
| PTU-3-S | 12.0% | $T_{NI}$ [° C.]: | 141.5 |
| PTU-5-S | 12.0% | Δn [589.3 nm, 20° C.] | 0.3981 |
| PPTU-4-S | 8.0% | $n_e$ [589.3 nm, 20° C.] | 1.9377 |
| PPTU-5-S | 8.0% | $n_o$ [589.3 nm, 20° C.] | 1.5396 |
| PGTU-4-S | 10.0% | Δε [1 kHz, 20° C.]: | 21.3 |
| PGU-3-S | 10.0% | $\varepsilon_{\parallel}$ [1 kHz, 20° C.]: | 25.7 |
| PPU-TO-S | 10.0% | $\varepsilon_{\perp}$ [1 kHz, 20° C.]: | 4.4 |
| CPU-2-S | 15.0% | $\gamma_1$ [mPa s, 20° C.]: | 364 |
| CPU-4-S | 15.0% | $K_1$ [pN, 20° C.]: | 16.0 |
| Σ | 100.0% | $K_3$ [pN, 20° C.]: | 20.0 |
| | | $K_3/K_1$ [pN, 20 °C.]: | 1.25 |
| | | $V_0$ [V, 20° C.]: | 0.91 |

| Example N22 | | | |
|---|---|---|---|
| PTU-3-S | 12.0% | $T_{NI}$ [° C.]: | 141.5 |
| PTU-5-S | 12.0% | Δn [589.3 nm, 20° C.] | 0.4108 |
| PPTU-4-S | 6.0% | $n_e$ [589.3 nm, 20° C.] | 1.9500 |
| PPTU-5-S | 14.0% | $n_o$ [589.3 nm, 20° C.] | 1.5392 |
| PGTU-4-S | 6.0% | Δε [1 kHz, 20° C.]: | 21.1 |
| PGU-3-S | 15.0% | $\varepsilon_{\parallel}$ [1 kHz, 20° C.]: | 25.4 |
| PPU-TO-S | 15.0% | $\varepsilon_{\perp}$ [1 kHz, 20° C.]: | 4.4 |
| CPU-2-S | 12.0% | $\gamma_1$ [mPa s, 20° C.]: | 380 |
| CPU-4-S | 8.0% | $K_1$ [pN, 20° C.]: | 16.6 |
| Σ | 100.0% | $K_3$ [pN, 20° C.]: | 21.4 |
| | | $K_3/K_1$ [pN, 20 °C.]: | 1.29 |
| | | $V_0$ [V, 20° C.]: | 0.94 |

Furthermore, the media according to the invention are distinguished by a high clearing temperature in combination with excellent low temperature stability, i.e. they have a very broad operating temperature range.

Furthermore, the media according to the invention show a surprisingly low threshold voltage $V_0$.

Surprisingly, a medium comprising a compound RO with an alkoxy side chain has an even higher birefringence and higher clearing temperature than a medium comprising exclusively compounds with an alkyl side chain.

The invention claimed is:

1. An optical component (100) operable in the infrared region of the electromagnetic spectrum comprising:
    a liquid crystal medium (140) sandwiched between a first substrate (110) and a second substrate (160) facing each other, and
    first and second electrodes (120, 150) for supplying an electric potential across said liquid crystal medium to drive liquid crystals in a predetermined configuration,
    wherein said liquid crystal medium comprises:
    one or more compounds selected from formulae I, II, and III

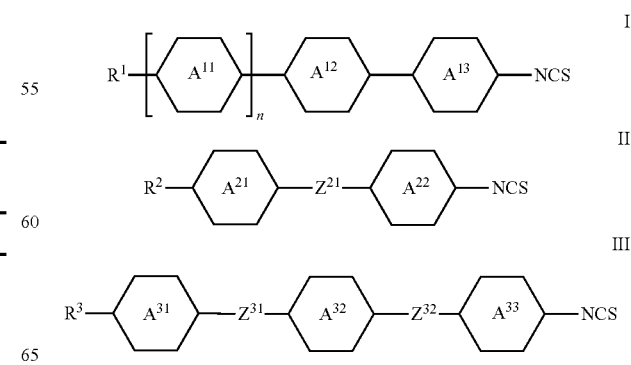

in which

R¹ denotes H, or a straight chain alkyl having 1 to 12 C atoms, a branched alkyl having 3 to 12 C atoms, a straight chain alkenyl having 2 to 15 C atoms, or a branched alkenyl having 3 to 15 C atoms, in which one or more CH₂-groups may each be replaced by

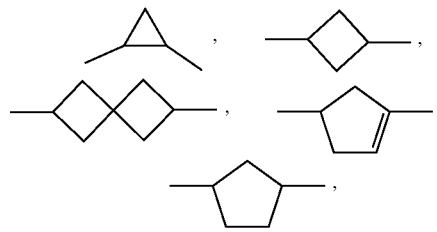

or n is 0, 1 or 2,

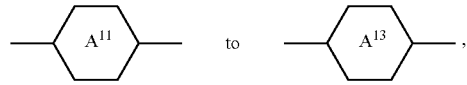

on each occurrence, independently of one another, denote

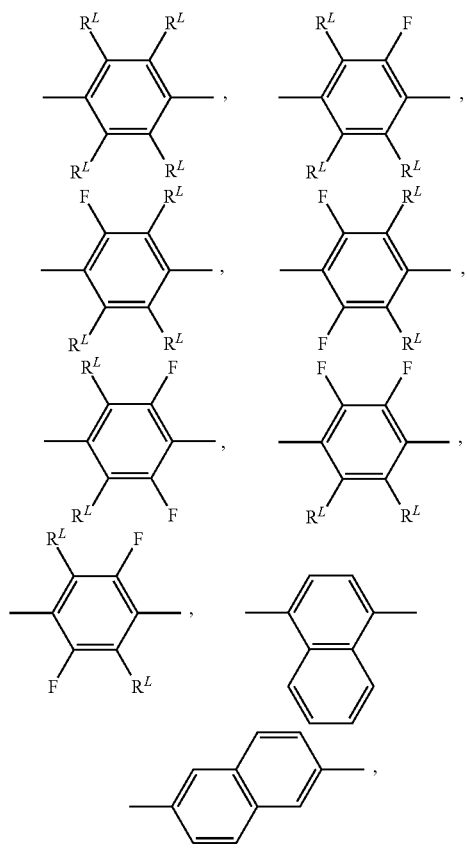

or in which R$^L$, on each occurrence, identically or differently, denotes H or alkyl having 1 to 6 C atoms, and wherein

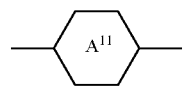

alternatively denotes

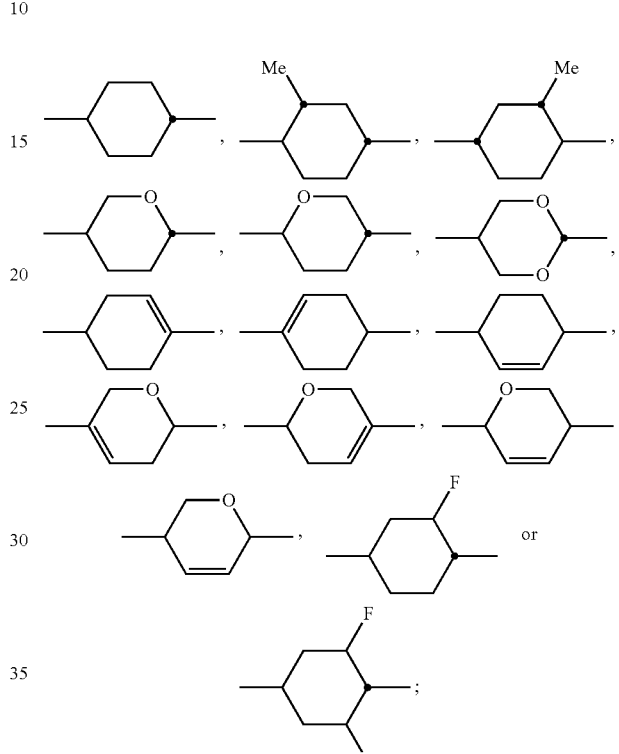

R² denotes H, or a straight chain having 1 to 12 C atoms, a branched alkyl having 3 to 12 C atoms, a straight chain having 1 to 12 C atoms, or a branched alkenyl having 3 to 15 C atoms, in which one or more CH₂-groups may each be replaced by

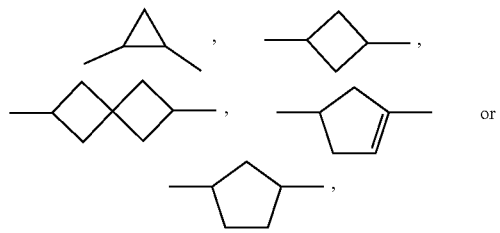

Z²¹ denotes trans-CH=CH—, trans-CF=CF— or —C≡C—, and

independently of one another, denote

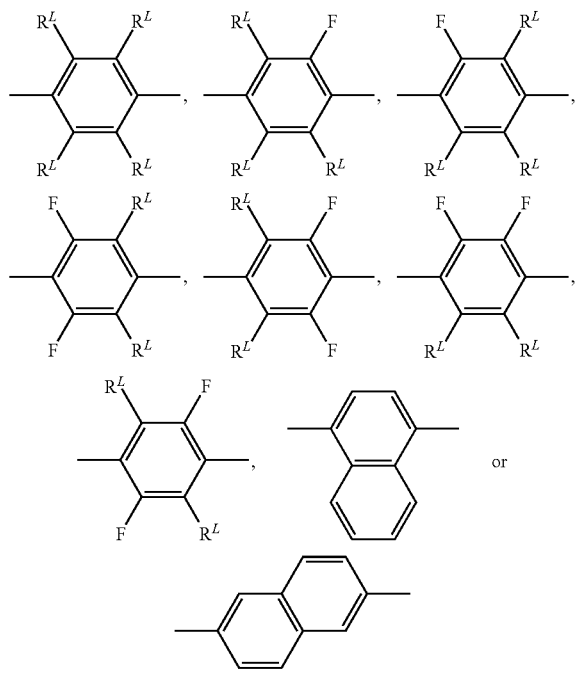

in which R$^L$, on each occurrence, identically or differently, denotes H or alkyl having 1 to 6 C atoms, and wherein R$^3$ denotes H, a straight chain alkyl having 1 to 12 C, a branched alkyl having 3 to 12 C atoms, a straight chain alkenyl having 2 to 15 C atoms, or a branched alkenyl having 3 to 15 C atoms, in which one or more CH$_2$-groups may each be replaced by

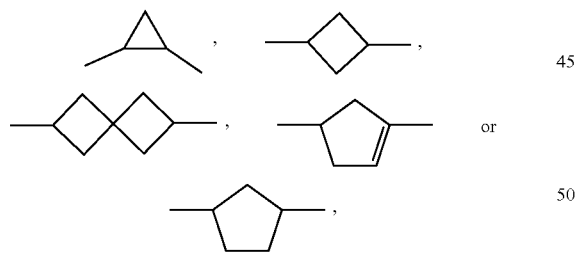

one of Z$^{31}$ and Z$^{32}$, denotes trans-CH=CH—, trans-CF=CF— or —C≡C— and the other one, independently thereof, denotes —C≡C—, trans-CH=CH—, trans-CF=CF— or a single bond;

independently of one another, denote

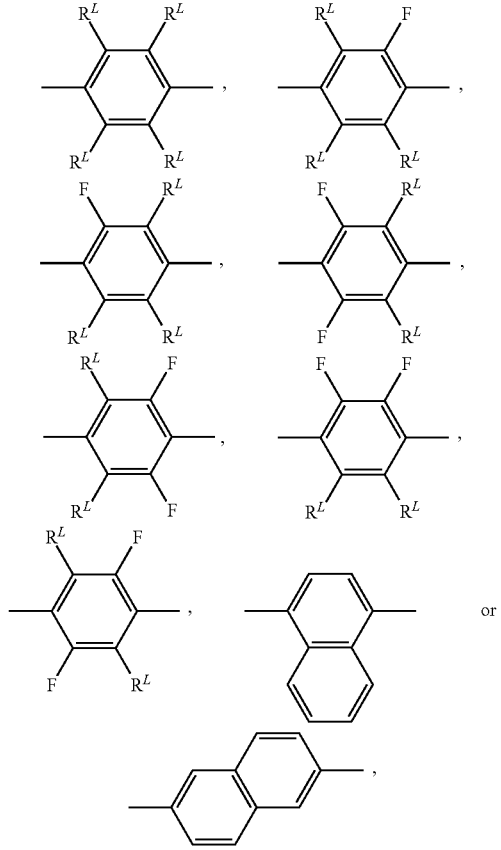

in which R$^L$, on each occurrence, identically or differently, denotes H or alkyl having 1 to 6 C atoms, and wherein

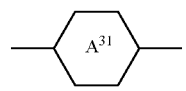

alternatively denotes

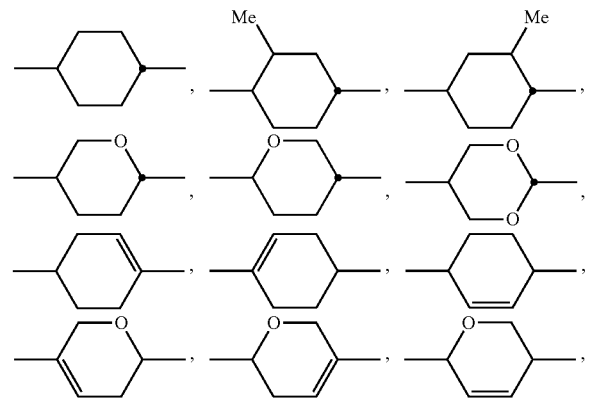

-continued

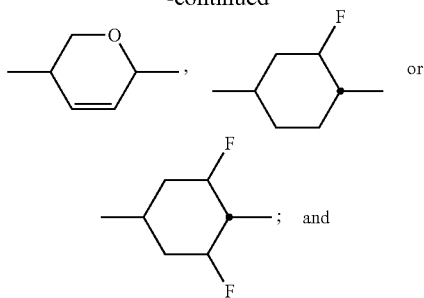

one or more compounds of formula RO

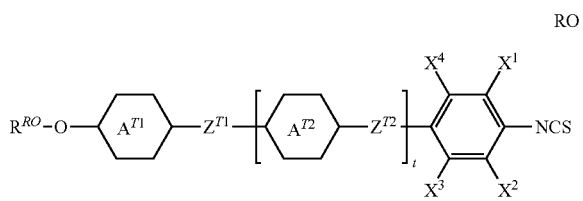

in which
$R^{RO}$ denotes straight chain having 1 to 12 C atoms, a branched alkyl having 3 to 12 C atoms, a straight chain alkenyl having 2 to 12 C atoms, or a branched alkenyl having 3 to 12 C atoms, in each of which one or more $CH_2$-groups may each be replaced by

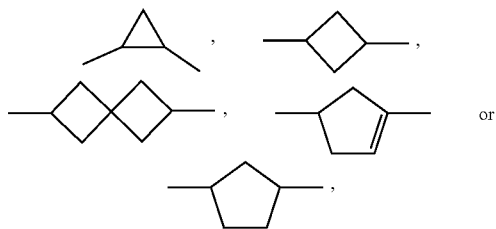

$Z^{T1}$, $Z^{T2}$ identically or differently, denote —CH=CH—, —CF=CF—, —CH=CF—, —CF=CH—, —C≡C— or a single bond,
$X^1$, $X^2$, $X^3$ and $X^4$ identically or differently, denote H, Cl, F or $CH_3$,
t is 0 or 1, and

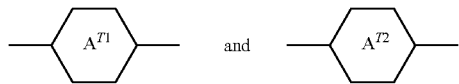

denote a radical selected from the following groups:
a) the group consisting of 1,4-phenylene, 1,4-naphthylene, and 2,6-naphthylene, in which one or two CH groups may each be replaced by N and in which one or more H atoms may each be replaced by L,
b) the group consisting of thiophene-2,5-diyl, thieno[3,2-b]thiophene-2,5-diyl, selenophene-2,5-diyl, furan-2,5-diyl, each of which is optionally mono- or poly-substituted by L,
L on each occurrence, identically or differently, denotes F, Cl, a straight-chain alkyl or alkoxy, in each case optionally fluorinated, having 1 to 12 C atoms, a branched alkyl or alkoxy having 3 to 12 C atoms, a straight-chain alkylcarbonyl, alkoxycarbonyl, alkylcarbonyloxy, or alkoxycarbonyloxy having 2 to 12 C atoms, or branched alkylcarbonyl, alkoxycarbonyl, alkylcarbonyloxy, or alkoxycarbonyloxy having 2 4 to 12 C atoms;
wherein
said medium contains one or more compounds of the formula I in a total concentration of 30% or more, and
said medium contains one or more compounds of formula III in a total concentration of 2% to 30%.

2. The component comprising a liquid crystal medium according to claim 1, wherein the liquid crystal medium comprises one or more compounds of formula T

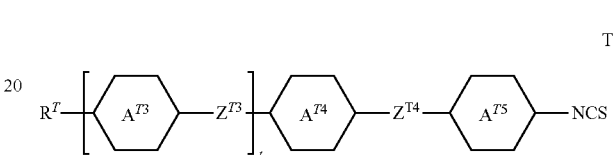

in which
$R^T$ denotes halogen, CN, NCS, $R^F$, $R^F$—O— or $R^F$—S—,
wherein
$R^F$ denotes fluorinated alkyl or fluorinated alkenyl having up to 12 C atoms,

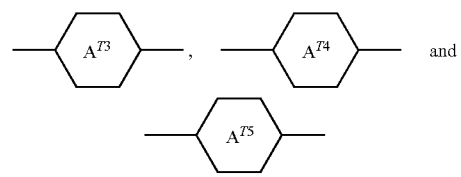

on each occurrence, independently of one another, denote

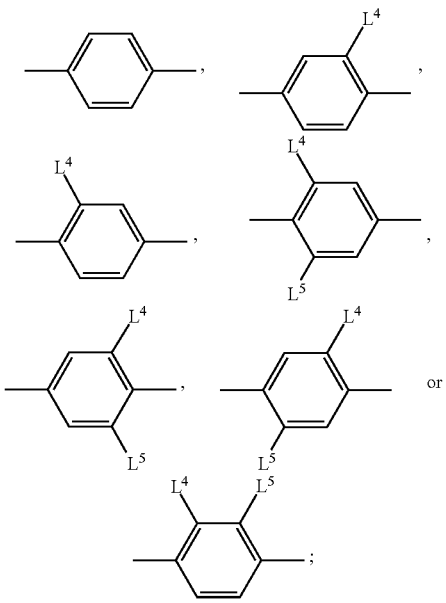

L⁴ and L⁵ identically or differently, denote F, Cl or straight chain alkyl having 1 to 12 C atoms, branched alkyl having 3 to 12 C atoms, cyclic alkyl having 3 to 12 C atoms, or straight chain alkenyl having 2 to 12 C atoms, branched alkenyl having 3 to 12 C atoms, or cyclic alkenyl having 3 to 12 C atoms;

$Z^{T3}$, $Z^{T4}$ identically or differently, denote —CH=CH—, —CF=CF—, —CH=CF—, —CF=CH—, —C≡C— or a single bond, and t is 0 or 1.

3. The component comprising a liquid crystal medium according to claim 1, wherein the liquid crystal medium is a polymer network liquid crystal, comprising a polymer network obtainable by in situ polymerization from the liquid crystal medium as set forth in claim 1, the liquid crystal medium further comprising one or more compounds of formula P

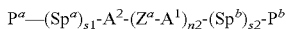  P in which the individual radicals have the following meanings:

$P^a$ $P^b$ each, independently of one another, denote a polymerizable group, $Sp^a$, $Sp^b$ on each occurrence, identically or differently, denote a spacer group, s1, s2 each, independently of one another, denote 0 or 1, $A^1$, $A^2$ each, independently of one another, denote a radical selected from the following groups:
  a) the group consisting of trans-1,4-cyclohexylene, 1,4-cyclo-hexenylene and 4,4'-bicyclohexylene, wherein, in addition, one or more non-adjacent CH₂ groups may each be replaced by —O— and/or —S— and wherein, in addition, one or more H atoms may be each replaced by F,
  b) the group consisting of 1,4-phenylene and 1,3-phenylene, wherein, in addition, one or two CH groups may each be replaced by N and wherein, in addition, one or more H atoms may each be replaced by L,
  c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
  d) the group consisting of saturated, partially unsaturated or fully unsaturated, and optionally substituted, polycyclic radicals having 5 to 20 cyclic C atoms, one or more of which may, in addition, be replaced by heteroatoms, n2 denotes 0, 1, 2 or 3, $Z^a$ in each case, independently of one another, denotes —CO—O—, —O—CO—, —CH₂O—, —OCH₂—, —CF₂O—, —OCF₂—, or —(CH₂)ₙ—, where n is 2, 3 or 4, —O—, —CO—, —C(R^y R^z)—, —CH₂CF₂—, —CF₂CF₂— or a single bond, L on each occurrence, identically or differently, denotes F, Cl, CN, SCN, SF₅ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, and $R^y$, $R^z$ each, independently of one another, denote H, F or straight-chain or branched alkyl having up to 12 C atoms, in which one or more H atoms may each be replaced by F.

4. The component comprising a liquid crystal medium according to claim 1, wherein the liquid crystal medium comprises a chiral dopant.

5. The component comprising a liquid crystal medium according to claim 1, wherein the liquid crystal medium comprises a stabilizer.

6. The component according to claim 1, wherein the component is a transmissive spatial light modulator.

7. The component according to claim 1, wherein the component is a reflective spatial light modulator configured to modulate the phase of an incident optical signal propagating at least partially in a first dimension, wherein the first substrate is a transparent glass layer having a first, transparent electrode, and wherein the second substrate is a complementary metal-oxide-semiconductor (CMOS) silicon backplane, the component further comprising a mirror disposed between the second substrate and the liquid crystal medium, wherein the mirror is divided into a two-dimensional array of individually addressable pixels arranged and configured as second electrodes, each pixel being individually drivable by a voltage signal to provide a local phase change to at least one polarization component of an optical signal.

8. A liquid-crystal-on-silicon (LCoS) device, wherein said device comprises a component according to claim 7.

9. A wavelength selective switch, light detection and ranging (LIDAR) scanner, infrared scene projector, wavelength-division multiplexing system, reconfigurable optical add-drop multiplexer, or electro evanescent optical refraction prism comprising a liquid-crystal-on-silicon (LCoS) device according to claim 8.

10. A method of spatially modulating infrared light, the method comprising:
  i) providing an optical component according to claim 1;
  ii) receiving incident infrared light at a surface of said optical component; and
  iii) applying a predetermined voltage to each of the individual electrodes formed on the first substrate in order to modulate a refractive index of the liquid crystal medium.

11. A method of manufacturing an optical phase modulator, comprising:
  a) providing a first substrate with a first electrode, optionally having a two dimensional array of individually electrically drivable cells;
  b) depositing a liquid crystal medium over the first substrate; and
  c) mounting a second substrate with a second electrode onto the liquid crystal material, wherein said liquid crystal medium comprises:

one or more compounds selected from formulae I, II, and III

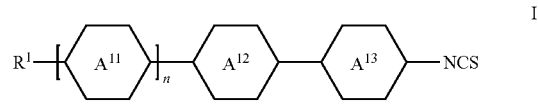  I

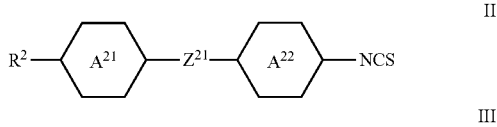  II

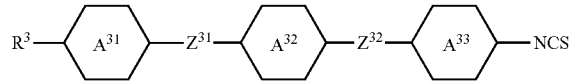  III in which $R^1$ denotes H, or a straight chain alkyl having 1 to 12 C atoms, a branched alkyl having 3 to 12 C atoms, a straight chain alkenyl having 2 to 15 C atoms, or a branched alkenyl having 3 to 15 C atoms, in which one or more $CH_2$-groups may each be replaced by

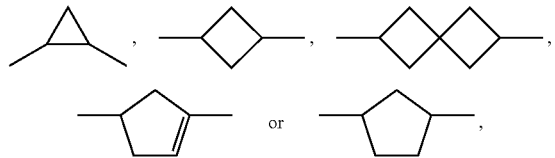

n is 0, 1 or 2,

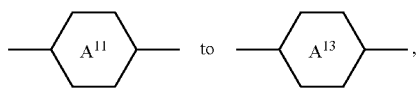

on each occurrence, independently of one another, denote

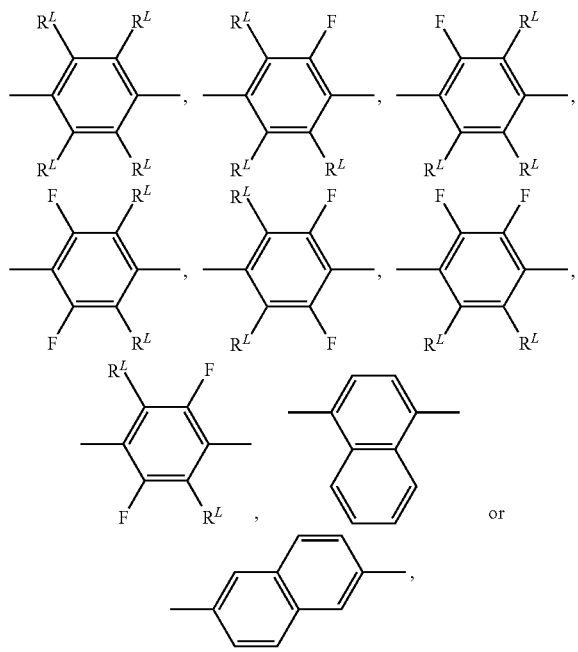

in which $R^L$, on each occurrence, identically or differently, denotes H or alkyl having 1 to 6 C atoms, and wherein

alternatively denotes

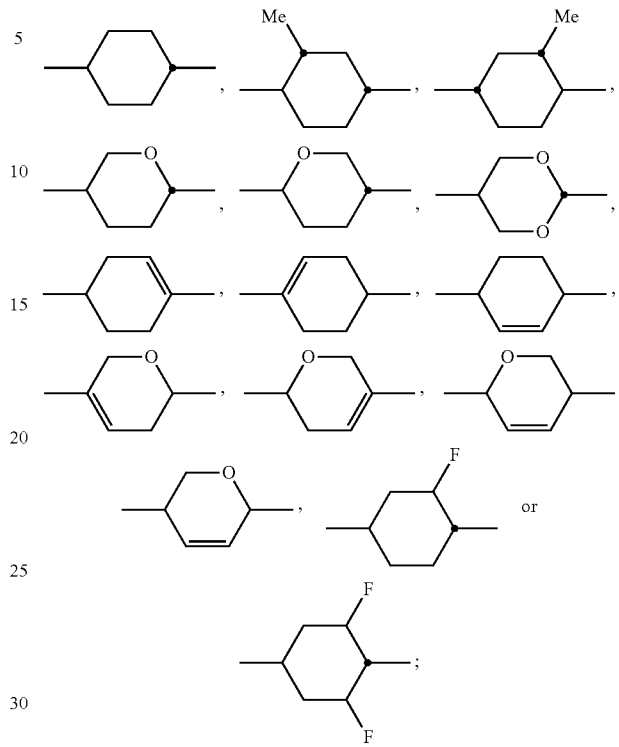

$R^2$ denotes H, or a straight chain having 1 to 12 C atoms, a branched alkyl having 3 to 12 C atoms, a straight chain having 1 to 12 C atoms, or a branched alkenyl having 3 to 15 C atoms, in which one or more $CH_2$-groups may each be replaced by

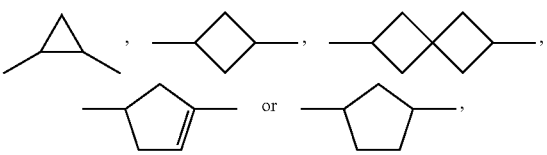

$Z^{21}$ denotes trans-CH=CH—, trans-CF=CF— or —C≡C—, and

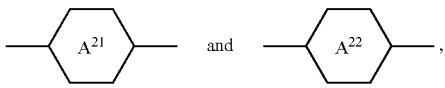

independently of one another, denote

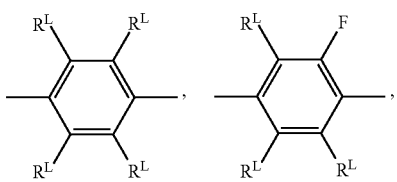

-continued

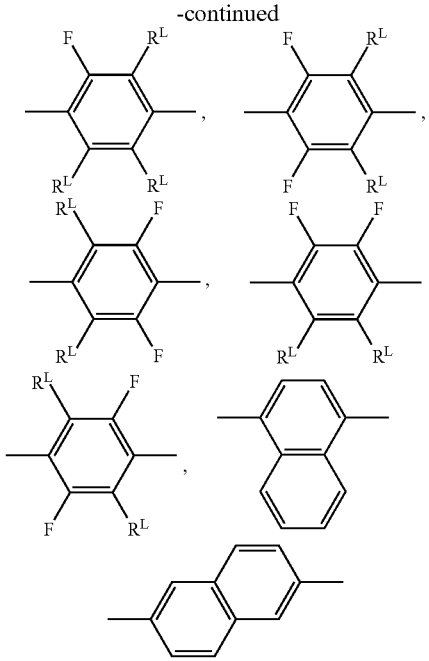

in which $R^L$, on each occurrence, identically or differently, denotes H or alkyl having 1 to 6 C atoms, and wherein $R^3$ denotes H, a straight chain alkyl having 1 to 12 C, a branched alkyl having 3 to 12 C atoms, a straight chain alkenyl having 2 to 15 C atoms, or a branched alkenyl having 3 to 15 C atoms, in which one or more $CH_2$- groups may each be replaced by

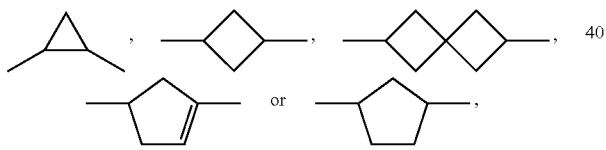

one of $Z^{31}$ and $Z^{32}$, denotes trans-CH=CH—, trans-CF=CF— or —C≡C— and the other one, independently thereof, denotes —C≡C—, trans-CH=CH—, trans-CF=CF— or a single bond;

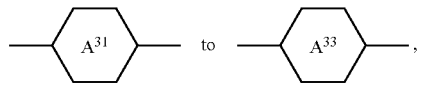

independently of one another, denote

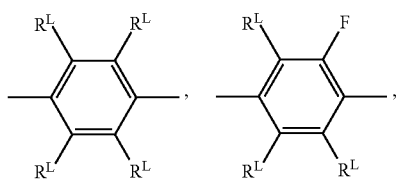

-continued

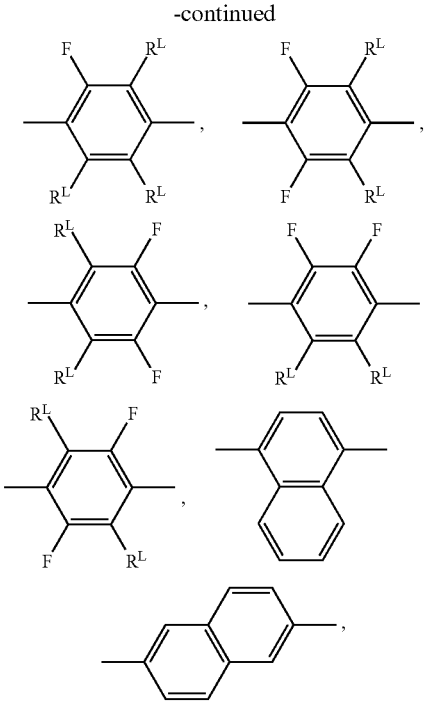

in which $R^L$, on each occurrence, identically or differently, denotes H or alkyl having 1 to 6 C atoms, and wherein

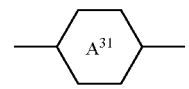

alternatively denotes

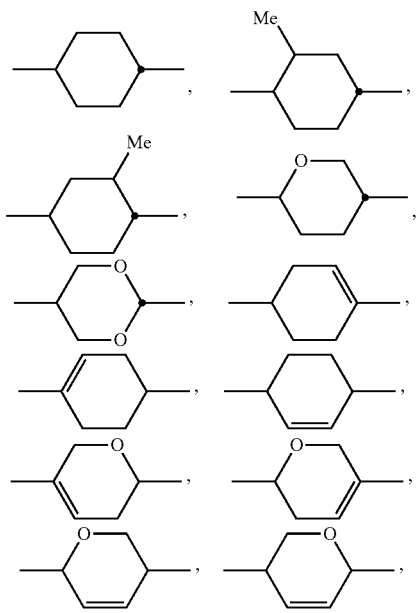

-continued

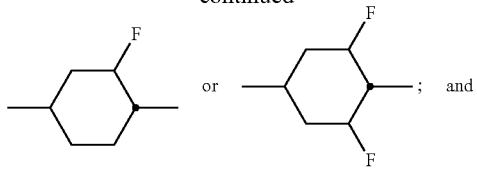

one or more compounds of formula RO

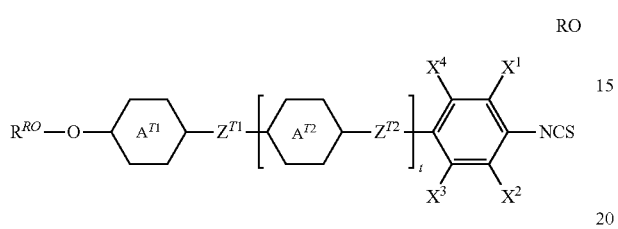

in which
R$^{RO}$ denotes straight chain having 1 to 12 C atoms, a branched alkyl having 3 to 12 C atoms, a straight chain alkenyl having 2 to 12 C atoms, or a branched alkenyl having 3 to 12 C atoms, in each of which one or more CH$_2$-groups may each be replaced by

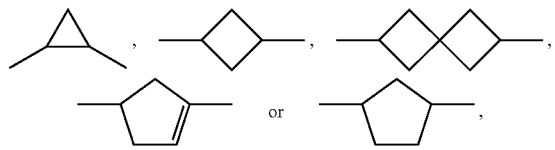

Z$^{T1}$, Z$^{T2}$ identically or differently, denote —CH=CH—, —CF=CF—, —CH=CF—, —CF=CH—, —C≡C— or a single bond,
X$^1$, X$^2$, X$^3$ and X$^4$ identically or differently, denote H, Cl, F or CH$_3$,
t is 0 or 1, and

denote a radical selected from the following groups:
a) the group consisting of 1,4-phenylene, 1,4-naphthylene, and 2,6-naphthylene, in which one or two CH groups may each be replaced by N and in which one or more H atoms may each be replaced by L,
b) the group consisting of thiophene-2,5-diyl, thieno[3,2-b]thiophene-2,5-diyl, selenophene-2,5-diyl, furan-2,5-diyl, each of which is optionally mono- or polysubstituted by L,
L on each occurrence, identically or differently, denotes F, Cl, a straight-chain alkyl or alkoxy, in each case optionally fluorinated, having 1 to 12 C atoms, a branched alkyl or alkoxy having 3 to 12 C atoms, a straight-chain alkylcarbonyl, alkoxycarbonyl, alkylcarbonyloxy, or alkoxycarbonyloxy having 2 to 12 C atoms, or branched alkylcarbonyl, alkoxycarbonyl, alkylcarbonyloxy, or alkoxycarbonyloxy having 2 4 to 12 C atoms;

wherein
said medium contains one or more compounds of the formula I in a total concentration of 30% or more, and
said medium contains one or more compounds of formula III in a total concentration of 2% to 30%.

12. The optical component according to claim 1, wherein said medium contains one or more compounds of formula II.

13. The optical component according to claim 12, wherein one or more compounds of formula II are selected from the formulae II-1 to II-3:

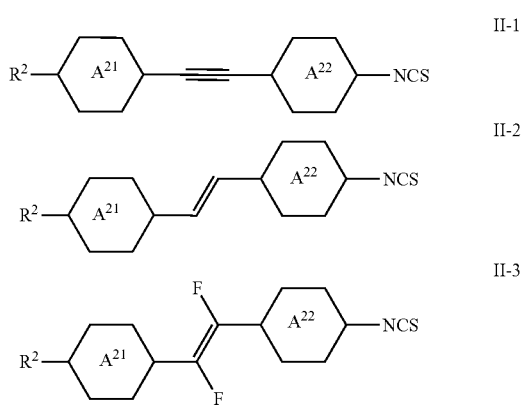

wherein
R$^2$ denotes H, or a straight chain having 1 to 12 C atoms, a branched alkyl having 3 to 12 C atoms, a straight chain having 1 to 12 C atoms, or a branched alkenyl having 3 to 15 C atoms, in which one or more CH$_2$-groups may each be replaced by

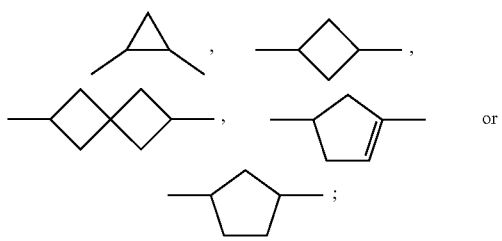

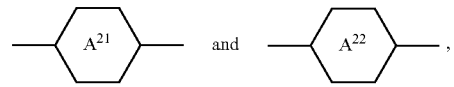

independently of one another, denote

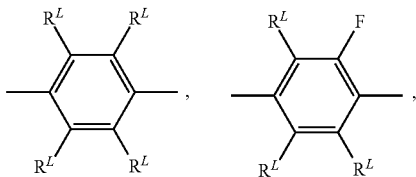

-continued

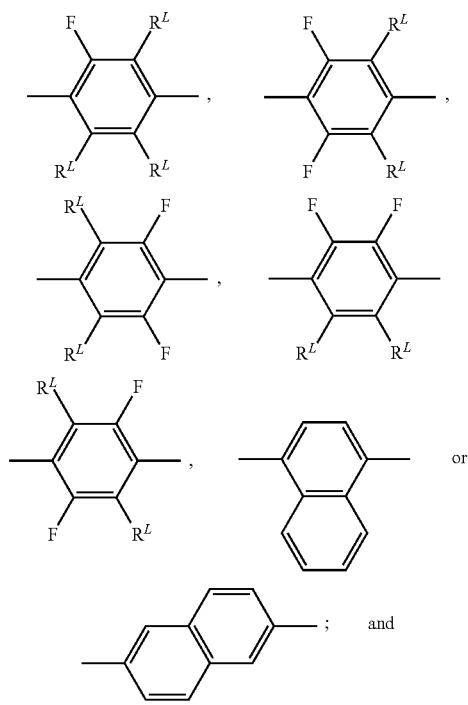

$R^L$ denotes H or alkyl having 1 to 6 C atoms.

14. The optical component according to claim 12, wherein said one or more compounds formula RO are selected from compounds of formulae RO-1 to RO-7

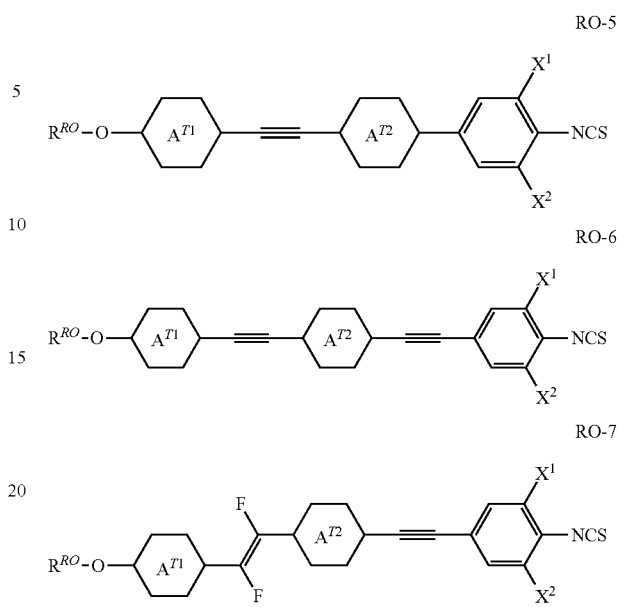

wherein $X^1$ and $X^2$ denote H, Cl, F or $CH_3$.

15. The optical component according to claim 13, wherein said one or more compounds formula RO are selected from compounds of formulae RO-1 to RO-7

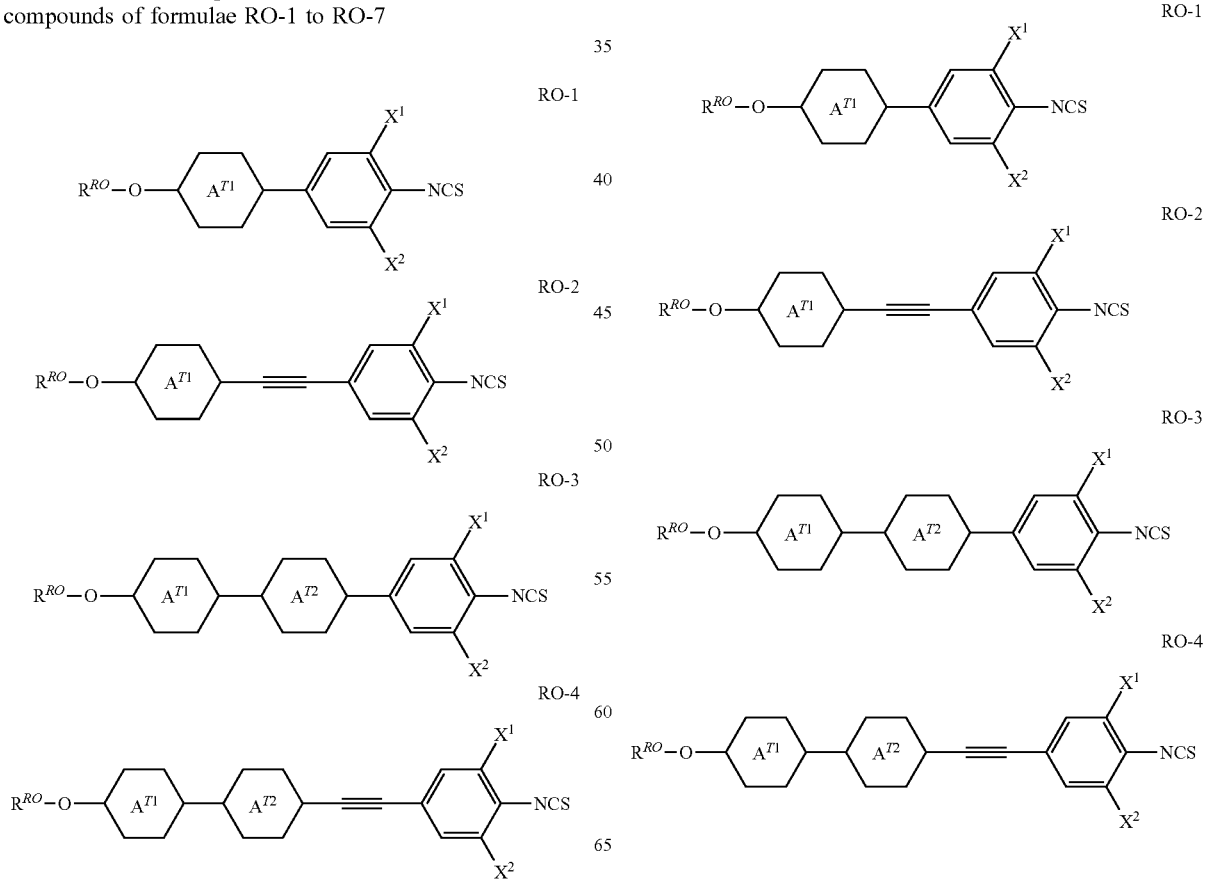

-continued

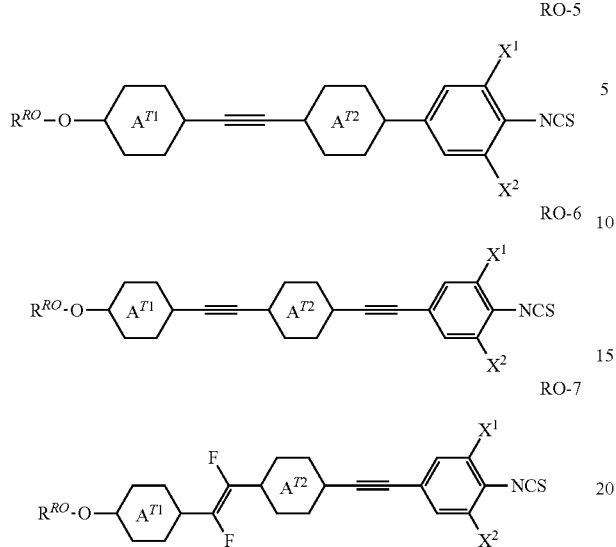

wherein $X^1$ and $X^2$ denote H, Cl, F or $CH_3$.

16. The optical component according to claim 14, wherein said medium contains one or more compounds of formula II and/or formula RO-2, in a total concentration of 5% to 40%.

17. The optical component according to claim 15, wherein said medium contains one or more compounds of formula II-1 and/or formula RO-2, in a total concentration of 5% to 40%.

18. The optical component according to claim 1, wherein the liquid crystal medium is a polymer network liquid crystal, comprising a polymer network obtainable by in situ polymerization from the liquid crystal medium as set forth in claim 1, the liquid crystal medium further comprising one or more compounds of formula P

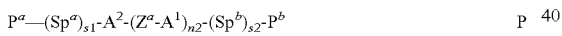

P in which the individual radicals have the following meanings:

$P^a$, $P^b$ each, independently of one another, denote a polymerizable group, $Sp^a$, $Sp^b$ on each occurrence, identically or differently, denote a spacer group, s1, s2 each, independently of one another, denote 0 or 1, $A^1$, $A^2$ each, independently of one another, denote a radical selected from the following groups:

a) the group consisting of trans-1,4-cyclohexylene, 1,4-cyclo-hexenylene and 4,4'-bicyclohexylene, wherein, in addition, one or more non-adjacent $CH_2$ groups may each be replaced by —O— and/or —S— and wherein, in addition, one or more H atoms may be each replaced by F, b) the group consisting of 1,4-phenylene and 1,3-phenylene, wherein, in addition, one or two CH groups may each be replaced by N and wherein, in addition, one or more H atoms may each be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals selected from the group consisting of

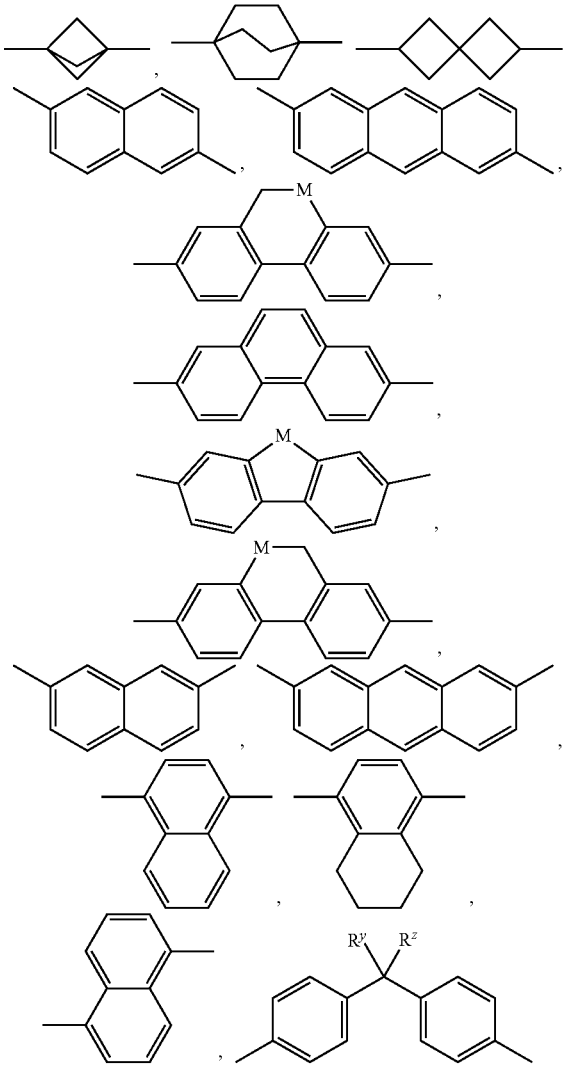

where one or more H atoms in these radicals may each be replaced by L, and/or one or more double bonds may each be replaced by single bonds, and/or one or more CH groups may each be replaced by N, n2 denotes 0, 1, 2 or 3, $Z^a$ in each case, independently of one another, denotes —CO—O—, —O—CO—, —$CH_2$O—, —O$CH_2$—, —$CF_2$O—, —O$CF_2$—, or —$(CH_2)_n$—, where n is 2, 3 or 4, —O—, —CO—, —C($R^yR^z$)—, —$CH_2CF_2$—, —$CF_2CF_2$— or a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, $R^y$, $R^z$ each, independently of one another, denote H, F or straight-chain or branched alkyl having up to 12 C atoms, in which one or more H atoms may each be replaced by F, M denotes —O—, —S—, —CH$_2$—, —CHY$^1$— or —CY$^1$Y$^2$—, and Y$^1$ and Y$^2$ each, independently of one another, denote H, F or straight-chain or branched alkyl having up to 12 C atoms, in which one or more H atoms may each be replaced by F, or denote Cl or CN.

\* \* \* \* \*